United States Patent
Jakob et al.

(10) Patent No.: US 12,540,130 B2
(45) Date of Patent: Feb. 3, 2026

(54) SUBSTITUTED PYRROLIDINE AMIDES IV

(71) Applicant: GRUENENTHAL GMBH, Aachen (DE)

(72) Inventors: Florian Jakob, Aachen (DE); Jo Alen, Averbode (BE); Sebastian Krueger, Aachen (DE); Daniela Friebe, Duesseldorf (DE); Stephanie Hennen, Aachen (DE)

(73) Assignee: GRUENENTHAL GMBH, Aachen (DE)

( * ) Notice: Subject to any disclaimer, the term of this patent is extended or adjusted under 35 U.S.C. 154(b) by 1083 days.

(21) Appl. No.: 17/554,702

(22) Filed: Dec. 17, 2021

(65) Prior Publication Data

US 2022/0106295 A1    Apr. 7, 2022

Related U.S. Application Data

(63) Continuation of application No. PCT/EP2020/067061, filed on Jun. 19, 2020.

(30) Foreign Application Priority Data

Jun. 19, 2019 (EP) .................................. 19181197

(51) Int. Cl.
| | | |
|---|---|---|
| C07D 403/04 | (2006.01) |
| C07D 207/12 | (2006.01) |
| C07D 405/04 | (2006.01) |
| C07D 413/04 | (2006.01) |
| C07D 413/14 | (2006.01) |
| C07D 417/04 | (2006.01) |
| C07D 471/04 | (2006.01) |

(52) U.S. Cl.
CPC ......... *C07D 403/04* (2013.01); *C07D 207/12* (2013.01); *C07D 405/04* (2013.01); *C07D 413/04* (2013.01); *C07D 413/14* (2013.01); *C07D 417/04* (2013.01); *C07D 471/04* (2013.01)

(58) Field of Classification Search
CPC .. C07D 403/04; C07D 207/12; C07D 405/04; C07D 413/04; C07D 413/14; C07D 417/04; C07D 471/04
See application file for complete search history.

(56) References Cited

U.S. PATENT DOCUMENTS

| | | | |
|---|---|---|---|
| 2019/0185455 A1* | 6/2019 | Jakob | A61P 29/00 |
| 2019/0185470 A1* | 6/2019 | Jakob | C07D 401/14 |

FOREIGN PATENT DOCUMENTS

WO    WO-2016148145 A1 *  9/2016  ........... C07D 487/04

OTHER PUBLICATIONS

CAS Registry No. 2305504-40-7, entered on Apr. 25, 2019. (Year: 2019).*
CAS Registry No. 2224408-95-9, entered Registry on May 20, 2018. (Year: 2018).*

* cited by examiner

*Primary Examiner* — Matthew P Coughlin
*Assistant Examiner* — Ashli Ariana Chicks
(74) *Attorney, Agent, or Firm* — Norris McLaughlin, P.A.

(57) ABSTRACT

The invention relates to compounds according to general formula (I),

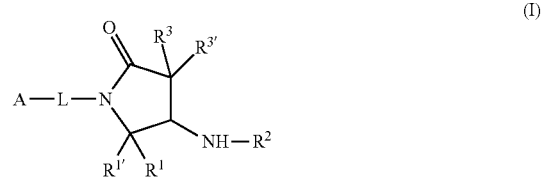

which act as modulators of the glucocorticoid receptor and can be used in the treatment and/or prophylaxis of disorders which are at least partially mediated by the glucocorticoid receptor.

16 Claims, No Drawings

SUBSTITUTED PYRROLIDINE AMIDES IV

This application is a continuation of International Patent Application No. PCT/EP2020/067061, filed Jun. 19, 2020, which, in turn, claims priority of European Patent Application No. 19181197.5, filed Jun. 19, 2019, the entire disclosures of which patent applications are hereby incorporated herein by reference.

The invention relates to compounds according to general formula (I)

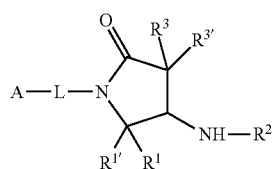

which act as modulators of the glucocorticoid receptor and can be used in the treatment and/or prophylaxis of disorders which are at least partially mediated by the glucocorticoid receptor.

Glucocorticoids (GC) exert strong anti-inflammatory, immunosuppressive and disease-modifying therapeutic effects mediated by the glucocorticoid receptor (GR). They have been widely used to treat inflammatory and immune diseases for decades and still represent the most effective therapy in those conditions. However, chronic GC treatment of inflammatory diseases such as asthma, rheumatoid arthritis, inflammatory bowel disease, chronic obstructive pulmonary disease, acute respiratory distress syndrome, cystic fibrosis, osteoarthritis, polymyalgia rheumatica and giant cell arteritis is hampered by GC-associated adverse effects. These undesired side effects include insulin resistance, diabetes, hypertension, glaucoma, depression, osteoporosis, adrenal suppression and muscle wasting with osteoporosis and diabetes being the most severe ones from the physician's point of view (Hapgood J P. et al., Pharmacol Ther. 2016 September; 165: 93-113; Buttgereit F. el al, Clin Exp Rheumatol. 2015 July-August; 33(4 Suppl 92): S29-33; Hartmann K et al, Physiol Rev. 2016 April; 96(2):409-47).

One example of an oral glucocorticoid is prednisone which is frequently prescribed for the treatment of several inflammatory disorders (De Bosscher K et al., Trends Pharmacol Sci. 2016 January; 37(1):4-16; Buttgereit F. et al., JAMA. 2016; 315(22):2442-2458). As GC cause adrenal suppression, prednisolone withdrawal symptoms can be severe if the drug is discontinued abruptly when all the signs of the disease have disappeared. Thus gradual GC tapering to physiological doses is frequently part of treatment protocols to reduce the risk of relapse and other withdrawal symptoms (Liu D. et al., Allergy Asthma Clin Immunol. 2013 Aug. 15; 9(1):30). Therefore, there is high medical need for novel potent anti-inflammatory drugs with less adverse effects.

Recent research has focused on the development of partial agonists or selective glucocorticoid receptor modulators which activate the pathways for the inhibition of inflammation but avoid targeting the pathways that lead to the GC-associated adverse effects. Most of these effects have been demonstrated to be mediated by different GR-dependent genomic mechanisms termed transactivation and transrepression. The anti-inflammatory actions of GC are mainly attributable to the transrepression of inflammatory genes while certain side effects are predominantly mediated via transactivation of several genes. According to the nature of a ligand the GR can be selectively modulated in a specific conformation which favors transrepression over transactivation resulting in an improved therapeutic benefit (De Bosscher K et al., Trends Pharmacol Sci. 2016 January; 37(1):4-16). The concept of such dissociating ligands was already defined about two decades ago and several compounds have been identified and were evaluated in preclinical and clinical testing but none of them has as yet been approved for clinical use.

Compounds which are active as modulators of the glucocorticoid receptor are also known e.g. from WO 2007/122165, WO 2008/076048 and WO 2008/043789, WO 2009/035067, WO 2009/142571, WO 2016/046260, and WO 2017/034006.

It was an object of the invention to provide novel compounds which are modulators of the glucocorticoid receptor and which preferably have advantages over the compounds of the prior art. The novel compounds should in particular be suitable for use in the treatment and/or prophylaxis of disorders or diseases which are at least partially mediated by the glucocorticoid receptor.

This object has been achieved by the subject-matter of the patent claims.

It was surprisingly found that the compounds according to the invention are highly potent modulators of the glucocorticoid receptor.

The invention relates to a compound according to general formula (I),

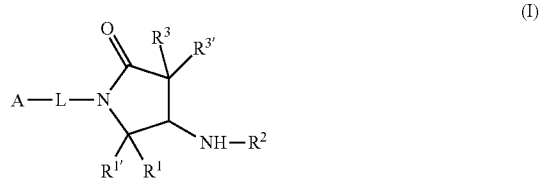

wherein
$R^1$ represents —$C_{1-10}$-alkyl; —$C_{3-10}$-cycloalkyl; —$C_{1-6}$-alkylene-$C_{3-10}$-cycloalkyl; 3 to 7 membered heterocycloalkyl; —$C_{1-6}$-alkylene-(3 to 7 membered heterocycloalkyl); aryl; —$C_{1-6}$-alkylene-aryl; 5 or 6-membered heteroaryl; or —$C_{1-6}$-alkylene-(5 or 6-membered heteroaryl);
$R^{1'}$ represents H; —$C_{1-10}$-alkyl; or —$C_{3-10}$-cycloalkyl;
$R^2$ represents —C(=O)—$C_{1-10}$-alkyl; —C(=O)—$C_{3-10}$-cycloalkyl; —C(=O)—$C_{1-6}$-alkylene-$C_{3-10}$-cycloalkyl; —C(=O)-(3 to 7 membered heterocycloalkyl); —C(=O)—$C_{1-6}$-alkylene-(3 to 7 membered heterocycloalkyl); —C(=O)-aryl; —C(=O)—$C_{1-6}$-alkylene-aryl; —C(=O)-(5 or 6-membered heteroaryl); —C(=O)—$C_{1-6}$-alkylene-(5 or 6-membered heteroaryl); —S(=O)$_{1-2}$—$C_{1-10}$-alkyl; —S(=O)$_{1-2}$—$C_{3-10}$-cycloalkyl; —S(=O)$_{1-2}$—$C_{1-6}$-alkylene-$C_{3-10}$-cycloalkyl; —S(=O)$_{1-2}$-(3 to 7 membered heterocycloalkyl); —S(=O)$_{1-2}$—$C_{1-6}$-alkylene-(3 to 7 membered heterocycloalkyl); —S(=O)$_{1-2}$-aryl; —S(=O)$_{1-2}$—$C_{1-6}$-alkylene-aryl; —S(=O)$_{1-2}$-(5 or 6-membered heteroaryl); or —S(=O)$_{1-2}$—$C_{1-6}$-alkylene-(5 or 6-membered heteroaryl);
$R^3$ and $R^{3'}$ independently from one another represent H; F; Cl; —$C_{1-10}$-alkyl; —$C_{3-6}$-cycloalkyl; —$C_{1-6}$-alkylene-$C_{3-6}$-cycloalkyl; 3 to 7 membered heterocycloalkyl;

—$C_{1-6}$-alkylene-(3 to 7 membered heterocycloalkyl); —$C_{1-6}$-alkylene-aryl; or —$C_{1-6}$-alkylene-(5 or 6-membered heteroaryl);

or $R^3$ and $R^{3'}$ together with the carbon atom to which they are bound form a $C_{3-10}$-cycloalkyl; or 3 to 7 membered heterocycloalkyl;

L represents bond or —$C_{1-6}$-alkylene-;

A represents substructure (S1)

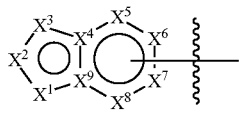

(S1)

wherein $X^1$, $X^2$ and $X^3$ independently from one another represent CH; $CR^4$; N; NH; $NR^4$; O; or S;
wherein at least one of $X^1$, $X^2$ and $X^3$ represents N; NH; $NR^4$; O; or S;
wherein when $X^1$ or $X^3$ represent $NR^4$ and $X^2$ represents CH or N; the remaining $X^1$ or $X^3$ represents $CR^4$
with $R^4$ representing aryl or —$C_{1-6}$-alkylene-aryl;

$X^4$ and $X^9$ independently from one another represent C or N;

$X^5$, $X^6$, $X^7$ and $X^8$ in each case independently from one another represent CH; $CR^4$; N; or C which is connected to L; wherein one of $X^5$, $X^6$, $X^7$ and $X^8$ represents C which is connected to L;

or A represents substructure (S2)

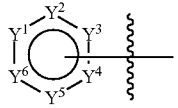

(S2)

wherein $Y^1$, $Y^2$, $Y^3$, $Y^4$, $Y^5$ and $Y^6$ in each case independently from one another represent CH; $CR^4$; N; or C which is connected to L; wherein one of $Y^1$, $Y^2$, $Y^3$, $Y^4$, $Y^5$ and $Y^6$ represents C which is connected to L;

$R^4$ represents —$C_{1-10}$-alkyl; —$C_{1-10}$-alkenyl; —$C_{1-10}$-alkynyl; —$C_{3-6}$-cycloalkyl; —$C_{1-6}$-alkylene-$C_{3-6}$-cycloalkyl; 3 to 7 membered heterocycloalkyl; —$C_{1-6}$-alkylene-(3 to 7 membered heterocycloalkyl); aryl; —$C_{1-6}$-alkylene-aryl; 5 or 6-membered heteroaryl; —$C_{1-6}$-alkylene-(5 or 6-membered heteroaryl); —$S(=O)_{1-2}$—$C_{1-10}$-alkyl; —$S(=O)_{1-2}$—$C_{3-10}$-cycloalkyl; —$S(=O)_{1-2}$-(3 to 7 membered heterocycloalkyl); —$S(=O)_{1-2}$-aryl; or —$S(=O)_{1-2}$-(5 or 6-membered heteroaryl);

wherein if L is bond and A is phenyl, $R^2$ does not represent —$S(=O)_{1-2}$-aryl; and wherein if L is methylene and A is phenyl, $R^{1'}$ does not represent $C_{3-10}$-cycloalkyl;

wherein —$C_{1-10}$-alkyl, —$C_{1-4}$-alkyl, and —$C_{1-6}$-alkylene- in each case independently from one another is linear or branched, saturated or unsaturated;

wherein —$C_{1-10}$-alkyl, —$C_{1-4}$-alkyl, —$C_{1-6}$-alkylene, —$C_{3-10}$-cycloalkyl and 3 to 7 membered heterocycloalkyl in each case independently from one another are unsubstituted or mono- or polysubstituted with one or more substituents selected from —F; —Cl; —Br; —I; —CN; —$CF_3$; —$CF_2H$; —$CFH_2$; —$CF_2Cl$; —$CFCl_2$; —C(=O)—$C_{1-6}$-alkyl; —C(=O)—OH; —C(=O)—$OC_{1-6}$-alkyl; —C(=O)—$NH_2$; —C(=O)—NH($C_{1-6}$-alkyl); —C(=O)—N($C_{1-6}$-alkyl)$_2$; —OH; =O; —$OCF_3$; —$OCF_2H$; —$OCFH_2$; —$OCF_2Cl$; —$OCFCl_2$; —O—$C_{1-6}$alkyl; —O—C(=O)—$C_{1-6}$-alkyl; —O—C(=O)—O—$C_{1-6}$alkyl; —O—(CO)—NH($C_{1-6}$-alkyl); —O—C(=O)—N($C_{1-6}$-alkyl)$_2$; —O—S(=O)$_2$—$NH_2$; —O—S(=O)$_2$—N($C_{1-6}$-alkyl)$_2$; —$NH_2$; —$NH_2$; —NH($C_{1-6}$-alkyl); —N($C_{1-6}$-alkyl)$_2$; —NH—C(=O)—$C_{1-6}$-alkyl; —NH—C(=O)—O—$C_{1-6}$alkyl; —NH—C(=O)—$NH_2$; —NH—C(=O)—NH($C_{1-6}$-alkyl); —NH—C(=O)—N($C_{1-6}$-alkyl)$_2$; —N($C_{1-6}$-alkyl)-C(=O)—$C_{1-6}$-alklkyl; —N($C_{1-6}$-alkyl)-C(=O)—O—$C_{1-6}$-alkyl; —N($C_{1-6}$-alkyl)-C(=O)—$NH_2$; —N($C_{1-6}$-alkyl)-C(=O)—NH($C_{1-6}$-alkyl); —N($C_{1-6}$-alkyl)-C(=O)—N($C_{1-6}$alkyl)$_2$; —NH—S(=O)$_2$OH; NH—S(=O)$_2$-$C_{1-6}$-alkyl; —NH—S(=O)$_2$—O—$C_{1-6}$-alkyl; —NH—S(=O)$_2$—$NH_2$; —NH—S(=O)$_2$—NH($C_{1-6}$-alkyl); —NH—S(=O)$_2$NN($C_{1-6}$-alkyl)$_2$; —N($C_{1-6}$-alkyl)-S(=O))$_2$—OH; —N($C_{1-6}$-alkyl)-S(=O)—$C_{1-6}$alkyl; —N($C_{1-6}$-alkyl)-S—(=O)$_2$O—$C_{1-6}$-alkyl; —N($C_{1-6}$-alkyl)-S(=O)$_2$—$NH_2$; —N($C_{1-6}$-alkyl)-S(=O)$_2$—NH($C_{1-6}$alkyl); —N($C_{1-6}$alkyl)-S(=O)$_2$—N($C_{1-6}$-alkyl)$_2$; —$SCF_3$; —$SCFH_2$; —S—$C_{1-6}$alkyl; —S(=O)—$C_{1-6}$-alkyl; —S(=O)$_2$-$C_{1-6}$-alkyl; —S(=O)$_2$—OH; —S(=O)$_2$-$C_{1-6}$-alkyl; S(=O)$_2$—$NH_2$; —S(=O)$_2$—NH($C_{1-6}$-alkyl); —S(=O)$_2$—N($C_{1-6}$-alkyl)$_2$; —$C_{3-6}$-cycloalkyl; 3 to 6-membered heterocycloalkyl; phenyl; 5 or 6-membered heteroaryl; —O—$C_{3-6}$-cycloalkyl; —O-(3 to 6-membered heterocycloalkyl); —O-phenyl; —O-(5 or 6-membered heteroaryl); —C(=O)—$C_{3-6}$-cycloalkyl; —C(=O)-(3 to 6 membered heterocycloalkyl); —C(=O)-phenyl; —C(=O)-(5 or 6-membered heteroaryl); —S(=O)$_2$($C_{3-6}$-cycloalkyl); —S(=O)$_2$-(3 to 6 membered heterocycloalkyl); —S(=O)$_2$-phenyl or —S(=O)$_2$-(5 or 6-membered heteroaryl);

wherein aryl and 5 or 6-membered heteroaryl in each case independently from one another are unsubstituted or mono- or polysubstituted with one or more substituents selected from —F; —Cl; —Br; —I; —CN; —$CF_3$; —$CF_2H$; —$CFH_2$; —$CF_2Cl$; —$CFCl_2$; —$C_{1-4}$-alkylene-$CF_3$; —$C_{1-4}$-alkylene-$CF_2H$; —$C_{1-4}$-alkylene-$CFH_2$; —C(=O)—$C_{1-6}$-alkyl; —C(=O)—OH; —C(=O)—$OC_{1-6}$-alkyl; —C(=O)—NH(OH); —C(=O)—$NH_2$; —C(=O)—NH($C_{1-6}$-alkyl); —C(=O)—N($C_{1-6}$-alkyl)$_2$; —OH; =O; —$OCF_3$; —$OCF_2H$; —$OCFH_2$; —$OCF_2Cl$; —$OCFCl_2$; —O—$C_{1-6}$-alkyl; —O—$C_{3-6}$-cycloalkyl; —O-(3 to 6-membered heterocycloalkyl); —O-aryl; —O-(5 or 6-membered heteroaryl); —$NH_2$; —NH($C_{1-6}$-alkyl); —N($C_{1-6}$-alkyl)$_2$; —NH—C(=O)—$C_{1-6}$-alkyl; —N($C_{1-6}$-alkyl)-C(=O)—$C_{1-6}$-alkyl; —NH—C(=O)—$NH_2$; —NH—C(=O)—NH($C_{1-6}$-alkyl); —NH—C(=O)—N($C_{1-6}$-alkyl)$_2$; —N($C_{1-6}$-alkyl)-C(=O)—NH($C_{1-6}$-alkyl); —N($C_{1-6}$-alkyl)-C(=O)—N($C_{1-6}$-alkyl)$_2$; —NH—S(=O)$_2$—$C_{1-6}$-alkyl; —$SCF_3$; —S(=O)—$C_{1-6}$-alkyl; —S(=O)$_2$—$C_{1-6}$-alkyl; —S(=O)$_2$—$NH_2$; —S(=O)$_2$—NH($C_{1-6}$-alkyl); —S(=O)$_2$—N($C_{1-6}$-alkyl)$_2$; —$C_{3-6}$-cycloalkyl; —$C_{1-4}$ alkylene-$C_{3-6}$-cycloalkyl; 3 to 6-membered heterocycloalkyl; —$C_{1-4}$-alkylene-(3 to 6-membered heterocycloalkyl); phenyl or 5 or 6-membered heteroaryl;

in the form of the free compound or a physiologically acceptable salt thereof;

with the proviso that N-[rac-((2R,3S)-1-(3-cyclobutyl-1H-indazol-6-yl)-4,4-dimethyl-5-oxo-2-phenylpyrrolidin-3-yl)]cyclopropanecarboxamide is excluded.

In a preferred embodiment, the compound according to the invention is present in form of the free compound. For the purpose of specification, "free compound" preferably means that the compound according to the invention is not present in form of a salt. Methods to determine whether a chemical substance is present as the free compound or as a salt are known to the skilled artisan such as $^{14}$N or $^{15}$N solid state NMR, x-ray diffraction, x-ray powder diffraction, IR, Raman, XPS. $^{1}$H-NMR recorded in solution may also be used to consider the presence of protonation.

In another preferred embodiment, the compound according to the invention is present in form of a physiologically acceptable salt. For the purposes of this specification, the term "physiologically acceptable salt" preferably refers to a salt obtained from a compound according to the invention and a physiologically acceptable acid or base.

According to the invention, the compound according to the invention may be present in any possible form including solvates, cocrystals and polymorphs. For the purposes of this specification, the term "solvate" preferably refers to an adduct of (i) a compound according to the invention and/or a physiologically acceptable salt thereof with (ii) distinct molecular equivalents of one or more solvents.

Further, the compound according to the invention may be present in form of the racemate, enantiomers, diastereomers, tautomers or any mixtures thereof.

The invention also includes isotopic isomers of a compound of the invention, wherein at least one atom of the compound is replaced by an isotope of the respective atom which is different from the naturally predominantly occurring isotope, as well as any mixtures of isotopic isomers of such a compound. Preferred isotopes are $^{2}$H (deuterium), $^{3}$H (tritium), $^{13}$C and $^{14}$C. Isotopic isomers of a compound of the invention can generally be prepared by conventional procedures known to a person skilled in the art.

According to the invention, the terms "—$C_{1-10}$-alkyl", "—$C_{1-8}$-alkyl", "—$C_{1-6}$-alkyl" and "—$C_{1-4}$-alkyl" preferably mean acyclic saturated or unsaturated aliphatic (i.e. non-aromatic) hydrocarbon residues, which can be linear (i.e. unbranched) or branched and which can be unsubstituted or mono- or polysubstituted (e.g. di- or trisubstituted), and which contain 1 to 10 (i.e. 1, 2, 3, 4, 5, 6, 7, 8, 9 or 10), 1 to 8 (i.e. 1, 2, 3, 4, 5, 6, 7 or 8), 1 to 6 (i.e. 1, 2, 3, 4, 5 or 6) and 1 to 4 (i.e. 1, 2, 3 or 4) carbon atoms, respectively. In a preferred embodiment, —$C_{1-10}$-alkyl, —$C_{1-8}$-alkyl, —$C_{1-6}$-alkyl and —$C_{1-4}$-alkyl are saturated.

Preferred —$C_{1-10}$-alkyl groups are selected from methyl, ethyl, ethenyl (vinyl), n-propyl, 2-propyl, 1-propynyl, 2-propynyl, propenyl (—CH$_2$CH═CH$_2$, —CH═CH—CH$_3$, —C(═CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl, 2-hexyl, 3-hexyl, 2-methylpentyl, 4-methylpentyl, 4-methylpent-2-yl, 2-methylpent-2-yl, 3,3-dimethylbutyl, 3,3-dimethylbut-2-yl, 3-methylpentyl, 3-methylpent-2-yl and 3-methylpent-3-yl; more preferably methyl, ethyl, n-propyl, 2-propyl, 1-propynyl, 2-propynyl, propenyl (—CH$_2$CH═CH$_2$, —CH═CH—CHs, —C(═CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl, n-heptyl, n-octyl, n-nonyl and n-decyl. Particularly preferred —$C_{1-10}$-alkyl groups are selected from $C_{1-4}$-alkyl groups.

Preferred —$C_{1-8}$-alkyl groups are selected from methyl, ethyl, ethenyl (vinyl), n-propyl, 2-propyl, 1-propynyl, 2-propynyl, propenyl (—CH$_2$CH═CH$_2$, —CH═CH—CH$_3$, —C(═CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-pentynyl, 2-methylbutyl, 3-methylbutyl, 3-methylbut-2-yl, 2-methylbut-2-yl, 3-methylbut-1-ynyl, 2,2-dimethylpropyl, n-hexyl, 2-hexyl, 3-hexyl, 2-methylpentyl, 4-methylpentyl, 4-methylpent-2-yl, 2-methylpent-2-yl, 3,3-dimethylbutyl, 3,3-dimethylbut-2-yl, 3-methylpentyl, 3-methylpent-2-yl and 3-methylpent-3-yl; more preferably methyl, ethyl, n-propyl, 2-propyl, 1-propynyl, 2-propynyl, propenyl (—CH$_2$—CH═CH$_2$, —CH═CH—CH$_3$, —C(═CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-pentynyl, 2-penlynyl, 2-methylbutyl, 3-methylbutyl, 3-methylbut-2-yl, 2-methylbut-2-yl, 3-methylbut-1-ynyl, 2,2-dimethylpropyl, n-hexyl, n-heptyl and n-octyl. Particularly preferred —$C_{1-8}$-alkyl groups are selected from $C_{1-4}$-alkyl groups.

Preferred —$C_{1-6}$-alkyl groups are selected from methyl, ethyl, ethenyl (vinyl), n-propyl, 2-propyl, n-butyl, isobutyl, sec-butyl, tert-butyl, n-pentyl, 2-pentyl, 3-pentyl, 2-methylbutyl, 3-methylbutyl, 3-methylbut-2-yl, 2-methylbut-2-yl, 2,2-dimethylpropyl, n-hexyl, 2-hexyl, 3-hexyl, 2-methylpentyl, 4-methylpentyl, 4-methylpent-2-yl, 2-methylpent-2-yl, 3,3-dimethylbutyl, 3,3-dimethylbut-2-yl, 3-methylpentyl, 3-methylpent-2-yl and 3-methylpent-3-yl; more preferably methyl, ethyl, n-propyl, 2-propyl, 1-propynyl, 2-propynyl, propenyl (—CH$_2$—CH═CH$_2$, —CH═CH—CH$_3$, —C(═CH$_2$)—CH$_3$), n-butyl, 1-butynyl, 2-butynyl, 1-butenyl, 2-butenyl, isobutyl, sec-butyl, tert-butyl, n-pentyl, 2-pentyl, 3-pentyl, 1-pentenyl, 2-pentenyl, 1-penlynyl, 2-penlynyl, 2-methylbutyl, 3-methylbutyl, 3-methylbut-2-yl, 2-methylbut-2-yl, 3-methylbut-1-ynyl, 2,2-dimethylpropyl, n-hexyl. Particularly preferred —$C_{1-6}$-alkyl groups are selected from $C_{1-4}$-alkyl groups.

Preferred —$C_{1-4}$-alkyl groups are selected from methyl, ethyl, ethenyl (vinyl), n-propyl, 2-propyl, 1-propynyl, 2-propynyl, propenyl (—CH$_2$CH═CH$_2$, —CH═CH—CH$_3$, —C(═CH$_2$)—CH$_3$), n-butyl, 1-butynyl, 2-butynyl, 1-butenyl, 2-butenyl, isobutyl, sec-butyl, tert-butyl and 3-methylbut-1-ynyl. More preferred —$C_{1-4}$-alkyl groups are selected from methyl, ethyl, n-propyl, 2-propyl, 1-propynyl, 2-propynyl, n-butyl, isobutyl, sec-butyl, and tert-butyl.

Further according to the invention, the terms "—$C_{1-6}$-alkylene-"; "—$C_{1-4}$-alkylene" and "—$C_{1-2}$-alkylene" relate to a linear or branched, preferably linear, and preferably saturated aliphatic residues which are preferably selected from the group consisting of methylene (—CH$_2$—), ethylene (—CH$_2$CH$_2$—), propylene (—CH$_2$CH$_2$CH$_2$— or —C(CH$_3$)$_2$—), butylene (—CH$_2$CH$_2$CH$_2$CH$_2$—), pentylene (—CH$_2$CH$_2$CH$_2$CH$_2$CH$_2$—) and hexylene (—CH$_2$CH$_2$CH$_2$CH$_2$CH$_2$CH$_2$—); more preferably methylene (—CH$_2$—) and ethylene (—CH$_2$CH$_2$—) and most preferably methylene (—CH$_2$—). Preferably, —$C_{1-6}$-alkylene- is selected from —$C_{1-4}$-alkylene-, more preferably from —$C_{1-2}$-alkylene.

Still further according to the invention, the terms "—$C_{3-10}$-cycloalkyl" and "—$C_{3-6}$-cycloalkyl" preferably mean cyclic aliphatic hydrocarbons containing 3, 4, 5, 6, 7, 8, 9 or 10 carbon atoms and 3, 4, 5 or 6 carbon atoms, respectively, wherein the hydrocarbons in each case can be saturated or unsaturated (but not aromatic), unsubstituted or mono- or poly substituted.

Preferably, —$C_{3-10}$-cycloalkyl and —$C_{3-6}$-cycloalkyl are saturated. The —$C_{3-10}$-cycloalkyl and —$C_{3-6}$-cycloalkyl can be bound to the respective superordinate general structure via any desired and possible ring member of the cycloalkyl group. The —$C_{3-10}$-cycloalkyl and —$C_{3-6}$-cycloalkyl groups can also be condensed with further saturated, (partially) unsaturated, (hetero)cyclic, aromatic or heteroaromatic ring systems, i.e. with cycloalkyl, heterocyclyl, aryl or heteroalyl residues, which in each case can in turn be unsubstituted or mono- or polysubstituted. Further, —$C_{3-10}$-cycloalkyl and —$C_{3-6}$-cycloalkyl can be singly or multiply bridged such as, for example, in the case of adamantyl, bicyclo[2.2.1]heptyl or bicyclo[2.2.2]octyl. However, preferably, —$C_{3-10}$-cycloalkyl and —$C_{3-6}$-cycloalkyl are neither condensed with further ring systems nor bridged. More preferably, —$C_{3-10}$-cycloalkyl and —$C_{3-6}$-cycloalkyl are neither condensed with further ring systems nor bridged and are saturated. Preferred —$C_{3-10}$-cycloalkyl groups are selected from the group consisting of cyclopropyl, cyclobutyl, cyclopenlyl, cyclohexyl, cyclopentenyl, cyclohexenyl, cycloheptyl, cyclooctyl, cyclononyl, cyclodecyl, adamantyl, cyclopentenyl, cyclohexenyl, cycloheptenyl and cyclooctenyl. Particularly preferred —$C_{3-10}$-cycloalkyl groups are selected from —$C_{3-6}$-cycloalkyl groups.

Preferred —$C_{3-6}$-cycloalkyl groups are selected from the group consisting of cyclopropyl, cyclobutyl, cyclopenlyl, cyclohexyl, cyclopentenyl and cyclohexenyl. Particularly preferred —$C_{3-6}$-cycloalkyl groups are selected from the group consisting of cyclopropyl, cyclobutyl, cyclopentyl and cyclohexyl, most preferably cyclopropyl and cyclobutyl.

According to the invention, the terms "3 to 7-membered heterocycloalkyl" and "3 to 6-membered heterocycloalkyl" preferably mean heterocycloaliphatic saturated or unsaturated (but not aromatic) residues having 3 to 7, i.e. 3, 4, 5, 6 or 7 ring members and 3 to 6, i.e. 3, 4, 5 or 6 ring members, respectively, wherein in each case at least one, if appropriate also two or three carbon atoms are replaced by a heteroatom or a heteroatom group each selected independently of one another from the group consisting of O, S, S(=O), S(=O)$_2$, N, NH and N($C_{1-4}$-alkyl) such as N(CH$_3$), wherein the carbon atoms of the ring can be unsubstituted or mono- or polysubstituted. Preferably, the 3 to 7-membered heterocycloalkyl and the 3 to 6-membered heterocycloalkyl contain only one heteroatom or heteroatom group within the ring.

Preferably, 3 to 7-membered heterocycloalkyl and 3 to 6-membered heterocycloalkyl are saturated. The 3 to 7-membered heterocycloalkyl and the 3 to 6-membered heterocycloalkyl groups can also be condensed with further saturated or (partially) unsaturated cycloalkyl or heterocyclyl, aromatic or heteroaromatic ring systems. However, more preferably, 3 to 7-membered heterocycloalkyl and 3 to 6-membered heterocycloalkyl are not condensed with further ring systems. Still more preferably, 3 to 7-membered heterocycloalkyl and 3 to 6-membered heterocycloalkyl are not condensed with further ring systems and are saturated. The 3 to 7-membered heterocycloalkyl and the 3 to 6-membered heterocycloalkyl group can be bound to the superordinate general structure via any desired and possible ring member of the heterocycloaliphatic residue if not indicated otherwise. In a preferred embodiment, 3 to 7-membered heterocycloalkyl and 3 to 6-membered heterocycloalkyl are bound to the superordinate general structure via a carbon atom.

Preferred 3 to 7-membered heterocycloalkyl groups are selected from the group consisting of tetrahydrofuranyl, azepanyl, dioxepanyl, oxazepanyl, diazepanyl, thiazolidinyl, tetrahydrothiophenyl, tetrahydropyridinyl, thiomorpholinyl, tetrahydropyranyl, oxetanyl, oxiranyl, morpholinyl, pyrrolidinyl, 4-methyl-piperazinyl, morpholinonyl, azetidinyl, aziridinyl, dithiolanyl, dihydropyrrolyl, dioxanyl, dioxolanyl, dihydropyridinyl, dihydrofuranyl, dihydroisoxazolyl, dihydrooxazolyl, imidazolidinyl, isoxazolidinyl, oxazolidinyl, piperazinyl, piperidinyl, N-methylpyridinonyl, pyrazolidinyl, pyranyl; tetrahydropyrrolyl, dihydroquinolinyl, dihydroisoquinolinyl, dihydroindolinyl, dihydroisoindolyl, tetrahydroquinolinyl, tetrahydroisoquinolinyl and tetrahydroindolinyl. Particularly preferred 3 to 7-membered heterocycloalkyl groups are selected from 3 to 6-membered heterocycloalkyl groups.

Preferred 3 to 6-membered heterocycloalkyl groups are selected from the group consisting of tetrahydrofuranyl, tetrahydropyranyl, oxetanyl, oxiranyl, thiazolidinyl, tetrahydrothiophenyl, tetrahydropyridinyl, thiomorpholinyl, morpholinyl, pyrrolidinyl, 4-methylpiperazinyl, morpholinonyl, azetidinyl, aziridinyl, dithiolanyl, dihydropyrrolyl, dioxanyl, dioxolanyl, dihydropyridinyl, dihydrofuranyl, dihydroisoxazolyl, dihydrooxazolyl, imidazolidinyl, isoxazolidinyl, oxazolidinyl, piperazinyl, piperidinyl, N-methylpyridinonyl, pyrazolidinyl, pyranyl, tetrahydropyrrolyl, dihydroindolinyl, dihydroisoindolyl and tetrahydroindolinyl. More preferred 3 to 6-membered heterocycloalkyl groups are selected from the group consisting of N-methylpyridinonyl, tetrahydrofuranyl, tetrahydropyranyl, oxetanyl, and oxiranyl; still more preferably N-methylpyridinonyl.

According to the invention, the term "acyl" preferably means aromatic hydrocarbons having 6 to 14, i.e. 6, 7, 8, 9, 10, 11, 12, 13 or 14 ring members, preferably having 6 to 10, i.e. 6, 7, 8, 9 or 10 ring members, including phenyls and naphthyls. Each aryl residue can be unsubstituted or mono- or polysubstituted. The aryl can be bound to the superordinate general structure via any desired and possible ring member of the aryl residue. The aryl residues can also be condensed with further saturated or (partially) unsaturated cycloalkyl or heterocycloalkyl, aromatic or heteroaromatic ring systems, which can in turn be unsubstituted or mono- or polysubstituted. In a preferred embodiment, aryl is condensed with a further ring system. Examples of condensed aryl residues are 2H-benzo[b][1,4]oxazin-3 (4H)-onyl, 1H-benzo[d]imidazolyl, 2,3-dihydro-1H-indenyl, tetrahydronaphthalenyl, isochroman, 1,3-dihydroisobenzofuranyl, benzodioxolanyl and benzodioxanyl. In another preferred embodiment, aryl is not condensed with any further ring system.

Preferably, aryl is selected from the group consisting of phenyl, benzodioxanyl, 1H-benzo[d]imidazolyl, 2H-benzo[b][1,4]oxazin-3 (4H)-onyl, 2,3-dihydro-1H-indenyl, tetrahydronaphthalenyl, isochroman, 1,3-dihydroiso-benzofuranyl, 1-naphthyl, 2-naphthyl, fluorenyl and anthracenyl, each of which can be respectively unsubstituted or mono- or polysubstituted. A particularly preferred aryl is phenyl or benzodioxanyl, in each case unsubstituted or mono- or poly substituted.

According to the invention, the term "5- to 6-membered heteroaryl" preferably means a 5 or 6-membered cyclic aromatic residue containing at least 1, if appropriate also 2, 3, 4 or 5 heteroatoms, wherein the heteroatoms are each selected independently of one another from the group S, N and O and the heteroaryl residue can be unsubstituted or mono- or polysubstituted, if not indicated otherwise. In the case of substitution on the heteroaryl, the substituents can be the same or different and be in any desired and possible position of the heteroaryl. The binding to the superordinate general structure can be carried out via any desired and possible ring member of the heteroaryl residue if not indicated otherwise. Preferably, the 5- to 6-membered heteroaryl is bound to the suprordinate general structure via a carbon atom of the heterocycle. The heteroaryl can also be part of a bi- or polycyclic system having up to 14 ring members, wherein the ring system can be formed with further saturated or (partially) unsaturated cycloalkyl or heterocycloalkyl, aromatic or heteroaromatic ring systems, which can in turn be unsubstituted or mono- or polysubstituted, if not indicated otherwise. In a preferred embodiment, the 5- to 6-membered heteroaryl is part of a bi- or polycyclic, preferably bicyclic, system. In another preferred embodiment, the 5- to 6-membered heteroaryl is not part of a bi- or polycyclic system.

Preferably, the 5- to 6-membered heteroaryl is selected from the group consisting of pyridyl (i.e. 2-pyridyl, 3-pyridyl, 4-pyridyl), N-methylpyridinonyl, thiazolyl, oxazolyl, isoxazolyl, pyrazolyl, oxadiazolyl, pyridone (pyridinone), pyrimidinyl, pyridazinyl, pyrazinyl, pyrrolyl, imidazolyl, isothiazolyl, furanyl, thienyl (thiophenyl), triazolyl, thiadiazolyl, 4,5,6,7-tetrahydro-2H-indazolyl, 2,4,5,6-tetrahydrocyclopenta[c]pyrazolyl, benzofuranyl, benzoimidazolyl, benzothienyl, benzothiadiazolyl, benzothiazolyl, benzotriazolyl, benzooxazolyl, benzooxadiazolyl, quinazolinyl, quinoxalinyl, carbazolyl, quinolinyl, dibenzofuranyl, dibenzothienyl, imidazothiazolyl, indazolyl, indolizinyl, indolyl, isoquinolinyl, naphthyridinyl, oxazolyl, phenazinyl, phenothiazinyl, phthalazinyl, purinyl, phenazinyl, tetrazolyl and triazinyl. Particularly preferred 5- to 6-membered heteroaryl are selected from the group consisting of pyridyl (i.e. 2-pyridyl, 3-pyridyl, 4-pyridyl), N-methylpyridinonyl, thiazolyl, oxazolyl, isoxazolyl, pyrazolyl, and oxadiazolyl. As pyridones can be regarded as pyridines that are substituted with =O, for the purpose of the specification the definition of pyridines that may optionally be substituted with =O covers pyridones.

The compounds according to the invention are defined by substituents, for example by $R^1$, $R^2$ and $R^3$ ($1^{st}$ generation substituents) which may optionally be for their part themselves be substituted ($2^{nd}$ generation substituents). Depending on the definition, these substituents of the substituents can optionally be for their part resubstituted ($3^{rd}$ generation substituents). If, for example, $R^1$=phenyl ($1^{st}$ generation substituent), then the phenyl can for its part be substituted, for example with —$C_{1-6}$-alkyl ($2^{nd}$ generation substituent). This produces the functional group $R^1$=phenyl-$C_{1-6}$-alkyl. The —$C_{1-6}$-alkyl can then for its part be resubstituted, for example with —F ($3^{rd}$ generation substituent). Overall, this produces the functional group $R^1$=phenyl-$C_{1-6}$-alkyl, wherein the —$C_{1-6}$-alkyl is substituted with —F.

However, in a preferred embodiment, the $3^{rd}$ generation substituents may not be resubstituted, i.e. there are then no $4^{th}$ generation substituents. More preferably, the $2^{nd}$ generation substituents may not be resubstituted, i.e. there are no $3^{rd}$ generation substituents.

If a residue occurs multiply within a molecule, then this residue can have respectively different meanings for various substituents: if, for example, both $R^3$ and $R^{3+}$ denote —$C_{1-10}$-alkyl, then —$C_{1-10}$-alkyl can e.g. represent ethyl for $R^3$ and can represent methyl for $R^{3'}$.

In connection with the terms "—$C_{1-10}$-alkyl", "—$C_{1-6}$-alkyl", "—$C_{1-4}$-alkyl", "—$C_{3-10}$-cycloalkyl", "—$C_{3-6}$-cyclo-alkyl", "3 to 7 membered heterocycloalkyl", "3 to 6-membered heterocycloalkyl", "—$C_{1-6}$-alkylene-", "—$C_{1-4}$-alkylene-" and "—$C_{1-2}$-alkylene-", the term "substituted" refers in the sense of the invention, with respect to the corresponding residues or groups, to the single substitution (monosubstitution) or multiple substitution (polysubstitution), e.g. disubstitution or trisubstitution; more preferably to monosubstitution or disubstitution; of one or more hydrogen atoms each independently of one another by at least one substituent. In case of a multiple substitution, i.e. in case of poly substituted residues, such as di- or trisubstituted residues, these residues may be poly substituted either on different or on the same atoms, for example trisubstituted on the same carbon atom, as in the case of —$CF_3$, —$CH_2CF_3$ or disubstituted as in the case of 1,1-difluorocyclohexyl, or at various points, as in the case of —CH(OH)—CH=CH—$CHCl_2$ or 1-chloro-3-fluorocyclohexyl. The multiple substitution can be carried out using the same or using different substituents.

In relation to the terms "aryl" and "5- to 6-membered heteroaryl", the term "substituted" refers in the sense of this invention to the single substitution (monosubstitution) or multiple substitution (polysubstitution), e.g. disubstitution or trisubstitution, of one or more hydrogen atoms each independently of one another by at least one substituent. The multiple substitution can be carried out using the same or using different substituents.

According to the invention, preferably —$C_{1-10}$-alkyl-, —$C_{1-6}$-alkyl, —$C_{3-10}$-cycloalkyl, —$C_{3-6}$-cyclo-alkyl, 3 to 7 membered heterocycloalkyl, 3 to 6-membered heterocycloalkyl, —$C_{1-6}$-alkylene-, —$C_{1-4}$-alkylene- and —$C_{1-2}$-alkylene- in each case independently from one another are unsubstituted or mono- or polysubstituted with one or more substituents selected from —F; —Cl; —Br; —I; —CN; —$C_{1-6}$-alkyl; —$CF_3$; —$CF_2H$; —$CFH_2$; —$CF_2Cl$; —$CFCl_2$; —C(=O)—$C_{1-6}$-alkyl; —C(=O)—OH; —C(=O)—O$C_{1-6}$-alkyl; —C(=O)—$NH_2$; —C(=O)—NH($C_{1-6}$-alkyl); —C(=O)—N($C_{1-6}$-alkyl)$_2$; —OH; =O; —$OCF_3$; —$OCF_2H$; —$OCFH_2$; —$OCF_2Cl$; —$OCFCl_2$; —O—$C_{1-6}$-alkyl; —O—C(=O)—$C_{1-6}$-alkyl; —O—(C=O)—O—$C_{1-6}$-alkyl; —O—(CO)—NH($C_{1-6}$-alkyl); —O—C(=O)—N($C_{1-6}$-alkyl)$_2$; —O—S(=O)$_2$—$NH_2$; —O—S(=O)$_2$—NH($C_{1-6}$-alkyl); —O—S(=O)$_2$—N($C_{1-6}$-alkyl)$_2$; —$NH_2$; —NH($C_{1-6}$-alkyl); —N($C_{1-6}$-alkyl)$_2$; —NH—C(=O)—$C_{1-6}$-alkyl; —NH—C(=O)—O—$C_{1-6}$-alkyl; —NH—C(=O)—$NH_2$; —NH—C(=O)—NH($C_{1-6}$-alkyl); —NH—C(=O)—N($C_{1-6}$-alkyl)$_2$; —N($C_{1-6}$-alkyl)-C(=O)—$C_{1-6}$-alkyl; —N($C_{1-6}$-alkyl)-C(=O)—O—$C_{1-6}$-alkyl; —N($C_{1-6}$-alkyl)-C(=O)—$NH_2$; —N($C_{1-6}$-alkyl)-C(=O)—NH($C_{1-6}$-alkyl); —N($C_{1-6}$-alkyl)-C(=O)—N($C_{1-6}$-alkyl)$_2$; —NH—S(=O)$_2$OH; NH—S(=O)$_2$—$C_{1-6}$-alkyl; —NH—S(=O)$_2$—O—$C_{1-6}$-alkyl; —NH—S(=O)$_2$—$NH_2$; —NH—S(=O)$_2$—NH($C_{1-6}$-alkyl); —NH—S(=O)$_2$N($C_{1-6}$-alkyl)$_2$; —N($C_{1-6}$-alkyl)-S(=O)$_2$—OH; —N($C_{1-6}$-alkyl)-S(=O)$_2$—$C_{1-6}$-alkyl; —N($C_{1-6}$-alkyl)-S(=O)$_2$—O—$C_{1-6}$alkyl; —N($C_{1-6}$-alkyl)-S(=O)$_2$—$NH_2$; —N($C_{1-6}$-alkyl)-S(=O)$_2$—NH($C_{1-6}$-alkyl); —N($C_{1-6}$-alkyl)-S(=O)$_2$—N($C_{1-6}$-alkyl)$_2$; —$SCF_3$; —$SCF_2H$; —$SCFH_2$; —S—$C_{1-6}$-alkyl; —S(=O)—$C_{1-6}$-alkyl; —S(=O)$_2$—$C_{1-6}$-alkyl; —S(=O)$_2$—OH; —S(=O)$_2$—O—$C_{1-6}$- alkyl; S(=O)$_2$—$NH_2$; —S(=O)$_2$—NH($C_{1-6}$-alkyl); —S(=O)$_2$—N($C_{1-6}$-alkyl)$_2$; —$C_{3-6}$-cycloalkyl; 3 to 6-membered heterocycloalkyl; phenyl; 5 or 6-membered heteroaryl; —O—$C_{3-6}$-cycloalkyl; —O-(3 to 6-membered heterocycloalkyl); —O-phenyl; —O-(5 or 6-membered heteroaryl); —C(=O)—$C_{3-6}$-cycloalkyl; —C(=O)-(3 to 6-membered heterocycloalkyl); —C(=O)-phenyl; —C(=O)-(5 or 6-membered heteroaryl); —S(=O)$_2$—($C_{3-6}$-cycloalkyl);

—S(=O)₂-(3 to 6-membered heterocycloalkyl); —S(=O)₂-phenyl or —S(=O)₂-(5 or 6-membered heteroaryl).

Preferred substituents of —C$_{1-10}$-alkyl, —C$_{1-6}$-alkyl, —C$_{3-10}$-cycloalkyl, —C$_{3-6}$-cycloalkyl, 3 to 7 membered heterocycloalkyl, 3 to 6-membered heterocycloalkyl, —C$_{1-6}$-alkylene- and —C$_{1-4}$-alkylene- are selected from the group consisting of —F; —Cl; —Br; —I; —CN; —C$_{1-6}$-alkyl; —CF₃; —CF₂H; —CFH₂; —C(=O)—NH₂; —C(=O)—NH(C$_{1-6}$-alkyl); —C(=O)—N(C$_{1-6}$-alkyl)₂; =O; —OH; —OCF₃; —OCF₂H; —OCFH₂; —O—C$_{1-6}$-alkyl; —NH₂; —NH(C$_{1-6}$-alkyl); —N(C$_{1-6}$-alkyl)₂; —SCF₃; —SCF₂H; —SCFH₂; —S—C$_{1-6}$-alkyl; —S(=O)—C$_{1-6}$-alkyl; —S(=O)₂—C$_{1-6}$-alkyl; —C$_{3-6}$-cycloalkyl; 3 to 6-membered heterocycloalkyl; phenyl and 5 or 6-membered heteroaryl; and particularly preferably —F, —CN, —CH₃, —CH₂CH₃, —CF₃; —CF₂H; —CFH₂; —C(=O)—NH₂; —C(=O)—NH(CH₃); —C(=O)—N(CH₃)₂; =O, —OH, —NH₂, —O—C$_{1-3}$, —SCH₃, —S(=O)₂(CH₃), —S(=O)(CH₃), —N(CH₃)₂, cyclopropyl and oxetanyl. According to this embodiment, —C$_{1-10}$-alkyl, —C$_{1-6}$-alkyl, —C$_{1-4}$-alkyl, —C$_{3-10}$-cycloalkyl, —C$_{3-6}$-cycloalkyl, 3 to 7 membered heterocycloalkyl, 3 to 6-membered heterocycloalkyl are preferably each independently from one another unsubstituted, mono- di- or trisubstituted, more preferably unsubstituted or monosubstituted or disubstituted with a substituent selected from the group consisting of —F; —Cl; —Br; —I; —CN; —C$_{1-6}$-alkyl; —CF₃; —CF₂H; —CFH₂; —C(=O)—NH₂; —C(=O)—NH(C$_{1-6}$-alkyl); —C(=O)—N(C$_{1-6}$-alkyl)₂; =O; —OH; —OCF₃; —OCF₂H; —OCFH₂; —O—C$_{1-6}$-alkyl; —NH₂; —NH(C$_{1-6}$-alkyl); —N(C$_{1-6}$-alkyl)₂; —SCF₃; —SCF₂H; —SCFH₂; —S—C$_{1-6}$-alkyl; —S(=O)—C$_{1-6}$-alkyl; —S(=O)₂—C$_{1-6}$-alkyl; —C$_{3-6}$-cycloalkyl; 3 to 6-membered heterocycloalkyl; phenyl and 5 or 6-membered heteroaryl; more preferably —F; —Cl; —Br; —CN; —C$_{1-6}$-alkyl; —CF₃; —CF₂H; —CFH₂; =O; —OH; —OCF₃; —OCF₂H; and —OCFH₂; and particularly preferably —F; —Cl; —Br; and =O. Preferably, —C$_{1-6}$-alkylene- groups and —C$_{1-4}$-alkylene-groups are unsubstituted.

According to the invention, preferably aryl and 5 or 6-membered heteroaryl in each case independently from one another are unsubstituted or mono- or polysubstituted; preferably unsubstituted, mono- di- or trisubstituted, still more preferably unsubstituted or monosubstituted or disubstituted; with one or more substituents selected from —F; —Cl; —Br; —I; —CN; —C$_{1-6}$-alkyl; —CF₃; —CF₂H; —CFH₂; —CF₂Cl; —CFCl₂; —C$_{1-4}$-alkylene-CF₃; —C$_{1-4}$-alkylene-CF₂H; —C$_{1-4}$alkylene-CFH₂; —C(=O)—C$_{1-6}$-alkyl; —C(=O)—OH; —C(=O)—OC$_{1-6}$-alkyl; —C(=O)—NH(OH); —C(=O)—NH₂; —C(=O)—NH(C$_{1-6}$-alkyl); —C(=O)—N(C$_{1-6}$-alkyl)₂; —OH; =O; —OCF₃; —OCF₂H; —OCFH₂; —OCF₂C$_l$; —OCFC$_{1-2}$; —O—C$_{1-6}$-alkyl; —O—C$_{3-6}$-cycloalkyl; —O-(3 to 6-membered heterocycloalkyl); —O-aryl; —O-(5 or 6-membered heteroaryl); —NH₂; —NH(C$_{1-6}$-alkyl); —N(C$_{1-6}$-alkyl)₂; —NH—C(=O)—C$_{1-6}$-alkyl; —N(C$_{1-6}$-alkyl)-C(=O)—C$_{1-6}$-alkyl; —NH—C(=O)—NH₂; —NH—C(=O)—NH(C$_{1-6}$-alkyl); —NH—C(=O)—N(C$_{1-6}$-alkyl)₂; —N(C$_{1-6}$-alkyl)-C(=O)—NH(C$_{1-6}$-alkyl); —N(C$_{1-6}$-alkyl)-C(=O)—N(C$_{1-6}$-alkyl)₂; —NH—S(=O)₂—C$_{1-6}$-alkyl; —SCF₃; —S—C$_{1-6}$-alkyl; —S(=O)—C$_{1-6}$-alkyl; —S(=O)₂—C$_{1-6}$-alkyl; —S(=O)₂—NH₂; —S(=O)₂—NH(C$_{1-6}$-alkyl); —S(=O)₂—N(C$_{1-6}$-alkyl)₂; —C$_{3-6}$-cycloalkyl; —C$_{1-4}$-alkylene-C$_{3-6}$-cycloalkyl; 3 to 6-membered heterocycloalkyl; —C$_{1-4}$-alkylene-(3 to 6-membered heterocycloalkyl); phenyl and 5 or 6-membered heteroaryl.

Preferred substituents of aryl and 5 or 6-membered heteroaryl are selected from the group consisting of —F; —Cl; —Br; —I; —CN; —C$_{1-6}$-alkyl; —CF₃; —CF₂H; —CFH₂; —C$_{1-4}$-alkylene-CF₃; —C$_{1-4}$-alkylene-CF₂H; —C$_{1-4}$-alkylene-CFH₂; —OH; =O; —OCF₃; —OCF₂H; —OCFH₂; —O—C$_{1-6}$-alkyl; —O—C$_{3-6}$-cycloalkyl; —C$_{3-6}$-cycloalkyl; and —S(=O)₂—C$_{1-6}$-alkyl; and more preferably of —F; —Cl; —Br; —CN; —CH₃; —CH₂CH₃; —CF₃; —CF₂H; —CFH₂; —CH₂—CF₃; —OH; =O; —OCF₃; —OCF₂H; —OCFH₂; —O—CH₃; —O-cyclopropyl; cyclopropyl; and —S(=O)₂—CH₃; still more preferably —F; —Cl; —Br; —CH₃; —CH₂CH₃; —CF₃; —CF₂H; —CFH₂; —OH; =O, —OCF₃; —O—CH₃; and —S(=O)₂—CH₃; and particularly preferably preferably —F; —Cl; —Br; —CH₃; —O—CH₃; =O; and —S(=O)₂—CH₃. According to this embodiment, aryl and 5 or 6-membered heteroaryl are preferably each independently from one another unsubstituted, mono- di- or trisubstituted, more preferably unsubstituted or monosubstituted or disubstituted with a substituent selected from the group consisting of —F; —Cl; —Br; —I; —CN; —C$_{1-6}$-alkyl; —CF₃; —CF₂H; —CFH₂; —C$_{1-4}$-alkylene-CF₃; —C$_{1-4}$-alkylene-CF₂H; —C$_{1-4}$-alkylene-CFH₂; —OH; =O, —OCF₃; —OCF₂H; —OCFH₂; —O—C$_{1-6}$-alkyl; —O—C$_{3-6}$-cycloalkyl; —C$_{3-6}$-cycloalkyl; and —S(=O)₂—C$_{1-6}$-alkyl. A preferred substituted 5 or 6-membered heteroaryl is N-methyl-2-oxo-pyridyl.

In a preferred embodiment, the compound according to the invention has a stereochemistry according to general formula (II), (III), (IV), (V), (VI), (VII), (VIII), or (IX)

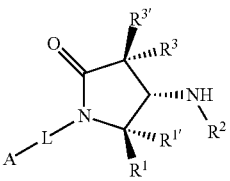

(II)

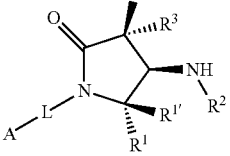

(III)

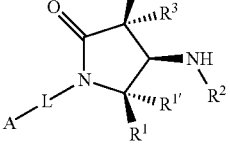

(IV)

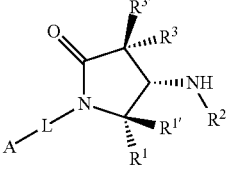

(V)

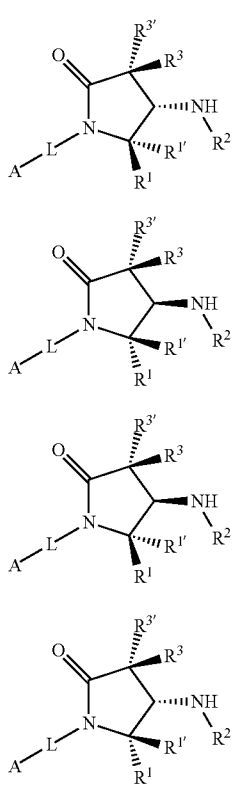

In a preferred embodiment, the compound according to the invention has a stereochemistry according to general formula (II), (III), (VI) or (VII), such that the residues —R' and —NH—R² on the pyrrolidone ring are oriented trans. Preferably, the compound according to the invention has a stereochemistry according to general formula (II) or (VI). Preferably, the compound according to the invention has a stereochemistry according to general formula (III) or (VII). The stereochemistry according to general formula (II) or (VI) is particularly preferred.

In another preferred embodiment, the compound according to the invention has a stereochemistry according to general formula (IV), (V), (VIII) or (IX), such that the residues —R¹ and —NH—R² on the pyrrolidone ring are oriented cis. Preferably, the compound according to the invention has a stereochemistry according to general formula (IV) or (VIII). Preferably, the compound according to the invention has a stereochemistry according to general formula (V) or (IX).

In a particularly preferred embodiment, the compound according to the invention has a stereochemistry according to general formula (II) or (VI), more preferably (II).

In the compound of the invention according to any of general formulas (I), (II), (III), (IV), (V), (VI), (VII), (VIII), or (IX) R¹ represents —C$_{1-10}$-alkyl; —C$_{3-10}$-cycloalkyl; —C$_{1-6}$-alkylene-C$_{3-10}$-cycloalkyl; 3 to 7 membered heterocycloalkyl; —C$_{1-6}$-alkylene-(3 to 7 membered heterocycloalkyl); aryl; —C$_{1-6}$-alkylene-aryl; 5 or 6-membered heteroaryl; or —C$_{1-6}$-alkylene-(5 or 6-membered heteroaryl); preferably —C$_{3-10}$-cycloalkyl; aryl; or 5 or 6-membered heteroaryl; more preferably phenyl, benzodioxanyl or indazolyl, most preferably phenyl.

In a preferred embodiment, R¹ represents phenyl, benzodioxanyl, or indazolyl, preferably wherein said phenyl, benzodioxanyl and indazolyl in each case independently from one another are unsubstituted or mono- or disubstituted with substituents selected from the group consisting of —F, —Cl, —Br, —CH$_3$, —CF$_3$, —CN, cyclopropyl, phenyl, fluorophenyl and —OCH$_3$.

In the compound of the invention according to any of general formulas (I), (II), (III), (IV), (V), (VI), (VII), (VIII), or (IX) represents H; —C$_{1-10}$-alkyl; or —C$_{3-10}$-cycloalkyl.

In a preferred embodiment, represents H; methyl, ethyl, n-propyl; cyclopropyl; cyclobutyl; cyclopentyl or cyclohexyl; more preferably H, methyl; ethyl; cyclopropyl or cyclobutyl; still more preferably H; methyl; or cyclopropyl.

In a particularly preferred embodiment, R¹⁺ represents H.

In a preferred embodiment, R¹ represents —C$_{3-10}$-cycloalkyl; aryl or 5 or 6-membered heteroaryl; and/or R¹⁺ represents H; CH$_3$; or cyclopropyl. In a more preferred embodiment, R¹ represents —C$_{3-10}$-cycloalkyl; aryl or 5 or 6-membered heteroaryl; and represents H; CH$_3$; or cyclopropyl. In a particularly preferred embodiment, R¹ represents aryl, preferably phenyl; benzodioxanyl, or indazolyl, more preferably phenyl; and represents H.

In the compound of the invention according to any of general formulas (I), (II), (III), (IV), (V), (VI), (VII), (VIII), or (IX) R² represents —C(=O)—C$_{1-10}$-alkyl; —C(=O)—C$_{3-10}$-cycloalkyl; —C(=O)—C$_{1-6}$-alkylene-C$_{3-10}$-cycloalkyl; —C(=O)-(3 to 7 membered heterocycloalkyl); —C(=O)—C$_{1-6}$-alkylene-(3 to 7 membered heterocycloalkyl); —C(=O)-aryl; —C(=O)—C$_{1-6}$-alkylene-aryl; —C(=O)-(5 or 6-membered heteroaryl); —C(=O)—C$_{1-6}$-alkylene-(5 or 6-membered heteroaryl); —S(=O)$_{1-2}$—C$_{1-10}$-alkyl; —S(=O)$_{1-2}$—C$_{3-10}$-cycloalkyl; —S(=O)$_{1-2}$—C$_{1-6}$-alkylene-C$_{3-10}$-cycloalkyl; —S(=O)$_{1-2}$-(3 to 7 membered heterocycloalkyl); —S(=O)$_{1-2}$—C$_{1-6}$-alkylene-(3 to 7 membered heterocycloalkyl); —S(=O)$_{1-2}$-aryl; —S(=O)$_{1-2}$—C$_{1-6}$-alkylene-aryl; —S(=O)$_{1-2}$-(5 or 6-membered heteroaryl); or —S(=O)$_{1-2}$—C$_{1-6}$-alkylene-(5 or 6-membered heteroaryl).

In a preferred embodiment, R² represents —C(=O)—C$_{1-10}$-alkyl; —C(=O)—C$_{3-10}$-cycloalkyl; —C(=O)-(3 to 7 membered heterocycloalkyl); —C(=O)-aryl; —C(=O)-(5 or 6-membered heteroaryl); —S(=O)$_2$—C$_{1-10}$-alkyl; —S(=O)$_2$—C$_{3-10}$-cycloalkyl; —S(=O)$_2$-(3 to 7 membered heterocycloalkyl); —S(=O)$_2$-aryl or —S(=O)$_2$-(5 or 6-membered heteroaryl); more preferably —C(=O)—C$_{1-10}$-alkyl; —C(=O)—C$_{3-10}$-cycloalkyl; —S(=O)$_2$—C$_{3-10}$-cycloalkyl; or —S(=O)$_2$-aryl.

In another preferred embodiment, R² represents
—C(=O)—C$_{1-10}$-alkyl, unsubstituted or mono- or disubstituted with substituents selected from the group consisting of —F, —Cl, and —Br;
—C(=O)-cyclopropyl, unsubstituted or mono- or disubstituted with substituents selected from the group consisting of —F, —Cl, —Br, —CH$_3$, —CF$_3$, —CN, and —OCH$_3$;
—C(=O)-cyclobutyl, unsubstituted or mono- or disubstituted with substituents selected from the group consisting of —F, —Cl, —Br, —CH$_3$, —CF$_3$, —CN and —OCH$_3$;
—C(=O)-2-tetrahydrofuranyl, unsubstituted;
—C(=O)-(5- to 6-membered heteroaryl), wherein said 5- to 6-membered heteroaryl is selected from the group consisting of thiazolyl, pyrazolyl, oxazolyl and 1-oxa-2,4-diazolyl, 1,2,5-oxadiazolyl, isoxazolyl, isothiazolyl, wherein in each case said 5- to 6-membered heteroaryl is unsubstituted or mono- or disubstituted with substituents selected from the group consisting of —F, —Cl, —Br, —CH$_3$, —CF$_3$, —CN, ═O, and —OCH$_3$.

—S(═O)$_2$—C$_{1-10}$-alkyl, unsubstituted;

—S(═O)$_2$-cyclopropyl, unsubstituted or —S(═O)$_2$-cyclobutyl, unsubstituted;

—S(═O)$_2$-phenyl unsubstituted or mono- or disubstituted with substituents independently of one another selected from the group consisting of —F, —Cl, —Br, —CH$_3$, —CF$_3$, —CN and —OCH$_3$; or —S(═O)$_2$-(5- to 6-membered heteroaryl), wherein said 5- to 6-membered heteroaryl is selected from the group consisting of thiazolyl, pyrazolyl, oxazolyl and 1-oxa-2,4-diazolyl, 1,2,5-oxadiazolyl, isoxazolyl, isothiazolyl, wherein in each case said 5- to 6-membered heteroaryl is unsubstituted or mono- or disubstituted with substituents selected from the group consisting of —F, —Cl, —Br, —CH$_3$, —CF$_3$, —CN, ═O, and —OCH$_3$;

In a particularly preferred embodiment, R$^2$ represents —C(═O)—C$_{1-6}$-alkyl (more preferably —C(═O)—CH$_3$ or —C(═O)—CH$_2$CH$_3$); —C(═O)-cyclopropyl; or —C(═O)-cyclobutyl; wherein said C$_{1-6}$-alkyl, cyclopropyl and cyclobutyl in each case independently from one another are unsubstituted or mono- or disubstituted with substituents selected from the group consisting of —F, —Cl, and —Br; or —S(═O)$_2$-cyclopropyl, unsubstituted; or —S(═O)$_2$-cyclobutyl, unsubstituted; or —S(═O)$_2$-phenyl unsubstituted or mono- or disubstituted with substituents independently of one another selected from the group consisting of —F, —Cl, —Br, —CH$_3$, —CF$_3$, —CN and —OCH$_3$.

In the compound of the invention according to any of general formulas (I), (II), (III), (IV), (V), (VI), (VII), (VIII), or (IX) R$^3$ and R$^{3'}$ independently from one another represent H; F; Cl; —C$_{1-10}$-alkyl; —C$_{3-6}$-cycloalkyl; —C$_{1-6}$-alkylene-C$_{3-6}$-cycloalkyl; 3 to 7 membered heterocycloalkyl; —C$_{1-6}$-alkylene-(3 to 7 membered heterocycloalkyl); —C$_{1-6}$-alkylene-aryl; or —C$_{1-6}$-alkylene-(5 or 6-membered heteroaryl); or R$^3$ and R$^{3'}$ together with the carbon atom to which they are bound form a C$_{3-10}$-cycloalkyl; or 3 to 7 membered heterocycloalkyl.

In a preferred embodiment, R$^3$ represents H or —C$_{1-10}$-alkyl; and/or R$^{3'}$ represents H; more preferably R$^3$ and R$^{3'}$ both represent H.

In another preferred embodiment, R$_3$ and R$_{3'}$ both represent —C$_{1-10}$-alkyl; more preferably —CH$_3$.

In still another preferred embodiment, R$_3$ and R$_{3'}$ together with the carbon atom to which they are bound form cyclopropyl.

In the compound of the invention according to any of general formulas (I), (II), (III), (IV), (V), (VI), (VII), (VIII), or (IX) L represents bond or —C$_{1-6}$-alkylene-; more preferably bond or —CH$_2$—; still more preferably bond.

In the compound of the invention according to any of general formulas (I), (II), (III), (IV), (V), (VI), (VII), (VIII), or (IX) A represents substructure (S1)

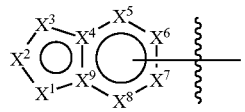

(S1)

wherein

X$^1$, X$^2$ and X$^3$ independently from one another represent CH; CR$^4$; N; NH; NR$^4$; O; or S;

wherein at least one of X$^1$, X$^2$ and X$^3$ represents N; NH; NR$^4$; O; or S;

wherein when X$^1$ or X$^3$ represent NR$^4$ and X$^2$ represents CH or N; the remaining X$^1$ or X$^3$ represents CR$^4$ with R$^4$ representing aryl or —C$_{1-6}$-alkylene-aryl;

X$^4$ and X$^9$ independently from one another represent C or N;

X$^5$, X$^6$, X$^7$ and X$^8$ in each case independently from one another represent CH; CR$^4$; N; or C which is connected to L; wherein one of X$^5$, X$^6$, X$^7$ and X$^8$ represents C which is connected to L;

or A represents substructure (S2)

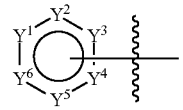

(S2)

wherein

Y$^1$, Y$^2$, Y$^3$, Y$^4$, Y$^5$ and Y$^6$ in each case independently from one another represent CH; CR$^4$; N; or C which is connected to L; wherein one of Y$^1$, Y$^2$, Y$^3$, Y$^4$, Y$^5$ and Y$^6$ represents C which is connected to L;

wherein if L is bond and A is phenyl, R$^2$ does not represent —S(═O)$_{1-2}$-aryl; and wherein if L is methylene and A is phenyl, R$^{2'}$ does not represent C$_{3-10}$-cycloalkyl.

In a preferred embodiment, A represents substructure (S1). According to this embodiment, preferably X$^5$, X$^6$, X$^7$ and X$^8$ in each case independently from one another represent CH; or C which is connected to L; wherein one of X$^5$, X$^6$, X$^7$ and X$^8$ represents C which is connected to L.

According to the present invention, when A represents indolyl or indazolyl which is substituted by R$^4$ at the nitrogen atom in position X$^1$ or X$^3$, one carbon atom of the five-membered ring of said indolyl or indazolyl is substituted by aryl or —C$_{1-6}$-alkylene-aryl. Preferably, when A represents indolyl or indazolyl which is substituted by R$^4$ at the nitrogen atom in position X$^1$ or X$^3$, said indolyl or indazolyl is according to the following formula (S1a)

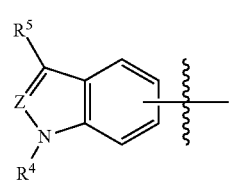

(S1a)

wherein Z represents CH or N; and

R$^5$ represents aryl or —C$_{1-6}$-alkylene-aryl; preferably phenyl or —CH$_2$-phenyl; preferably wherein said phenyl can be monosubstituted or disubstituted by substituents selected from the group consisting of —F, —Cl, —Br, —CH$_3$, —CF$_3$, —CN, cyclopropyl and —OCH$_3$.

In another preferred embodiment, A represents indolyl; indazolyl; benzisoxazolyl; benzisothiazolyl; benzotriazolyl; imidazopyridinyl; or benzoimidazolyl; in each case unsubstituted or mono- or disubstituted with R$^4$.

In another preferred embodiment, A represents substructure (S2). According to this embodiment, A preferably represents phenyl or pyridinyl; wherein said phenyl and pyridinyl in each case independently from one another are unsubstituted or mono- or disubstituted with substituents selected from the group consisting of —F, —Cl, —Br, —CH$_3$, —CF$_3$, —CN, and —OCH$_3$.

In a particularly preferred embodiment, A represents phenyl; indolyl; indazolyl; benzisoxazolyl; benzisothiazolyl; benzotriazolyl; or imidazopyridinyl;
  in each case unsubstituted or mono- or disubstituted with substituents independently of one another selected from the group consisting of C$_{1-4}$-alkyl; C$_{1-4}$-alkynyl; cyclopropyl; cyclobutyl; phenyl; benzyl; N-methylpyridinone; and —S(=O)$_2$—C$_{1-4}$-alkyl;
    wherein phenyl and benzyl independently from one another are unsubstituted or mono- or disubstituted with substituents selected from the group consisting of —F, —Cl, —Br, —CH$_3$, —CF$_3$, —CN, cyclopropyl and —OCH$_3$.

In the compound of the invention according to any of general formulas (I), (II), (III), (IV), (V), (VI), (VII), (VIII), or (IX) R$^4$ represents —C$_{1-10}$-alkyl; —C$_{1-10}$-alkenyl; —C$_{1-10}$-alkynyl; —C$_{3-6}$-cycloalkyl; —C$_{1-6}$-alkylene-C$_{3-6}$-cycloalkyl; 3 to 7 membered heterocycloalkyl; —C$_{1-6}$-alkylene-(3 to 7 membered heterocycloalkyl); aryl; —C$_{1-6}$-alkylene-aryl; 5 or 6-membered heteroaryl; —C$_{1-6}$-alkylene-(5 or 6-membered heteroaryl); —S(=O)$_{1-2}$—C$_{1-10}$-alkyl; —S(=O)$_{1-2}$—C$_{3-10}$-cycloalkyl; —S(=O)$_{1-2}$-(3 to 7 membered heterocycloalkyl); —S(=O)$_{1-2}$-aryl; or —S(=O)$_{1-2}$-(5 or 6-membered heteroaryl).

In a preferred embodiment, R$^4$ represents —C$_{1-10}$-alkyl; —C$_{1-10}$-alkynyl; —C$_{3-6}$-cycloalkyl; aryl (preferably phenyl); —C$_{1-6}$-alkylene-aryl (preferably —C$_{1-6}$-alkylene-phenyl); 5 or 6-membered heteroaryl; or —S(=O)$_{1-2}$—C$_{1-10}$-alkyl.

In a particularly preferred embodiment of the invention according to any of general formulas (I), (II), (III), (IV), (V), (VI), (VII), (VIII), or (IX)
  R$^{1'}$ represents phenyl, benzodioxanyl, or indazolyl; wherein said phenyl, benzodioxanyl and indazolyl in each case independently from one another are unsubstituted or mono- or disubstituted with substituents selected from the group consisting of —F, —Cl, —Br, —CH$_3$, —CF$_3$, —CN, cyclopropyl, phenyl, fluorophenyl and —OCH$_3$; and/or
  R$^2$ represents —C(=O)—C$_{1-6}$-alkyl; —C(=O)-cyclopropyl; or —C(=O)-cyclobutyl; wherein said C$_{1-6}$-alkyl, cyclopropyl and cyclobutyl in each case independently from one another are unsubstituted or mono- or disubstituted with substituents selected from the group consisting of —F, —Cl, and —Br; or
  —S(=O)$_2$-cyclopropyl, unsubstituted; or —S(=O)$_2$-cyclobutyl, unsubstituted; or
  —S(=O)$_2$-phenyl unsubstituted or mono- or disubstituted with substituents independently of one another selected from the group consisting of —F, —Cl, —Br, —CH$_3$, —CF$_3$, —CN and —OCH$_3$; and/or
  A represents phenyl; indolyl; indazolyl; benzisoxazolyl; benzisothiazolyl; benzotriazolyl; or imidazopyridinyl;
  in each case unsubstituted or mono- or disubstituted with substituents independently of one another selected from the group consisting of C$_{1-4}$-alkyl; C$_{1-4}$-alkynyl; cyclopropyl; cyclobutyl; phenyl; benzyl; N-methylpyridinone; and —S(=O)$_2$—C$_{1-4}$-alkyl;
    wherein phenyl and benzyl independently from one another are unsubstituted or mono- or disubstituted with substituents selected from the group consisting of —F, —Cl, —Br, —CH$_3$, —CF$_3$, —CN, cyclopropyl and —OCH$_3$;
  and/or
  R$^{1'}$ represents H; and/or
  R$^3$ represents H; and/or
  R$^{3'}$ represents H; and/or
  L represents CH$_2$ or bond.

In a preferred embodiment, the compound according to the invention is selected from the group consisting of 1  N-[rac-(2R,3S)-1-[3-(4-fluorophenyl)-1,2-benzoxazol-6-yl]-5-oxo-2-phenylpyrrolidin-3-yl]cyclopropanecarboxamide
2  N-[rac-(2R,3S)-1-[3-(4-fluorophenyl)-1<I>H<A>-indazol-6-yl]-5-oxo-2-phenylpyrrolidin-3-yl]cyclopropanecarboxamide
3  2,2-difluoro-N-[rac-(2R,3S)-5-oxo-2-phenyl-1-(3-prop-1-ynyl-1,2-benzothiazol-6-yl)pyrrolidin-3-yl]propanamide
5  N-[rac-(2R,3S)-1-[1-[1-4-fluorophenyl)imidazo[1,5-a]pyridin-6-yl]-5-oxo-2-phenylpyrrolidin-3-yl]cyclopropanecarboxamide
6  2,2-difluoro-N-[rac-(2R,3S)-1-[3-(1-methyl-6-oxopyridin-3-yl)-1,2-benzoxazol-6-yl]-5-oxo-2-phenylpyrrolidin-3-]
7  N-[rac-(2R,3S)-1-[1-(4-fluorophenyl)imidazo[1,5-a]pyridin-6-yl]-5-oxo-2-phenylpyrrolidin-3-yl]cyclopropanesulfonamide
8  2,2-difluoro-N-[rac-(2R,3S)-1-(3-cyclobutyl-1H-indazol-6-yl)-5-oxo-2-phenylpyrrolidin-3-yl]propanamide
9  N-[rac-(2R,3S)-1-[3-(4-chlorophenyl)-1H-indazol-6-yl]-5-oxo-2-phenylpyrrolidin-3-yl]cyclopropanecarboxamide
10 N-[rac-(2R,3S)-1-[1-(4-fluorophenyl)benzotriazol-5-yl]-5-oxo-2-phenylpyrrolidin-3-yl]cyclopropanesulfonamide
11 2,2-difluoro-N-[rac-(2R,3S)-1-[(6-fluoro-1H-indol-4-yl)methyl]-5-oxo-2-phenylpyrrolidin-3-yl]propanamide
12 N-[rac-(2R,3S)-1-[3-(4-fluorophenyl)-1-methylindazol-6-yl]-5-oxo-2-phenylpyrrolidin-3-yl]cyclopropanecarboxamide
13 N-[rac-(2R,3S)-1-[1-(4-fluorophenyl)benzotriazol-5-yl]-5-oxo-2-phenylpyrrolidin-3-yl]cyclopropanecarboxamide
14 2,2-difluoro-N-[rac-(2R,3S)-1-[3-(4-fluorophenyl)-1H-indazol-6-yl]-5-oxo-2-phenylpyrrolidin-3-yl]propanamide
15 4-methoxy-N-[rac-(2R,3S)-1-benzyl-2-(2,3-dihydro-1,4-benzodioxin-6-yl)-5-oxopyrrolidin-3-yl]benzenesulfonamide
16 2,2-difluoro-N-[rac-(2R,3S)-1-[1-(4-fluorophenyl)benzotriazol-5-yl]-5-oxo-2-phenylpyrrolidin-3-yl]propanamide
17 2,2-difluoro-N-[rac-(2R,S)-1-[1-(4-fluorophenyl)imidazo[1,5-a]pyridin-6-yl]-5-oxo-2-phenylpyrrolidin-3-yl]propanamide
18 4-chloro-N-[rac-(2R,3S)-1-benzyl-5-oxo-2-phenylpyrrolidin-3-yl]benzenesulfonamide
19 2,2-difluoro-N-[rac-(2R,3S)-1-[3-(4-fluorophenyl)-1-methylsulfonylindazol-6-yl]-5-oxo-2-phenylpyrrolidin-3-yl]propanamide
21 2,2-difluoro-N-[rac-(2R,3S)-1-[3-(4-fluorophenyl)-1,2-benzoxazol-6-yl]-5-oxo-2-phenylpyrrolidin-3-yl]propanamide
22 2,2-difluoro-N-[rac-(2R,3S)-1-[1-[4-fluorophenyl)methyl]indol-5-yl]-5-oxo-2-phenylpyrrolidin-3-yl]propanamide 23 N-[rac-((2R,3S)-1-(3-(4-fluorophenyl)benzo[d]isoxazol-6-yl)-4,4-dimethyl-5-oxo-2-phenylpyrrolidin-3-yl]cyclopropanecarboxamide
24 N-[rac-((2R,3S)-1-(1-(4-fluorophenyl)imidazo[1,5-a]pyridin-6-yl)-4,4-dimethyl-5-oxo-2-phenylpyrrolidin-3-yl)]methanesulfonamide
25 N-[rac-((2R,3S)-4,4-dimethyl-5-oxo-2-phenyl-1-(3-(prop-1-yn-1-yl)benzo[d]isothiazol-6-yl]pyrrolidin-3-yl)]cyclopropanecarboxamide
26 N-[rac-((2R,3S)-1-(3-(4-fluorophenyl)-1H-indazol-6-yl)-4,4-dimethyl-5-oxo-2-phenylpyrrolidin-3-yl)]cyclopropanecathoxamide
27 N-[rac-((2R,3S)-4,4-dimethyl-1-(3-(1-methyl-6-oxo-1,6-dihydropyridin-3-yl)benzo[d]isoxazol-6-yl)-5-oxo-2-phenylpyrrolidin-3-yl)]-2,2-difluoropropanamide
31 2,2-difluoro-N-(trans-1-(1-(4-fluorophenyl)-1H-indol-5-yl)-5-oxo-2-phenylpyrrolidin-3-yl)propanamide
32 N-(rac-(2R,3S)-1-(1-(4-fluorophenyl)-1H-indol-5-yl)-5-oxo-2-phenylpyrrolidin-3-yl)cyclopropanecarboxamide
33 N-[rac-(2R,3S)-1-benzyl-2-[1-(4-fluorophenyl)indazol-5-yl]-2-methyl-5-oxopyrrolidin-3-yl]cyclopropanecarboxamide in each case in the form of the free compound or a physiologically acceptable salt thereof.

The compounds according to the invention can be synthesized by standard reactions in the field of organic chemistry known to the person skilled in the art or in a manner as described herein (cf. Reaction Schemes below) or analogously. The reaction conditions in the synthesis routes described herein are known to the skilled person and are for some cases also exemplified in the Examples described herein.

Substituted aryl moieties in compounds of formula (D) and formula (F) are introduced by subjecting lactam (B) or lactam (E) in a regioselective metal catalyzed C—N coupling reaction with corresponding arylhalides (C), preferred with corresponding arylbromides and arylchlorides. Metal catalyzed C—N coupling reactions are generally known in the art (*Current Organic Synthesis,* 2011, 8, 53). Favorable C—N coupling reactions are palladium and copper catalyzed cross-coupling reactions (Chem. Rev., 2016, 116, 12564; *Chem. Soc. Rev.,* 2014, 43, 3525; *Chem. Sci.,* 2010, 1, 13). Regioselective C—N couplings with arylhalides are known in the art (*Chem. Sci.,* 2011, 2, 27; *J. Am. Chem. Soc.,* 2001, 123, 7727).

Primary amines (A) and (G) are converted to corresponding amides and sulfonamides (acylation and sulfonamide formation) (B) and (D) using commercially available acids (activation of acids using e.g. HATU) or acid chlorides under standard amide coupling reaction conditions (*March's Advanced Organic Chemistry,* 2007, 6th Edition, page 1427-1474).

Introduction of different orthogonal protecting groups PG (e.g. Boc, Cbz) to convert (A) to (E) as well as deprotection of compounds of formula (E) to (A) is well described in the literature (T. W. Green, P. G. M. Wuts, *Protective Groups in Organic Synthesis,* Wiley-Interscience, New York, 1999).

Compounds of the general formula (Q) can be prepared from pyrrolidinones of the general formula (B) by means of N-alkylation or N-benzylation. N-alkylation and N-benzylation of pyrrolidones are well known in the art (e.g. *Tetrahedron,* 1990, 46, 1733, *J. Am. Chem. Soc.* 1999, 121, 10478).

Reaction scheme 1

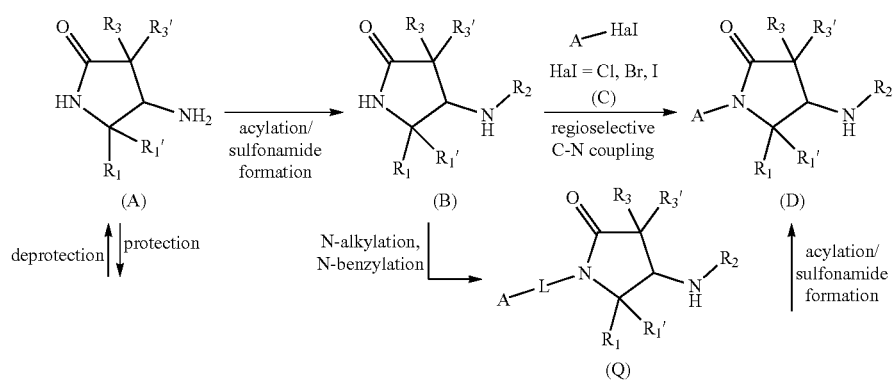

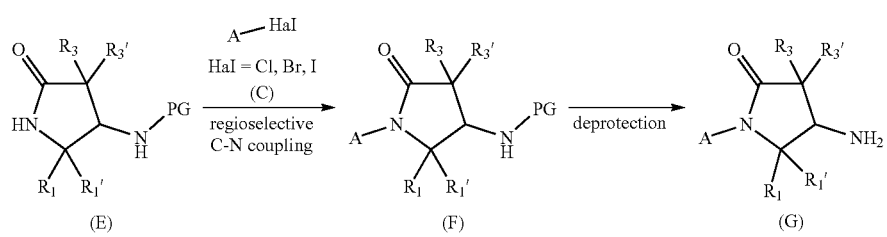

Reaction scheme 1.1
Compounds (A) and (E) can be synthesized according to procedures which are described in the literature.

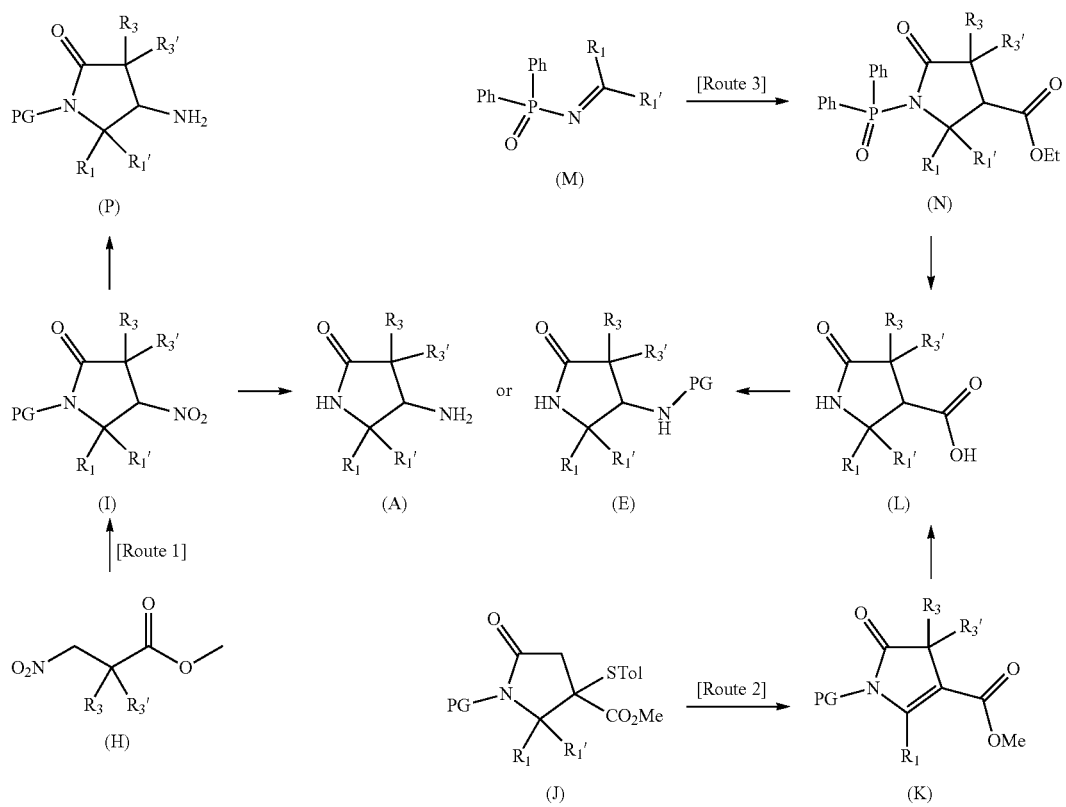

Route 1: Synthesis of compounds of formula (I) starting from compounds of formula (H) is described in the literature (*Org. Lett.*, 2011, 13, 6406, *Org. Lett*, 2009, 4512, *ACS Sustainable Chem. Eng.* 2015, 1873). For R3 and R3'=Me the synthesis of the corresponding acid of (H) is described (*Journal of Chemical and Engineering Data*, 1966, 11, 617) and the synthesis can be carried out in analogy to the references above. Removal of PG=PMB is well known in the art (*Greene's Protective Groups in Organic Synthesis*, 2007, 4th Edition, page 905ff). Reduction of nitro groups is well known in the art (*March's Advanced Organic Chemistry*, 2007, 6th Edition, page 1815f). If PG=(substituted)-alkyl, or (substituted)-benzyl the nitro group can be reduced to the corresponding amines of the general formula (P).

Route 2: Synthesis of compounds of formula (J) is described in the literature (*Org. Lett.*, 2007, 9, 4077). Introduction of substituents R3 and R3' can be achieved via alkylation. C-alkylations of pyrrolidinones (*Tetrahedron*, 1999, 55, 13321) and elimination of sulfonium salts (*Tetrahedron Letters* 1983, 24, 4331) are well known in the art. Compounds of formula (A) and (E) can be synthesized using Curtius rearrangement as key step to convert carboxylic acid (L) to corresponding primary amine (A) or (E). Curtius rearrangement is well known in the art (*Tetrahedron Letters*, 2010, 51, 385).

Route 3: Synthesis of compounds of formula (N) starting from compounds of formula (M) is described in the literature (*J Am. Chem. Soc.*, 2008, 130, 16146). Amidophosphate cleavage is described in the literature (*J.* *Am. Chem. Soc.*, 2008, 130, 16146). Compounds of formula (A) and (E) can be synthesized using Curtius rearrangement as key step to convert carboxylic acid (L) to corresponding primary amine (A) or (E). Curtius rearrangement is well known in the art (*Tetrahedron Letters*, 2010, 51, 385).

The compounds according to the invention can be produced in the manner described here or in an analogous manner.

In a preferred embodiment, the compounds according to the invention are modulators of the glucocorticoid receptor. In the sense of the invention, the term "selective modulator of the glucocorticoid receptor (glucocorticoid receptor modulator)" preferably means that the respective compound exhibits in a cellular target engagement assay for agonistic or antagonistic potency on the glucocorticoid receptor an EC50 or IC50 value on the glucocorticoid receptor of at most 15 μM ($10 \cdot 10^{-6}$ mol/L) or at most 10 μM; more preferably at most 1 μM; still more preferably at most 500 nM ($10^{-9}$ mol/L); yet more preferably at most 300 nM; even more preferably at most 100 nM; most preferably at most 10 nM; and in particular at most 1 nM. In a preferred embodiment, the compound according to the invention exhibits in a cellular target engagement assay for agonistic or antagonistic potency on the glucocorticoid receptor an EC50 or IC50 value on the glucocorticoid receptor in the range of from 1 μM to 15 μM, more preferably from 100 nM to 1 μM, most preferably below 100 nM.

The person skilled in the art knows how to test compounds for modulation (agonistic or antagonistic) of the activity of the glucocorticoid receptor. Preferred target engagement assays for testing compounds for their agonistic or antagonistic potency (EC50, IC50) on the glucocorticoid receptor are described herein below:

Glucocorticoid Receptor Cell-Based Assays

Potential selective glucocorticoid receptor modulators of this intervention can be tested for modulation of the activity of the glucocorticoid receptor using cell-based assays. These assays involve a Chinese hamster ovary (CHO) cell line which contains fragments of the glucocorticoid receptor as well as fusion proteins. The glucocorticoid receptor fragments used are capable of binding the ligand (e.g. beclomethasone) to identify molecules that compete for binding with glucocorticoid receptor ligands. In more detail, the glucocorticoid receptor ligand binding domain is fused to the DNA binding domain (DBD) of the transcriptionfactor GAL4 (GAL4 DBD-GR) and is stably integrated into a CHO cell line containing a GAL4-UAS-Luciferase reporter construct. To identify selective glucocorticoid receptor modulators, the reporter cell line is incubated with the molecules using an 8-point half-log compound dilution curve for several hours. After cell lysis the luminescence that is produced by luciferase after addition of the substrate is detected and EC50 or IC50 values can be calcuated. Engagement of molecules which induce gene expression via glucocortocoid receptor binding to the DNA leads to expression of the luciferase gene under the control of the fusion protein GAL4 DBD-GR and therefore to a dosedependent increase of the luminescence signal. Binding of molecules which repress beclomethasone-induced gene expression of the luciferase gene under the control of the fusion protein GAL4 DBD-GR leads to a dosedependent reduction of the luminescence signal.

In a preferred embodiment, the compound according to the invention exhibits in a cellular target engagement assay for agonistic or antagonistic potency on the glucocorticoid receptor an EC50 or IC50 value on the glucocorticoid receptor of at most 1 µM ($10^{-6}$ mol/L); still more preferably at most 500 nM ($10^{-9}$ mol/L); yet more preferably at most 300 nM; even more preferably at most 100 nM; most preferably at most 50 nM; and in particular at most 10 nM or at most 1 nM.

In a preferred embodiment, the compound according to the invention exhibits in a cellular target engagement assay for agonistic or antagonistic potency on the glucocorticoid receptor an EC50 or IC50 value on the glucocorticoid receptor in the range of from 1 µM to 15 µM, more preferably from 100 nM to 1 µM, most preferably below 100 nM.

In a preferred embodiment, the compound according to the invention exhibits in a cellular target engagement assay for agonistic or antagonistic potency on the glucocorticoid receptor an EC50 or IC50 value on the glucocorticoid receptor in the range of from 0.1 nM ($10^{-9}$ mol/L) to 1000 nM; still more preferably 1 nM to 800 nM; yet more preferably 1 nM to 500 nM; even more preferably 1 nM to 300 nM; most preferably 1 nM to 100 nM; and in particular 1 nM to 80 nM.

Preferably, the compounds according to the invention are useful as selective modulators of the glucocorticoid receptor.

Therefore, the compounds according to the invention are preferably useful for the in vivo treatment or prevention of diseases in which participation of the glucocorticoid receptor is implicated.

The invention therefore further relates to a compound according to the invention for use in the modulation of glucocorticoid receptor activity.

Therefore, another aspect of the invention relates to a compound according to the invention for use in the treatment and/or prophylaxis of a disorder which is mediated at least in part by the glucocorticoid receptor. Still another aspect of the invention relates to a method of treatment of a disorder which is mediated at least in part by the glucocorticoid receptor comprising the administration of a therapeutically effective amount of a compound according to the invention to a subject in need thereof, preferably a human.

A further aspect of the invention relates to the use of a compound according to the invention as medicament.

Another aspect of the invention relates to a pharmaceutical dosage form comprising a compound according to the invention. Preferably, the pharmaceutical dosage form comprises a compound according to the invention and one or more pharmaceutical excipients such as physiologically acceptable carriers, additives and/or auxiliary substances; and optionally one or more further pharmacologically active ingredient. Examples of suitable physiologically acceptable carriers, additives and/or auxiliary substances are fillers, solvents, diluents, colorings and/or binders. These substances are known to the person skilled in the art (see H. P. Fiedler, Lexikon der Hilfsstoffe fur Pharmazie, Kosmetik and angrenzende Gebiete, Editio Cantor Aulendoff).

The pharmaceutical dosage form according to the invention is preferably for systemic, topical or local administration, preferably for oral administration. Therefore, the pharmaceutical dosage form can be in form of a liquid, semisolid or solid, e.g. in the form of injection solutions, drops, juices, syrups, sprays, suspensions, tablets, patches, films, capsules, plasters, suppositories, ointments, creams, lotions, gels, emulsions, aerosols or in multiparticulate form, for example in the form of pellets or granules, if appropriate pressed into tablets, decanted in capsules or suspended in a liquid, and can also be administered as such.

The pharmaceutical dosage form according to the invention is preferably prepared with the aid of conventional means, devices, methods and processes known in the art. The amount of the compound according to the invention to be administered to the patient may vary and is e.g. dependent on the patients weight or age and also on the type of administration, the indication and the severity of the disorder. Preferably 0.001 to 100 mg/kg, more preferably 0.05 to 75 mg/kg, most preferably 0.05 to 50 mg of a compound according to the invention are administered per kg of the patients body weight.

The glucocorticoid receptor is believed to have potential to modify a variety of diseases or disorders in mammals such as humans. These include in particular inflammatory diseases.

Another aspect of the invention relates to a compound according to the invention for use in the treatment and/or prophylaxis of pain and/or inflammation; more preferably inflammatory pain.

A further aspect of the invention relates to a method of treatment of pain and/or inflammation; more preferably inflammatory pain.

The following examples further illustrate the invention but are not to be construed as limiting its scope.

EXAMPLES

Synthesis of 2,2-difluoro-N-(trans-5-oxo-2-phenylpyrrolidin-3-yl)propanamide (intermediate A1)

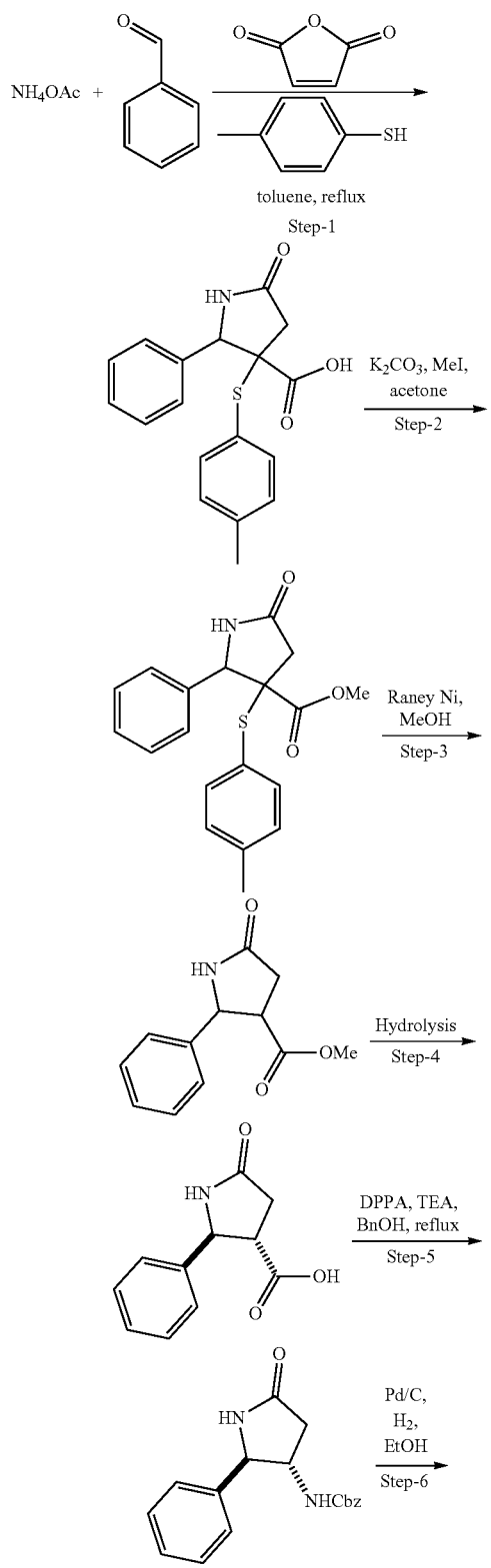

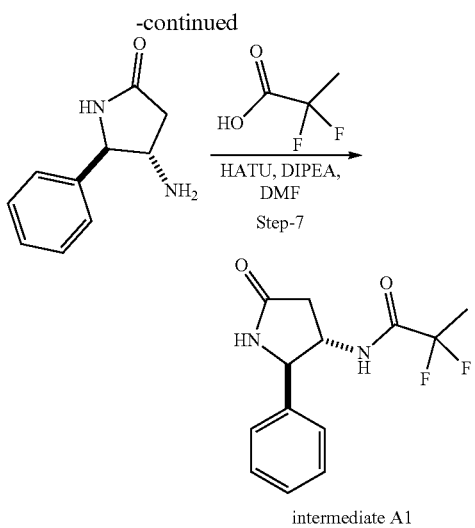

intermediate A1

Step 1: Maleic anhydride (9.8 g, 100 mmol, 1.0 eq.), p-thiocresol (12.4 g, 100 mmol, 1.0 eq.), ammonium acetate (7.8 g, 100 mmol, 1.0 eq.) and benzaldehyde (10 mL, 100 mmol, 1.0 eq.) were put in a sealed tube and 100 mL toluene was added. The reaction mixture was stirred at RT for 1 h and then stirred at 150° C. for 16 h. After cooling to RT, the solvent was evaporated under reduced pressure, and the residue was basified with sat. NaHCO$_3$ solution and was extracted with DCM. The aqueous layer was acidified with 2N HCl under ice cooling and the crude product was extracted twice with EtOAc. The combined organic layers were washed with brine, dried over Na$_2$SO$_4$, filtered and concentrated to get crude 5-oxo-2-phenyl-3-(p-tolylthio)pyrrolidine-3-carboxylic acid (10.0 g, crude).

Step 2: To a stirred solution of crude 5-oxo-2-phenyl-3-(p-tolylthio)pyrrolidine-3-carboxylic acid (10.0 g, 30.58 mmol, 1.0 eq.) in acetone (100 mL), potassium carbonate (16.8 g, 122.32 mmol, 4.0 eq.) and methyl iodide (7.6 ml, 122.32 mmol, 4.0 eq.) were added at 0° C., and the reaction was stirred for 16 h at RT. The solvent was removed under reduced pressure, and the residue was partitioned between DCM and water. The aqueous layer was extracted twice with DCM. The combined organic layers were washed with brine, dried over Na$_2$SO$_4$, filtered, and concentrated. The crude product was purified by column chromatography (100-200 silica gel, 50% EtOAc:hexanes) to give methyl 5-oxo-2-phenyl-3-(p-tolylthio)pyrrolidine-3-carboxylate (4.0 g, 38%) as an off-white solid.

Step 3: To a stirred solution of methyl 5-oxo-2-phenyl-3-(p-tolylthio)pyrrolidine-3-carboxylate (4.0 g, 11.73 mmol, 1.0 eq.) in EtOH:THF (100 mL, 2:1), Raney Nickel (1 g) was added and the reaction mixture was stirred for 2 h at RT. After completion, the reaction mixture was filtered through a celite bed and the celite bed was washed 2-3 times with EtOAc. The combined organic layers were concentrated and the crude was purified by column chromatography (100-200 silica gel, 50% EtOAc:hexanes) to afford methyl 5-oxo-2-phenylpyrrolidine-3-carboxylate (2.2 g, 88%, syn:anti, 1:1 mixture) as an off-white solid.

Step 4: To a stirred solution of methyl 5-oxo-2-phenylpyrrolidine-3-carboxylate (1.0 g, 4.56 mmol, 1.0 eq.) in MeOH (25 mL) was added 2 N NaOH solution (5 mL) and the reaction mixture was stirred at 80° C. for 2 h. After completion of the reaction (monitored by LCMS), the reaction mixture was concentrated and acidified with 2N HCl solution and was extracted with 30% isopropanol-DCM. The combined organic layers were dried over Na₂SO₄ and were concentrated under reduced pressure to get the desired trans-5-oxo-2-phenylpyrrolidine-3-carboxylic acid (0.8 g, 85%).

Step 5: To a stirred solution of trans-5-oxo-2-phenylpyrrolidine-3-carboxylic acid (0.5 g, 2.43 mmol, 1.0 eq.) in benzene:THF (25 mL, 4:1) was added TEA (0.68 ml, 4.87 mmol, 2.0 eq.) and DPPA (0.68 ml, 3.17 mmol, 1.3 eq.) and the reaction mixture was stirred at RT for 2 h. Then benzyl alcohol (0.33 mL, 3.17 mmol, 1.3 eq) was added and the reaction mixture was heated to reflux for 16 h. After completion, the reaction mixture was concentrated under reduced pressure to get the crude compound which was extracted with water and EtOAc. The combined organic layers were dried over Na₂SO₄ and concentrated under reduced pressure to get the crude product which was purified by column chromatography (100-200 mesh silica gel; 2% MeOH-DCM; $R_f$-value-0.5) to afford trans-benzyl (5-oxo-2-phenylpyrrolidin-3-yl)carbamate (0.38 g, 50%).

Step 6: To a stirred solution of trans-benzyl (5-oxo-2-phenylpyrrolidin-3-yl)carbonate (1.7 g, 5.48 mmol, 1.0 eq.) in MeOH (20 mL, 2:1), Pd/C (0.058 g, 0.548 mmol, 0.1 eq.) was added, and the reaction was stirred with a hydrogen balloon for 2 h at RT. After completion, the reaction mixture was filtered through a celite bed and the celite bed was washed 2-3 times with EtOAc. The combined organic layers were concentrated to get the desired trans-4-amino-5-phenylpyrrolidin-2-one as brown gum (0.9 g, 93%).

Step 7: To a stirred solution of trans-4-amino-5-phenylpyrrolidin-2-one (1.0 g, 5.68 mmol, 1.0 eq.) in DMF (20 mL), HATU (3.2 g, 8.52 mmol, 1.5 eq.), DIPEA (4.9 mL, 28.40 mmol, 5.0 eq.) and 2,2-difluoro-propionic acid (0.8 g, 7.38 mmol, 1.3 eq.) were added. The reaction mixture was then stirred for 16 h at ambient temperature. After completion, the reaction mixture was diluted with EtOAc and was washed with ice cold water, sat. NaHCO₃ and sat. NH₄Cl solution. The combined organic layers were concentrated under reduced pressure to get the crude product which was purified by column chromatography (100-200 mesh silica gel; 2% MeOH-DCM; $R_f$-value-0.5) to afford trans-2,2-difluoro-N-(5-oxo-2-phenylpyrrolidin-3-yl)propanamide (1.4 g, 93%).

Synthesis of N-(trans-5-oxo-2-phenylpyrrolidin-3-yl)cyclopropanecarboxamide (intermediate A2)

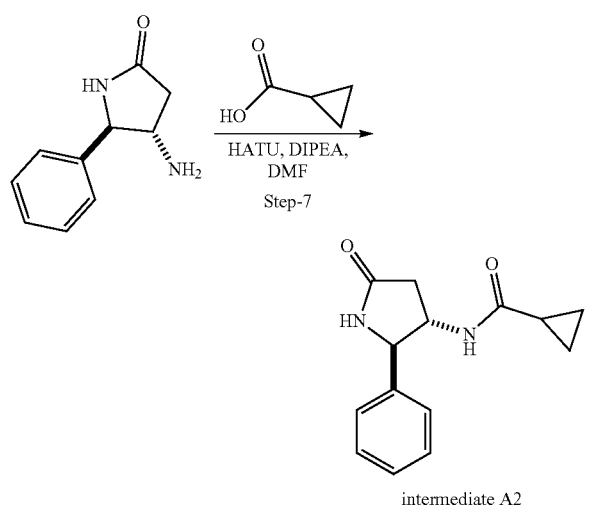

intermediate A2

Step 1: To a stirred solution of cyclopropanecarboxylic acid (1.4 g, 16.343 mmol, 1.2 eq.) in DMF (50 mL), HATU (10.4 g, 27.238 mmol, 2.0 eq.), DIPEA (12.0 mL, 68.096 mmol, 5.0 eq.), and trans-4-amino-5-phenylpyrrolidin-2-one (2.4 g, 13.619 mmol, 1.0 eq.) were added at 0° C. and the reaction mixture was stirred at ambient temperature for 16 h. After completion of the reaction (monitored by TLC, TLC system 5% methanol in DCM, Rf: 0.3) the reaction mixture was diluted with ethyl acetate (150 mL), washed with ice cold water (3×50 mL), dried over Na₂SO₄ and concentrated to obtain the crude product which was purified by column chromatography (230-400 mesh silica gel; 0 to 3% MeOH-DCM;) to afford N-(trans-5-oxo-2-phenylpyrrolidin-3-yl)cyclopropanecarboxamide (1.6 g, 48%).

Synthesis of N-(trans-5-oxo-2-phenylpyrrolidin-3-yl)cyclopropanesulfonamide (intermediate A3)

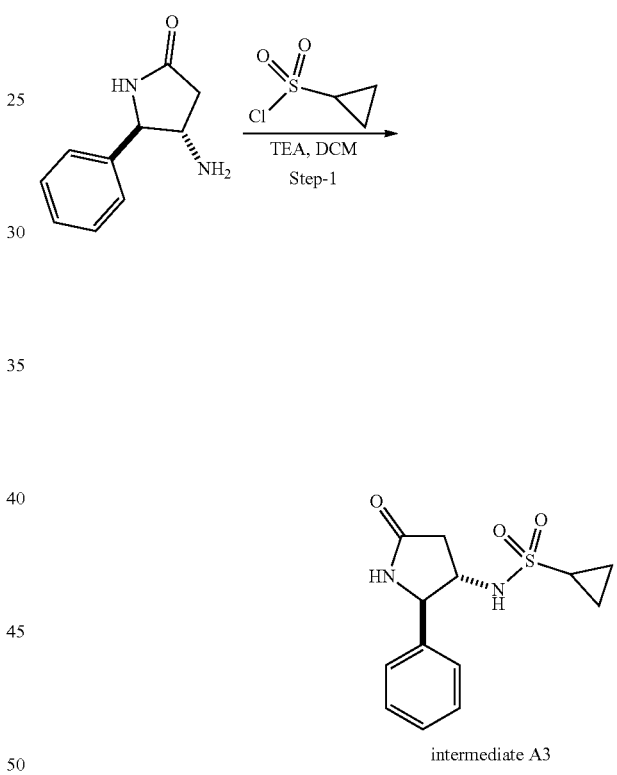

intermediate A3

Step 1: To a stirred solution of trans-4-amino-5-phenylpyrrolidin-2-one (1.0 g, 5.674 mmol, 1.0 eq.) in DCM (20 mL), TEA (3.98 ml, 28.373 mmol, 5.0 eq.) and cyclopropane sulfonyl chloride (1.15 mL, 11.349 mmol, 2.0 eq.) were added at 0° C. and the reaction was stirred at ambient temperature for 16 h. After completion of the reaction (monitored by TLC, TLC system 5% methanol in DCM, Rf: 0.3) the solvent was removed under reduced pressure to give a residue which was taken up in DCM (100 mL). The mixture was washed with sodium bicarbonate solution (3×50 mL), dried over Na₂SO₄ and concentrated to get the crude product which was purified by column chromatography (230-400 mesh silica gel; 2 to 5% MeOH-DCM) to afford N-(trans-5-oxo-2-phenylpyrrolidin-3-yl)cyclopropanesulfonamide (1.1 g, 39%).

Synthesis of N-(trans-4,4-dimethyl-5-oxo-2-phenylpyrrolidin-3-yl)cyclopropanecarboxamide (intermediate A4)

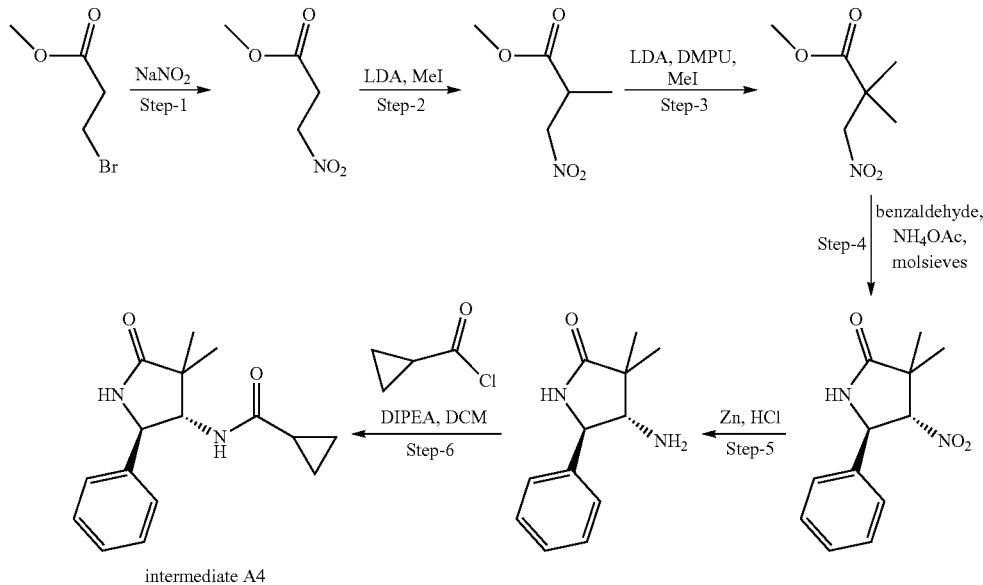

intermediate A4

Step 1: To a stirred solution of methyl 3-bromopropanoate (150.0 g, 88.29 mmol, 1.0 eq.) in DMSO (500 mL) was added NaNO$_2$ (92.9 g, 134.73 mmol, 1.5 eq.) portionwise at 10-15° C. The resulting solution was stirred at ambient temperature for 2 h. After consumption of the starting material, the reaction mixture was diluted with cold water (1000 mL) and extracted with diethyl ether (3×500 mL). The combined organic layers were washed with cold water, followed by brine, dried over Na$_2$SO$_4$ and concentrated under reduced pressure (bath temp 35° C.) to afford the crude compound. Obtained crude product was purified by column chromatography (using silica 100-200 mesh and 5% ethyl acetate in pet-ether as eluent) to afford methyl 3-nitropropanoate (60 g, 50%) as a light yellow liquid. (TLC system, 20% EA/pet-ether, Rf=0.5 & starting Rf=0.3).

Step 2: To a stirred solution methyl 3-nitropropanoate (60 g, 450.6 mmol, 1.0 eq.) in THF (600 mL) was added LDA (2M in THF, 563 mL, 1126.6 mmol, 2.5 eq.) at 78° C. and the resulting mixture was stirred for 15 minutes, was then allowed to warm to 0° C. and was stirred for 30 min. The reaction mixture was then again cooled to −78° C., prior to the addition of CH$_3$I (112 mL, 1802.4 mmol, 4.0 eq.) and the temperature was then gradually allowed to reach ambient temperature and was stirred for 16 h. The reaction mixture was then quenched with aq. NH$_4$Cl at 0° C. The organic layer was separated and the aqueous layer was extracted with ethyl acetate (500 ml×3). The combined organic layers were washed with brine, dried over Na$_2$SO$_4$ and concentrated to get the crude compound. Crude product was purified by column chromatography (using 100-200 silica gel, 5-10% Ethyl acetate in pet-ether as eluent) to afford methyl 2-methyl-3-nitropropanoate (23 g, 34%) as a colorless liquid. (TLC system, 10% EA/pet-ether, Rf=0.4).

Step 3: To a stirred solution of methyl 2-methyl-3-nitropropanoate (23 g, 156.35 mmol, 1.0 eq.) in THF (300 mL) and DMPU (200 mL, 1563.5 mmol, 10.0 eq.) was added LDA (2M in THF, 312 mL, 625.4 mmol, 4.0 eq) at −78° C. and the mixture was stirred for 40 min at the same temperature. Methyl iodide (58 mL, 938.1 mmol, 6.0 eq.) was added dropwise at −78° C. The reaction mixture was gradually allowed to attain ambient temperature and was stirred for 16 h. Then, the reaction mixture was quenched with 1N HCl (200 mL) and was extracted with ethyl acetate (300 ml×3). The combined organic layers were washed with 1N HCl (100 mL×2), followed by brine, dried over Na$_2$SO$_4$ and concentrated under reduced pressure to get the crude product. The crude product was purified by column chromatography (using 100-200 silica gel, 5-10% Ethyl acetate/pet-ether as eluent) to afford methyl 2,2-dimethyl-3-nitropropanoate (10 g, 40%) as a colorless liquid. (TLC system, 10% EA/pet-ether, Rf=0.5).

Step 4: To a stirred solution of methyl 2,2-dimethyl-3-nitropropanoate (2.7 g, 16.75 mmol, 1.0 eq.) in DMF (30 mL) was added benzaldehyde (7.11 g, 67.01 mmol, 4.0 eq.), NH$_4$OAc (9.1 g, 117.25 mmol, 7.0 eq.) followed by molecular sieves powder (2.7 g) at 0° C. and the reaction mixture was heated to 100° C. and stirring was continued for 16 h. The reaction mixture was filtered through a celite bed, the filtrate was diluted with water and extracted with ethyl acetate (3×100 mL). The combined organic layers were washed with brine, dried over Na$_2$SO$_4$, filtered and evaporated under reduced pressure to get the crude compound. The obtained crude product was purified by column chromatography (using 100-200 silica gel, 25-30% Ethyl acetate/pet-ether as eluent) and the obtained solids were triturated with n-pentane to afford trans-3,3-dimethyl-4-nitro-5-phenylpyrrolidin-2-one (2.41 g, 62%) as an off-white solid. (TLC system: 50% ethyl acetate/pet ether, Rf: 0.6)

Step 5: To a stirred solution of trans-3,3-dimethyl-4-nitro-5-phenylpyrrolidin-2-one (0.5 g, 2.1367 mmol, 1.0 eq.) in EtOAc and methanol (2:1, 30 mL) were added 6M HCl (12.5 mL) and Zn dust (10.5 g, 164.525 mmol, 77 eq.) at 0° C. and the mixture was then stirred for 18 h at ambient temperature. The reaction mixture was then cooled to 0° C. and was basified with NaHCO$_3$ solution. The organic layer was filtered through a celite pad which was then washed with 10% methanol in DCM (50 mL×3). The organic layer was then dried over Na$_2$SO$_4$ and the solvent was concentrated under reduced pressure to obtain trans-4-amino-3,3-dimethyl-5-phenylpyrrolidin-2-one (0.4 g) as an off-white solid. TLC system: 10% MeOH/DCM, Rf: 0.3.

Step 6: To a stirred solution of trans-4-amino-3,3-dimethyl-5-phenylpyrrolidin-2-one (0.4 g, 1.951 mmol, 1.0 eq.) in DCM (40 mL) were added DIPEA (1.0 mL, 5.853 mmol, 3.0 eq.) and cyclopropylcarbonyl chloride (0.266 g, 2.926 mmol, 1.5 eq.) at 0° C. and the mixture was stirred for 3 h at ambient temperature. The reaction mixture was quenched with water (50 mL) and extracted with EtOAc (2×50 mL), the combined organic layers were dried over Na₂SO₄ and solvent was evaporated under reduced pressure. The crude reaction mixture was recrystallized from acetonitrile to obtain N-(trans-4,4-dimethyl-5-oxo-2-phenylpyrrolidin-3-yl)cyclopropanecarboxamide (0.33 g, 62%) as an off-white solid. TLC system: 70% EtOAc/hexane, Rf: 0.4.

Synthesis of 6-bromo-3-(4-fluorophenyl)benzo[d]isoxazole (intermediate B1)

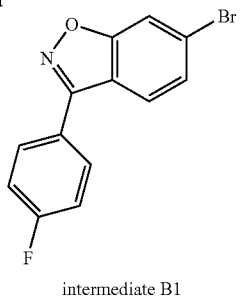

intermediate B1

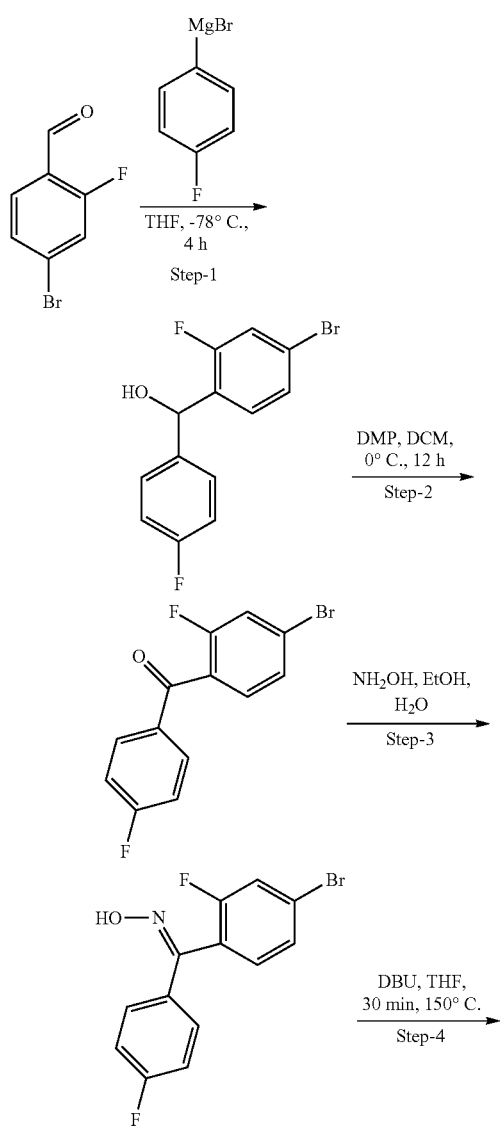

Step 1: To a stirred solution of 4-bromo-2-fluoro-benzaldehyde (15 g, 73.88 mmol, 1.0 eq.) in THF at 78° C. was added dropwise 4-fluoro phenyl magnesium bromide (2M solution in ether, 55.41 mL, 110.83 mmol, 1.5 eq.) under a nitrogen atmosphere, and the reaction mixture was stirred at that temperature for 4 h. After completion of the reaction (monitored by TLC), the reaction mixture was quenched with sat ammonium chloride solution and was diluted with EtOAc (2×500 mL). The combined organic layers were washed with brine (500 mL), dried over anhydrous Na₂SO₄ and concentrated under reduced pressure. The crude product was purified by column chromatography (230-400 mesh silica gel, TLC system: EtOAc/hexane (1:9); Rf=0.6) to give (4-bromo-2-fluorophenyl)(4-fluorophenyl)methanol (20 g, 91%).

Step 2: To (4-bromo-2-fluorophenyl)(4-fluorophenyl)methanol (20 g, 66.86 mmol, 1.0 eq.) in DCM (300 mL) at 0° C. was added Dess-Martin periodinane (70.90 g, 167.16 mmol, 2.5 eq.) and the reaction mixture was then stirred at the same temperature for 2 h. After completion of the reaction (monitored by TLC), the reaction mixture was filtered through a pad of celite and the filtrate was concentrated under reduced pressure. The crude product was purified by column chromatography (230-400 mesh silica gel, TLC system: EtOAc/hexane (1:9); Rf=0.5) to give (4-bromo-2-fluorophenyl)(4-fluorophenyl)methanone (13 g, 65%).

Step 3: To a stirred solution of (4-bromo-2-fluorophenyl)(4-fluorophenyl)methanone (2.5 g, 8.414 mmol, 1.0 eq.) in ethanol (20 mL) were added hydroxylamine hydrochloride (1.75 g, 25.244 mmol, 3.0 eq.) and sodium acetate (3.45 g, 42.07 mmol, 5.0 eq.) an the resulting mixture was heated to 90° C. for 12 h. After completion of the reaction (monitored by TLC), the reaction mixture was evaporated under reduced pressure to remove ethanol. The remains were diluted with water (300 mL) and were then extracted with EtOAc (2×300 mL). The combined organic layers were washed with brine (300 mL), dried over anhydrous Na₂SO₄ and concentrated under reduced pressure to get the crude product. The crude product was purified by column chromatography (230-400 mesh silica gel, TLC system: EtOAc/hexane (2:8); Rf=0.3) to give (4-bromo-2-fluorophenyl)(4-fluorophenyl)methanone oxime (2.5 g, 95%).

Step 4: In a micro wave vial (4-bromo-2-fluorophenyl)(4-fluorophenyl)methanone oxime (0.3 g, 0.964 mmol, 1.0 eq.) was taken up in THF (2 mL). 1, 8-Diazabicyclo [5.4.0]undec-7-ene (DBU, 0.293 g, 1.929 mmol, 2.0 eq.) was added and the mixture was purged for 5 minutes using argon. The reaction mixture was then heated to 120° C. for 30 minutes in the microwave. After completion of the reaction (monitored by TLC), the reaction mixture was diluted with EtOAc (3×100 mL) and was washed with water (100 mL). The combined organic layers were washed with brine (100 mL), dried over anhydrous Na₂SO₄ and concentrated under reduced pressure. The crude product was purified by column chromatography (230-400 mesh silica gel, TLC system: EtOAc/hexane (2:8); Rf=0.2) to give 6-bromo-3-(4-fluorophenyl)benzo[d]isoxazole (0.210 g, 75%).

Synthesis of 6-bromo-3-(4-fluorophenyl)-1-(tetrahydro-2H-pyran-2-yl)-1H-indazole (intermediate B2)

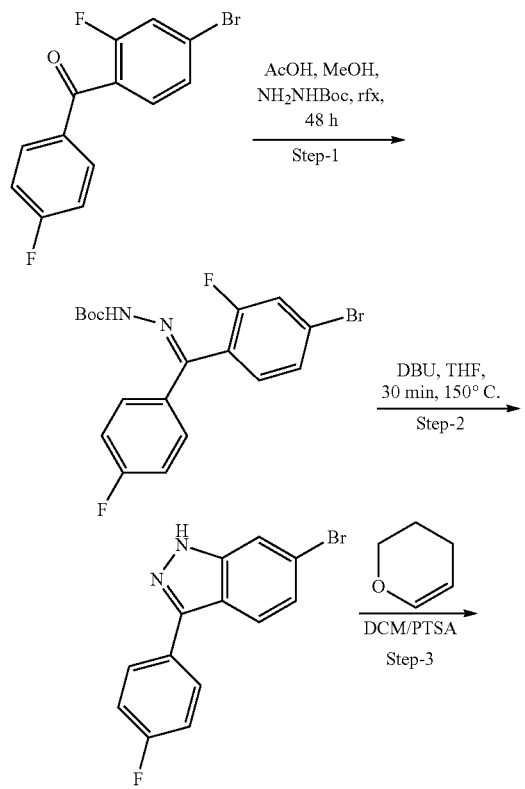

intermediate B2

Step 1: To a stirred solution of (4-bromo-2-fluorophenyl)(4-fluorophenyl)methanone (13.0 g, 43.75 mmol, 1.0 eq.) in methanol (150 mL) and acetic acid (30 mL) was added tert-butyl carbazate (11.6 g, 87.51 mmol, 2.0 eq.) and the reaction mixture was heated to reflux for 44 h. After completion of the reaction (monitored by TLC), the reaction mixture was diluted with EtOAc (2×500 mL) and water (500 mL). The combined organic layers were washed with brine (500 mL), dried over anhydrous Na₂SO₄ and concentrated under reduced pressure to get the crude product. The crude product was purified by column chromatography (230-400 mesh silica gel, TLC system: EtOAc/hexane (2:8); Rf=0.3) to give tert-butyl 24(4-bromo-2-fluorophenyl)(4-fluorophenypmethylene)hydrazine-1-carboxylate (12.0 g, 61%).

Step 2: In a micro wave vial, tert-butyl 2-((4-bromo-2-fluorophenyl)(4-fluorophenypmethylene)hydrazine-1-carboxylate (0.5 g, 1.71 mmol, 1.0 eq.) was taken up in THF (5 mL). 1,8-Diazabicyclo[5.4.0]undec-7-ene (DBU, 0.37 g, 2.43 mmol, 2.0 eq.) was added, and the reaction mixture was purged with argon for 5 minutes, before the reaction mixture was heated to 120° C. for 30 minutes in the microwave. After completion of the reaction (monitored by TLC), the reaction mixture was diluted with water (100 mL) and was extracted with EtOAc (3×100 mL). The combined organic layers were washed with brine (200 mL), dried over anhydrous Na₂SO₄ and concentrated under reduced pressure. The crude product was purified by column chromatography (230-400 mesh silica gel, TLC system: EtOAc/hexane (2:8); Rf=0.2) to give 6-bromo-3-(4-fluorophenyl)-1H-indazole (0.25 g, 50%).

Step 3: To a stirred solution of 6-bromo-3-(4-fluorophenyl)-1H-indazole (1.1 g, 3.778 mmol, 1.0 eq.) in DCM (20 mL) were added PTSA (0.086 g, 0.453 mmol, 0.12 eq.) and 3,4-dihydro-2H-pyran (1.58 g, 18.89 mmol, 5.0 eq.). The reaction mixture was then stirred for 16 h at ambient temperature. After completion of the reaction (monitored by TLC), the reaction mixture was diluted with water (100 mL) and was extracted with EtOAc (2×200 mL). The combined organic layers were washed with brine (100 mL), dried over anhydrous Na₂SO₄ and concentrated under reduced pressure to get the crude product. The crude product was purified by column chromatography (230-400 mesh silica gel, TLC system: EtOAc/hexane (10%); Rf=0.5) to give 6-bromo-3-(4-fluorophenyl)-1-(tetrahydro-2H-pyran-2-yl)-1H-indazole (1.0 g, 71%).

Synthesis of 6-chloro-3-(prop-1-yn-1-yl)benzo[d]isothiazole (intermediate B3)

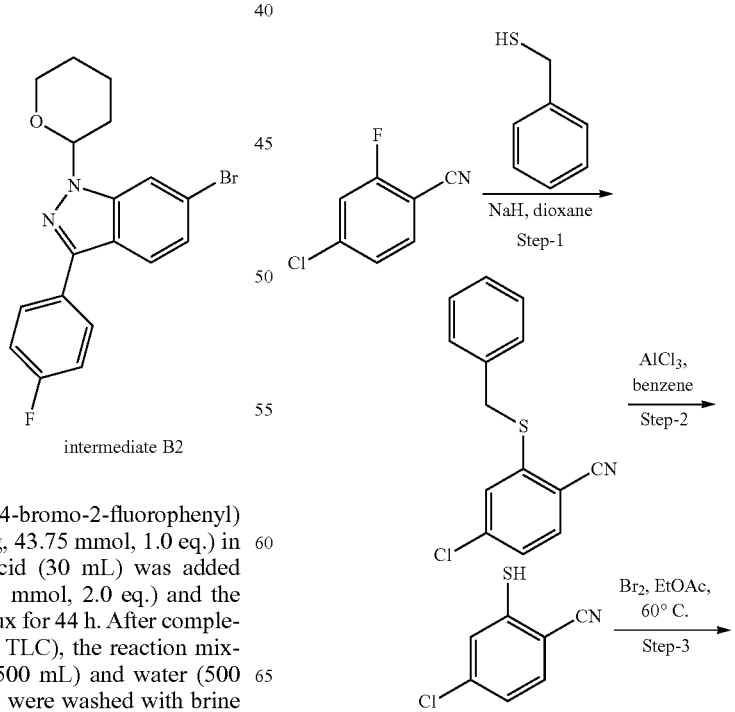

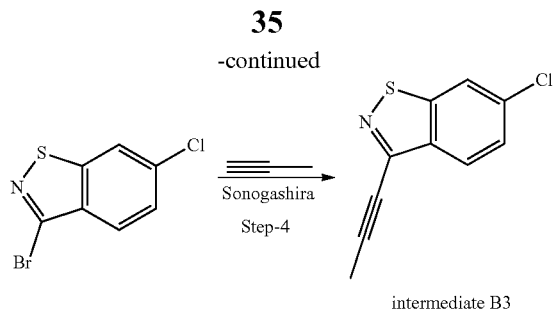

intermediate B3

Step 1: To a stirred solution of 4-chloro-2-fluorobenzonitrile (2.0 g, 8.097 mmol, 1.0 eq.) and phenylmethanethiol (1.04 mL, 8.876 mmol, 1.1 eq.) in 1,4-dioxane (60 mL) was added sodium hydride (50%, 0.5 g, 12.5 mmol, 1.5 eq.) at 0° C. and the reaction mixture was then stirred at ambient temperature for 3 h and was then heated to 80° C. for 30 min. After completion of the reaction (monitored by TLC, TLC system 20% ethyl acetate in hexane, Rf-0.4), the reaction mixture was quenched with ice, neutralized with 2N HCl solution and the organic solvent was removed under reduced pressure. The residue was partitioned with ethyl acetate (50 mL) and water (25 mL). The aqueous layer was extracted twice with ethyl acetate (50 mL×2). The combined organic layers were washed with brine, dried over $Na_2SO_4$, filtered and concentrated to afford 2-(benzylthio)-4-chlorobenzonitrile (2.05 g, 98%) which was used as obtained in the next step without further purification.

Step 2: To a stirred solution of 2-(benzylthio)-4-chlorobenzonitrile (8.1 g, 31.1838 mmol, 1.0 eq.) in dry benzene (160 mL) was added $AlCl_3$ (6.24 g, 46.7757 mmol, 1.5 eq.) at 0° C. and the reaction mixture was stirred for 1 h at ambient temperature. After completion of the reaction (monitored by TLC, TLC system 40% ethyl acetate in hexane, Rf-0.1), the reaction mixture was quenched with ice, the organic solvent was removed under reduced pressure and the residue was partitioned with ethyl acetate (100 mL) and water (100 mL). The aqueous layer was extracted twice with ethyl acetate (100 mL×2). The combined organic was washed with brine, dried over $Na_2SO_4$, filtered and concentrated to afford 4-chloro-2-mercaptobenzonitrile (4.3 g, 81%) as a yellowish liquid which was used as obtained in the next step without further purification.

Step 3: To a solution of 4-chloro-2-mercaptobenzonitrile (9.5 g, 56.0042 mmol, 1.0 eq.) in ethyl acetate (100 ml) was added bromine (4.9 ml, 95.2072 mmol, 1.7 eq.) portionwise at 0° C. The resulting reaction mixture was stirred at ambient temperature for 30 min. After completion of the reaction the mixture was diluted with ethyl acetate (100 mL), washed with sodium thiosulphate solution (10%, 3×50 mL) followed by brine (50 mL), dried over anhydrous $Na_2SO_4$ and concentrated under reduced pressure to afford the crude compound. The crude compound was purified by column chromatography (230-400 mesh silica gel; 0-5% ethyl acetate in hexane; Rf-value-0.4 in 10% ethyl acetate in hexane) to afford 3-bromo-6-chlorobenzo[d]isothiazole (4.02 g, 29%) as an off-white solid.

Step 4: To a solution of 3-bromo-6-chlorobenzo[d]isothiazole (1.0 g, 4.024 mmol, 1.0 eq.) in THF (20 mL) was added TEA (2.5 ml, 17.94 mmol, 4.5 eq.) at ambient temperature. After degassing the reaction mixture for 15 min, the mixture was purged with prop-1-yne gas followed by the addition of $PdCl_2(PPh_3)_2$ (1.2 g, 1.71 mmol, 0.4 eq.) and CuI (0.326 g, 1.71 mmol, 0.4 eq.) at −78° C. The reaction mixture was then stirred at ambient temperature for 16 h. After completion of the reaction (monitored by TLC, 5% ethyl acetate in hexane, Rf-0.3), the reaction mixture was filtered through a celite bed and evaporated under reduced pressure to obtain the crude compound. The crude compound was purified by column chromatography using 230-400 silica gel and 0-2% ethyl acetate in hexane as eluting solvent to afford 6-chloro-3-(prop-1-yn-1-yl)benzo[d]isothiazole (0.6 g, 72%) as an off-white solid.

Synthesis of 6-bromo-1-(4-fluorophenyl)imidazo[1,5-a]pyridine (intermediate B5)

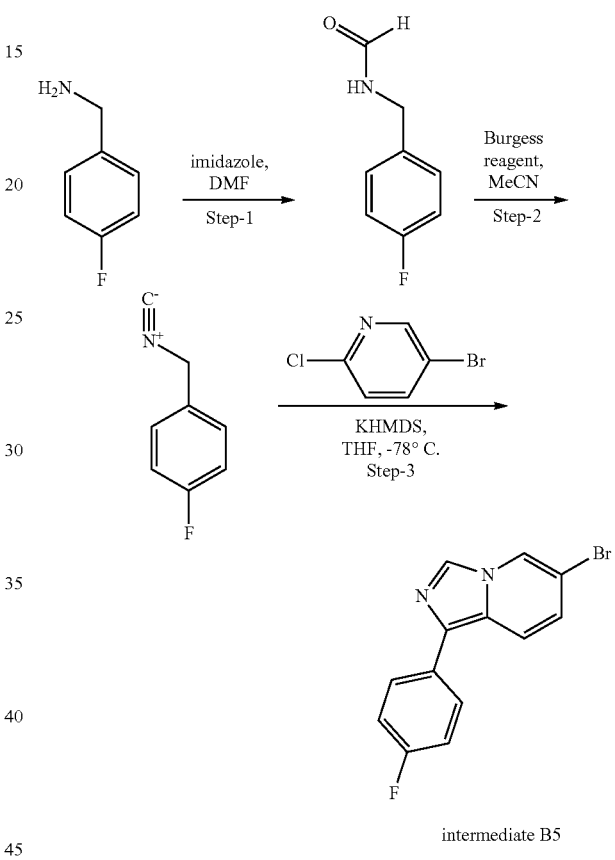

intermediate B5

Step 1: To a solution of (4-fluorophenyl)methanamine (10.0 mL, 79.910 mmol, 1.0 eq.) in DMF (100 mL) was added imidazole (12.0 g, 159.82 mmol, 2.0 eq.) and the resulting mixture was stirred for 12 h under a nitrogen atmosphere at 140° C. After completion of the reaction (monitored by TLC, TLC system 30% EtOAc in Hexane, Rf-0.2), the reaction mixture was diluted with ethyl acetate (250 mL), washed with ice cold water (3×50 mL), dried over $Na_2SO_4$ and concentrated under reduced pressure to get the crude compound which was purified by column chromatography (230-400 mesh silica gel; 25% EtOAc in hexane as eluent) to afford N-(4-fluorobenzyl)formamide (6.5 g, 53%).

Step 2: To a solution of N-(4-fluorobenzyl)formamide (5.0 g, 32.647 mmol, 1.0 eq.) in acetonitrile (100 mL) was added Burgess reagent (11.66 g, 48.971 mmol, 1.5 eq.) and the resulting reaction mixture was stirred for 12 h under a nitrogen atmosphere at 90° C. After completion of the reaction (monitored by TLC, TLC system 30% EtOAc in Hexane, Rf-0.6), the reaction mixture was diluted with ethyl acetate (250 mL), washed with ice cold water (3×50 mL), dried over $Na_2SO_4$ and concentrated under reduced pressure to get the crude compound which was purified by column chromatography (230-400 mesh silica gel; 10% EtOAc in hexane as eluent) to afford 1-fluoro-4-(isocyanomethyl) benzene (2.0 g, 45%).

Step 3: To a solution of 1-fluoro-4-(isocyanomethyl) benzene (0.315 g, 2.313 mmol, 1.0 eq.) in THF (20 mL) was added KHMDS (1M, 2.3 mL, 2.313 mmol, 1.0 eq.) and the resulting mixture was stirred for 5 min under a nitrogen atmosphere at 78° C. Then, 5-bromo-2-chloro-pyridine (0.534 g, 2.776 mmol, 1.2 eq.) in THF was added at 78° C. and the resulting mixture was stirred at ambient temperature for 12 h. After completion of the reaction (monitored by TLC, TLC system 30% EtOAc in hexane, Rf-0.5), the reaction mixture was quenched with sat. NH₄Cl solution, extracted with ethyl acetate (50 mL), washed with water (50 mL), dried over Na₂SO₄ and concentrated to get the crude compound which was purified by column chromatography (230-400 mesh silica gel; 10% EtOAc in Hexane as eluent) to afford 6-bromo-1-(4-fluorophenyl)imidazo[1,5-a]pyridine (0.03 g, 4%).

Synthesis of 5-bromo-1-(4-fluorophenyl)-1H-benzo[d][1,2,3]triazole (intermediate B6)

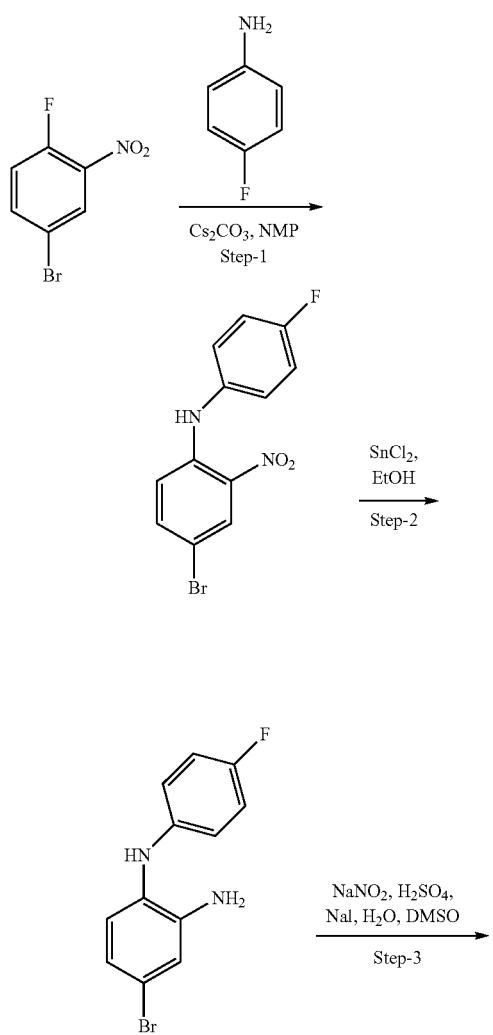

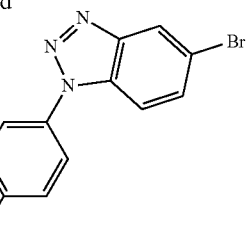

intermediate B6

To a stirred solution of 4-bromo-1-fluoro-2-nitrobenzene (5.0 g, 22.727 mmol, 1.0 eq.) and 4-fluoroaniline (3.78 g, 34.090 mmol, 1.5 eq.) in NMP (50 mL) was added Cs₂CO₃ (12.0 g, 34.090 mmol, 1.5 eq.) at ambient temperature and the reaction mixture was then stirred at 140° C. for 16 h. After completion of the reaction (monitored by TLC, TLC system, hexane, Rf-0.2), the reaction mixture was diluted with ethyl acetate (250 mL), washed with ice cold water (3×150 mL), dried over Na₂SO₄ and concentrated under reduced pressure to get the crude compound which was purified by column chromatography to afford 4-bromo-N-(4-fluorophenyl)-2-nitroaniline (1.4 g, 20%).

To a stirred solution of 4-bromo-N-(4-fluorophenyl)-2-nitroaniline (1.2 g, 3.857 mmol, 1.0 eq.) in ethanol (25 mL) was added tin (II) chloride (2.19 g, 11.571 mmol, 3.0 eq.) and the reaction was heated to reflux for 3 h. After completion of the reaction (monitored by TLC, TLC system 20% ethyl acetate in hexane, Rf-0.4), the solvent was evaporated under reduced pressure. The obtained residue was diluted with cold water and basified with 3N NaOH solution. The resulting mixture was filtered, the filtered-off solids were washed with ethyl acetate, the filtrate was dried over Na₂SO₄ and concentrated under reduced pressure to get the crude compound which was purified by column chromatography (230-400 mesh silica gel; 5-20% ethyl acetate in hexane) to afford 4-bromo-N1-(4-fluorophenyl)benzene-1,2-diamine (1.0 g, 92%).

To a stirred solution of 4-bromo-N1-(4-fluorophenyl)benzene-1,2-diamine (0.7 g, 2.490 mmol, 1.0 eq.) in DMSO (5 mL) was added 30% H₂SO₄ (6.0 mL). The mixture was cooled to 0° C. and a solution of sodium nitrite (0.257 g, 3.735 mmol, and 1.5 eq.) in water (1.5 mL) was added dropwise. After 20 min, a solution of sodium iodide (0.257 g, 3.735 mmol, 3.16 eq.) in water (1.5 mL) was added dropwise and the reaction was stirred at ambient temperature for 30 min. After completion of the reaction (monitored by TLC, TLC system 20% Ethyl acetate in hexane, Rf-0.5), the reaction mixture was poured into ice cold water and the resulting precipitate was filtered and washed with sodium thiosulfate solution (50 mL) and ethyl acetate (100 mL). The organic layer was dried over Na₂SO₄ and concentrated under reduced pressure to get the crude compound which was purified by column chromatography (230-400 mesh silica gel; 10-15% Ethyl acetate in hexane) to afford 5-bromo-1-(4-fluorophenyl)-1H-benzo[d][1,2,3]triazole) (0.51 g, 70%).

Synthesis of 4-(bromomethyl)-6-fluoro-1-(methylsulfonyl)-1H-indole (intermediate B7)

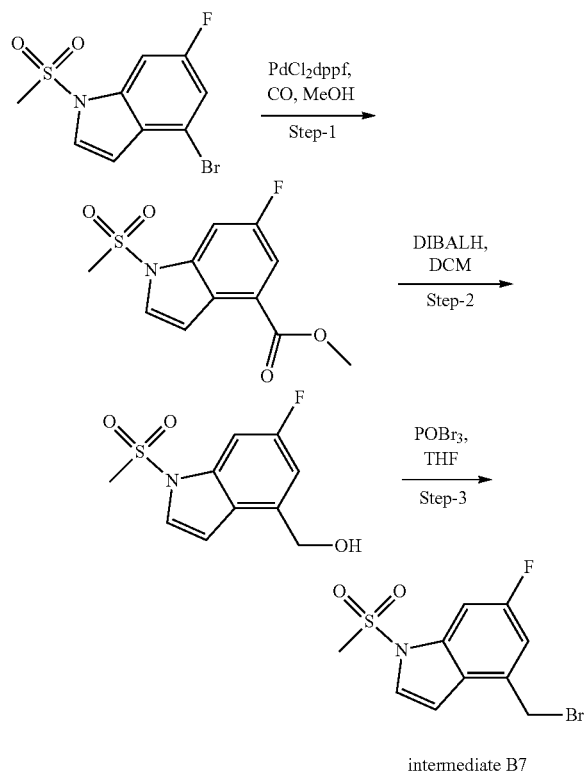

intermediate B7

Step 1: To a stirred solution of 4-bromo-6-fluoro-1-(methylsulfonyl)-1H-indole (1.0 g, 3.42 mmol, 1.0 eq.) in methanol (20 mL) were added TEA (1.5 mL, 10.27 mmol, 3.0 eq.) and DMF (5 mL) and the mixture was degassed for 15 minutes. PdCl$_2$dppf (0.28 g, 0.342 mmol, 0.1 eq.) was added and the mixture was again degassed for 5 min. The reaction mixture was then heated to 110° C. under a carbon monoxide atmosphere (220 psi) in an Parr-autoclave for 5 h. After completion, the reaction mixture was filtered through a celite bed. The filtrate was concentrated under reduced pressure to get the crude compound which was purified by column chromatography (100-200 mesh silica gel; 20% EtOAc-hexane; Rf-value-0.4) to get methyl 6-fluoro-1-(methylsulfonyl)-1H-indole-4-carboxylate (0.7 g, 75%).

Step 2: To a stirred solution of 6-fluoro-1-(methylsulfonyl)-1H-indole-4-carboxylate (0.26 g, 0.959 mmol, 1.0 eq.) in DCM (15 mL) was added DIBAL-H (1 M in tolune) at 0° C. and the reaction mixture was stirred at 0° C. for 30 min. After completion of the reaction, the reaction mixture was quenched with a sat. solution of sodium potassium tartrate and the resulting mixture was stirred for 90 min at ambient temperature. The reaction mixture was then filtered through a celite bed. The filtrate was concentrated to get the crude compound which was purified by column chromatography (100-200 mesh silica gel; hexane; Rf-value-0.4) to get (6-fluoro-1-(methylsulfonyl)-1H-indol-4-yl)methanol (0.2 g, 86%).

Step 3: To a stirred solution of (6-fluoro-1-(methylsulfonyl)-1H-indol-4-yl)methanol (0.23 g, 0.946 mmol, 1.0 eq.) in THF (25 mL) was added POBr$_3$ at 0° C. and the reaction mixture was heated to reflux for 16 h. After completion of the reaction, the reaction mixture was concentrated to get the crude compound which was purified by column chromatography (100-200 mesh silica gel; Hexane; Rf-value-0.6) to get 4-(bromomethyl)-6-fluoro-1-(methylsulfonyl)-1H-indole (0.19 g, 66%).

Synthesis of 5-bromo-1-(4-fluorobenzyl)-1H-indole (intermediate B8)

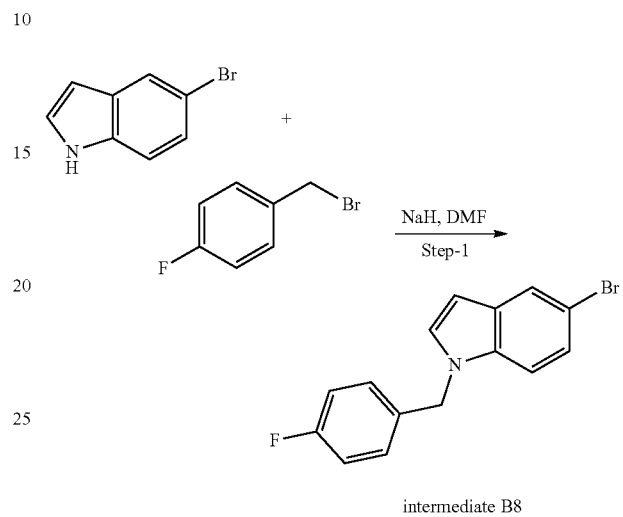

intermediate B8

Step 1: 5-Bromo-1H-indole (500.0 mg, 2.550 mmol, 1.0 eq.) was dissolved in DMF (5 mL), the mixture was cooled to 0° C., then NaH (60%, 122.4 mg, 3.061 mmol, 1.2 eq.) was added, and the mixture was stirred for 10 minutes. Then, 1-(bromomethyl)-4-fluorobenzene (0.38 mL, 3.061 mL, 1.2 eq.) was added, and the mixture was stirred at that temperature for 16 hours. The reaction was quenched by the addition of water. EtOAc and more water were then added, and the layers were separated. The aqueous phase was extracted two more times with EtOAc. The combined organic layers were washed with water, then brine, and were then dried over MgSO$_4$. The solvent was removed under reduced pressure and the obtained residue was then purified via LC to give 5-bromo-1-(4-fluorobenzyl)-1H-indole (520.5 mg, 67%) as an amber oil.

Example 1: N-(trans-1-(3-(4-fluorophenyl)benzo[d]isoxazol-6-yl)-5-oxo-2-phenylpyrrolidin-3-yl)cyclopropanecarboxamide

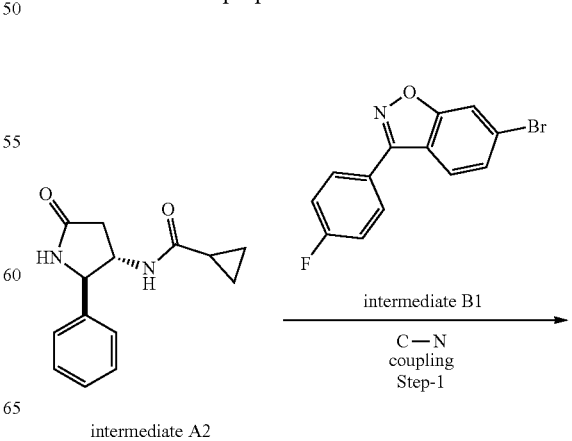

intermediate A2 intermediate B1

C—N coupling
Step-1

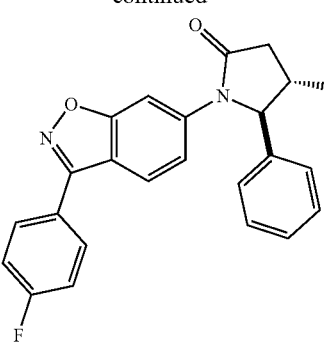

example 1

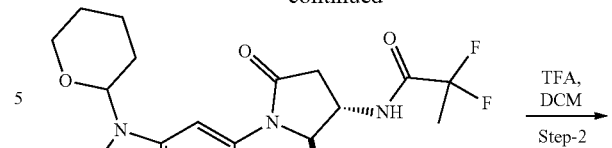

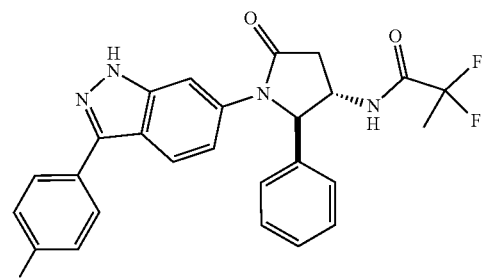

example 2

Step 1: A stirred solution of N-(trans-5-oxo-2-phenylpyrrolidin-3-yl)cyclopropanecarboxamide (0.1 g, 0.409 mmol, 1.0 eq.), 6-bromo-3-(4-fluorophenyl)benzo[d]isoxazole (0.180 g, 0.614 mmol, 1.5 eq), K$_3$PO$_4$ (0.173 g, 0.818 mmol, 2.0 eq.) in 1,4-dioxane (10 mL) was degassed with argon for 30 min. Then, trans-N,N'-dimethylcyclohexane-1,2-diamine (0.023 g, 0.1636 mmol, 0.4 eq.) and CuI (0.015 g, 0.0818 mmol, 0.2 eq.) were added and the reaction was stirred for 16 h at 90° C. in a sealed tube. After completion of the reaction (monitored by TLC, TLC system 5% methanol in DCM, Rf-0.4), the reaction mixture was filtered through a celite bed and the celite bed was washed 2-3 times with 1,4-dioxane. The combined organic layers were concentrated under reduced pressure to get the crude compound which was purified by column chromatography (230-400 mesh silica gel; 0 to 2% MeOH in DCM) followed by prep HPLC to afford N-(trans-1-(3-(4-fluorophenyl)benzo[d]isoxazol-6-yl)-5-oxo-2-phenylpyrrolidin-3-yl)cyclopropanecarboxamide (0.036 g, 19%) as a white solid.

$^1$H NMR (DMSO-d$_6$): δ=8.91; (d, 1H), 8.08; (s, 1H), 7.99-8.04; (m, 3H), 7.67; (dd, 1H), 7.43; (t, 2H), 7.34-7.36; (m, 4H), 7.26-7.27; (m, 1H), 5.39; (s, 1H), 4.16; (t, 1H), 3.11; (q, 1H), 1.58 (m, 1H), 0.69-0.76; (m, 4H). CH omitted by DMSO peak.

Example 2: 2,2-difluoro-N-(trans-1-(3-(4-fluorophenyl)-1H-indazol-6-yl)-5-oxo-2-phenylpyrrolidin-3-yl)propanamide

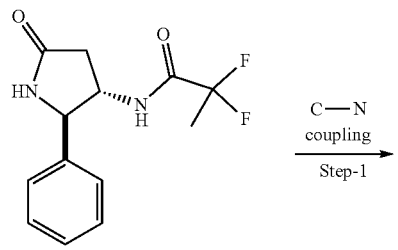

intermediate A1

Step 1: A stirred solution of 2,2-difluoro-N-(trans-5-oxo-2-phenylpyrrolidin-3-yl)propanamide (0.3 g, 1.118 mmol, 1.0 eq.), 6-bromo-3-(4-fluorophenyl)-1-(tetrahydro-2H-pyran-2-yl)-1H-indazole (0.503 g, 1.342 mmol, 1.2 eq.) and K$_3$PO$_4$ (0.474 g, 2.236 mmol, 2 eq) in 1,4-dioxane (20 mL) was degassed with argon for 30 minutes. Then, trans-N,N'-dimethylcyclohexane-1,2-diamine (0.063 g, 0.4472 mmol, 0.4 eq.) and CuI (0.042 g, 0.2236 mmol, 0.2 eq.) were added and the reaction mixture was heated to 90° C. for 16 h in a sealed tube. After completion of the reaction (monitored by TLC, TLC system 5% methanol in DCM, Rf-0.4), the reaction mixture was filtered through a celite bed and the celite bed was washed 2-3 times with 1,4-dioxane. The combined organic layers were concentrated under reduced pressure to get the crude compound which was purified by column chromatography (230-400 mesh silica gel; 0 to 2% MeOH in DCM) to afford 2,2-difluoro-N-(trans-1-(3-(4-fluorophenyl)-1-(tetrahydro-2H-pyran-2-yl)-1H-indazol-6-yl)-5-oxo-2-phenylpyrrolidin-3-yl)propanamide (0.252 g, 40%).

Step 2: To a stirred solution of 2,2-difluoro-N-(trans-1-(3-(4-fluorophenyl)-1-(tetrahydro-2H-pyran-2-yl)-1H-indazol-6-yl)-5-oxo-2-phenylpyrrolidin-3-yl)propanamide (0.177 g, 0.314 mmol, 1.0 eq.) in DCM (10 mL) was added TFA (0.7 mL) dropwise at 0° C. and the resulting mixture was then stirred for 16 h. After completion of the reaction (monitored by TLC, TLC system 5% methanol in DCM, Rf-0.2), the TFA was evaporated under reduced pressure and the obtained residue was dissolved in EtOAc (100 mL) and was washed with saturated aqueous NaHCO$_3$ (2×10 mL) and brine (10 mL). The organic layer was dried over anhydrous Na$_2$SO$_4$ and concentrated under reduced pressure to get the crude compound which was purified by column chromatography (230-400 mesh silica gel; 0 to 2% methanol in DCM) followed by prep HPLC to afford 2,2-difluoro-N-(trans-1-(3-(4-fluorophenyl)-1H-indazol-6-yl)-5-oxo-2-phenylpyrrolidin-3-yl)propanamide (0.042 g, 28%) as a white solid.

¹H NMR (DMSO-d₆): δ=13.12; (s, 1H), 9.52; (d, 1H), 7.91-7.97; (m, 3H), 7.73; (s, 1H), 7.25-7.37; (m, 7H), 5.36; (s, 1H), 4.25; (s, 1H), 3.11; (q, 1H), 2.61-2.65; (m, 1H), 1.78; (t, 3H).

Example 3: 2,2-difluoro-N-(trans-5-oxo-2-phenyl-1-(3-(prop-1-yn-1-yl)benzo[d]isothiazol-6-yl)pyrrolidin-3-yl)propanamide

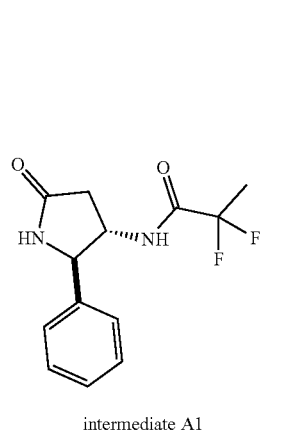

intermediate A1

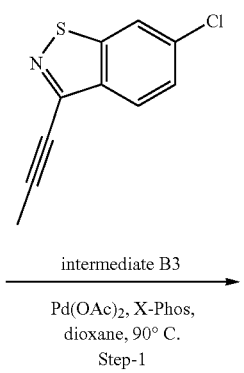

intermediate B3

Pd(OAc)₂, X-Phos,
dioxane, 90° C.
Step-1 example 3

Step 1: A stirred solution of 6-chloro-3-(prop-1-yl)benzo[d]isothiazole (0.6 g, 2.889 mmol, 1.2 eq.), 2,2-difluoro-N-(trans-5-oxo-2-phenylpyrrolidin-3-yl)propanamide (0.648 g, 2.418 mmol, 1.0 eq.) and Cs₂CO₃ (1.8 g, 5.52 mmol, 2.0 eq.) in 1,4-dioxane (30 mL) was degassed with argon for 30 min. Then X-Phos (0.462 g, 0.969 mmol, 0.4 eq.) and Pd(OAc)₂ (0.108 g, 0.481 mmol, 0.2 eq.) were added and the reaction was stirred for 16 h at 90° C. in a sealed tube. After completion of the reaction (monitored by TLC, TLC system 5% MeOH in DCM, Rf-0.2), the reaction mixture was filtered through a celite bed and the celite bed was washed 2-3 times with 1,4-dioxane. The combined organic layers were concentrated under reduced pressure to get the crude compound which was purified by preparative HPLC to afford 2,2-difluoro-N-(trans-5-oxo-2-phenyl-1-(3-(prop-1-yn-1-yl)benzo[d]isothiazol-6-yl)pyrrolidin-3-yl)propanamide (0.028 g, 2%).

¹H NMR (DMSO-d₆): δ=9.54; (d, 1H), 8.32; (d, 1H), 7.99-7.97 (m, 1H), 7.86-7.84; (m, 1H), 7.34-7.32; (m, 4H), 7.26-7.24; (m, 1H), 5.40; (d, 1H), 4.27; (m, 1H), 3.17-3.11; (m, 1H), 2.67-2.62; (m, 1H), 2.17; (s, 3H), 1.78; (t, 3H).

Example 5: N-(trans-1-(1-(4-fluorophenyl)imidazo[1,5-a]pyridin-6-yl)-5-oxo-2-phenylpyrrolidin-3-yl)cyclopropanecarboxamide

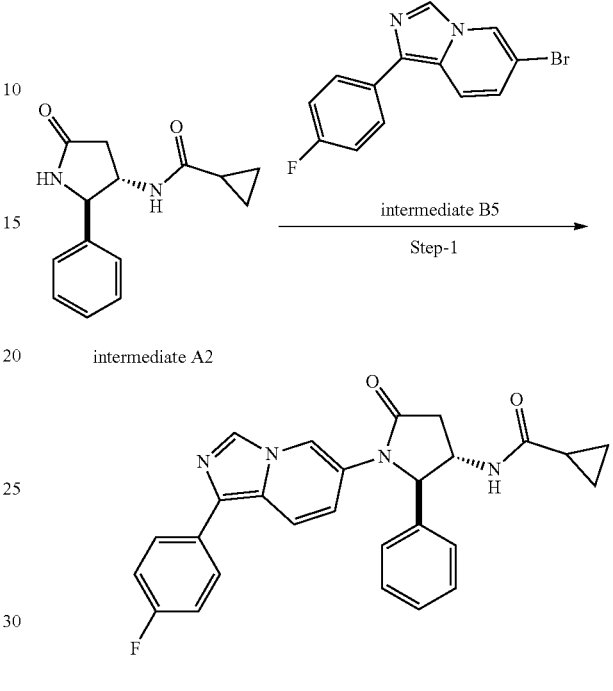

example 5

Step 1: A stirred solution of N-(trans-5-oxo-2-phenylpyrrolidin-3-yl)cyclopropanecarboxamide (0.04 g, 0.1648 mmol, 1.2 eq.), 6-bromo-1-(4-fluorophenyl)imidazo[1,5-a]pyridine (0.04 g, 0.1374 mmol, 1.0 eq.) and K₃PO₄ (0.058 g, 0.2748 mmol, 2.0 eq.) in 1,4-dioxane (10 mL) was degassed with argon for 30 min. Then, trans-N,N'-dimethylcyclohexane-1,2-diamine (0.0078 g, 0.0549 mmol, 0.4 eq.) and CuI (0.0052 g, 0.0274 mmol, 0.2 eq.) were added and the reaction was stirred for 16 h at 90° C. in a sealed tube. After completion of the reaction (monitored by TLC, TLC system 5% methanol in DCM, Rf-0.4), the reaction mixture was filtered through a celite bed and the celite bed was washed 2-3 times with 1,4-dioxane. The combined organic layers were concentrated under reduced pressure to get the crude compound which was purified by column chromatography (230-400 mesh silica gel; 0 to 2% MeOH in DCM) to afford N-(trans-1-(1-(4-fluorophenyl)imidazo[1,5-a]pyridin-6-yl)-5-oxo-2-phenylpyrrolidin-3-yl)cyclopropanecarboxamide (0.002 g, 27%).

¹H NMR (DMSO-d₆): δ=8.90; (d, 1H), 8.70; (s, 1H), 7.45; (s, 1H), 7.87-7.81; (m, 3H), 7.36-7.35; (m, 4H), 7.28-7.20; (m, 3H), 7.12-7.09; (m, 1H), 5.20; (d, 1H), 4.15; (bs, 1H), 3.09-3.03; (m, 1H), 2.43-2.32; (m, 1H), 1.59; (m, 1H), 0.76-0.70; (m, 4H).

Example 10: N-(trans-1-(1-(4-fluorophenyl)-1H-benzo[d][1,2,3]triazol-5-yl)-5-oxo-2-phenylpyrrolidin-3-yl)cyclopropanesulfonamide

Example 11: 2,2-difluoro-N-(trans-14(6-fluoro-1H-indol-4-yl)methyl)-5-oxo-2-phenylpyrrolidin-3-yl)propanamide

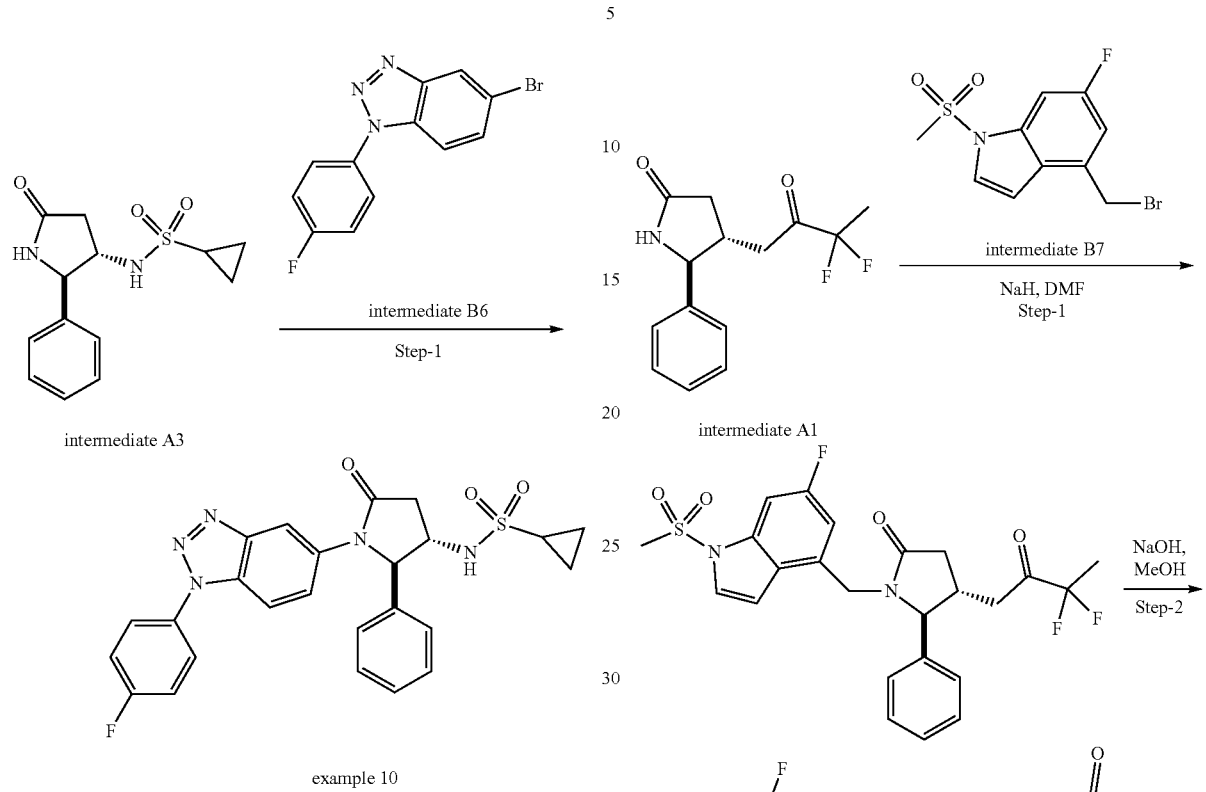

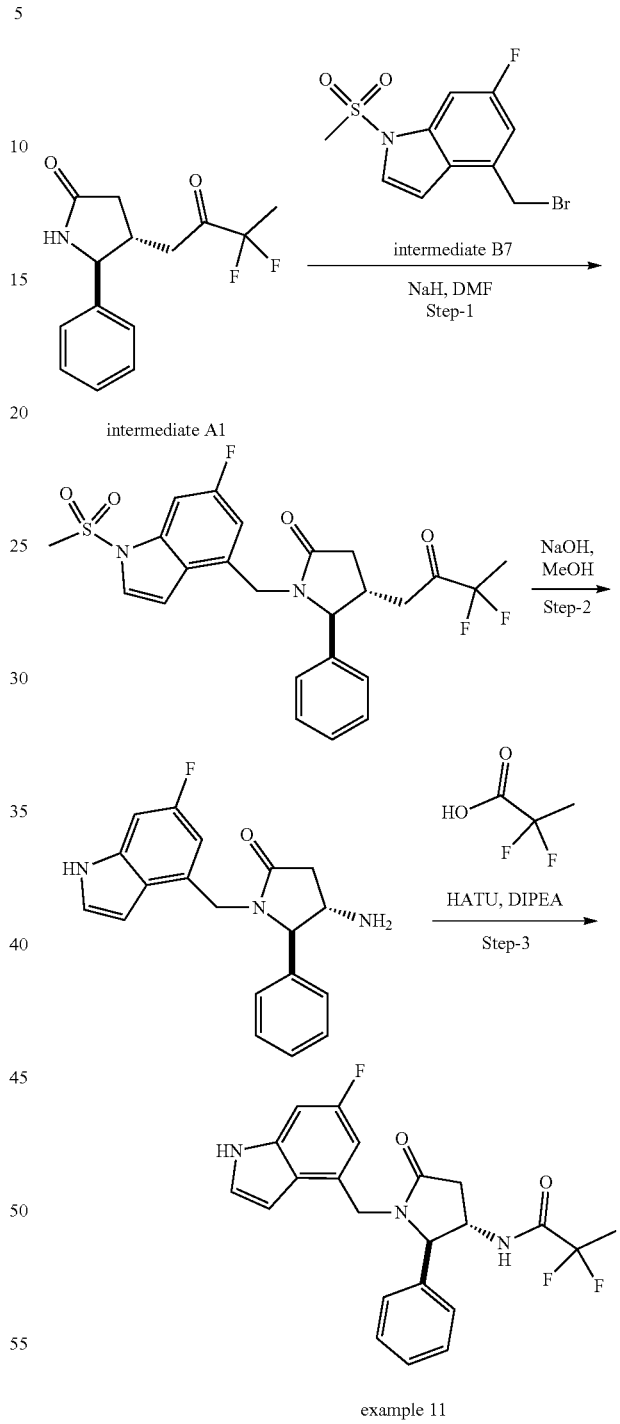

Step 1: A stirred solution of N-(trans-5-oxo-2-phenylpyrrolidin-3-yl)cyclopropanesulfonamide (0.100 g, 0.356 mmol, 1.0 eq.), 5-bromo-1-(4-fluorophenyl)-1H-benzo[d][1,2,3]triazole (0.125 g, 0.428 mmol, 1.2 eq.) and K$_3$PO$_4$ (0.151 g, 0.713 mmol, 2.0 eq.) in 1,4-dioxane (15 mL) was degassed with argon for 30 min. Then, trans-N,N'-dimethylcyclohexane-1,2-diamine (0.020 g, 0.1426 mmol, 0.4 eq.) and CuI (0.0135 g, 0.0713 mmol, 0.2 eq.) were added and the reaction mixture was stirred for 16 h at 90° C. in a sealed tube. After completion of the reaction (monitored by TLC, TLC system 5% methanol in DCM, Rf-0.4), the reaction mixture was concentrated under reduced pressure, diluted with ethyl acetate (50 mL), washed with water (2×25 mL), dried over anhydrous Na$_2$SO$_4$ and concentrated under reduced pressure to get the crude compound which was purified by prep. HPLC to afford N-(trans-1-(1-(4-fluorophenyl)-1H-benzo[d][1,2,3]triazol-5-yl)-5-oxo-2-phenylpyrrolidin-3-yl)cyclopropanesulfonamide (0.030 mg, 17%).

$^1$H NMR (DMSO-d$_6$): δ=8.09; (s, 1H), 8.03; (d, 1H), 7.89-7.86; (m, 2H), 7.81; (s, 2H), 7.50; (t, 3H), 7.42-7.40; (m, 2H), 7.32; (t, 2H), 7.60-7.20; (m, 1H), 5.38; (d, 1H), 4.00-3.90; (m, 1H), 3.30-3.10; (m, 1H), 2.67-2.53; (m, 1H), 0.95-0.80; (m, 4H), CH omitted by DMSO Peak.

Step 1: To an ice cooled stirred solution of 2,2-difluoro-N-(trans-5-oxo-2-phenylpyrrolidin-3-yl)propanamide (0.1 g, 0.373 mmol, 1.0 eq.) in DMF (10 mL) was added NaH (0.018 g, 0.447 mmol, 1.2 eq., 60%) and the resulting mixture was stirred for 5 minutes. Then, 4-(bromomethyl)-6-fluoro-1-(methylsulfonyl)-1H-indole (0.114 ml, 0.373 mmol, 1.0 eq., dissolved in 10 mL DMF) was added dropwise. The reaction mixture was stirred for 1 h at 0° C.

After completion of the reaction, the reaction mixture was diluted with ethyl acetate and was washed 2-3 times with ice cold water. The combined organic layers were concentrated under reduced pressure to get the crude compound which was purified by column chromatography (100-200 mesh silica gel; 50% EtOAc-hexane; Rf-0.5) to afford 2,2-difluoro-N-(trans-14(6-fluoro-1-(methylsulfonyl)-1H-indol-4-yl)methyl)-5-oxo-2-phenylpyrrolidin-3-yl)propanamide (0.04 g, 22%).

Step 2: To a stirred solution of 2,2-difluoro-N-(trans-1-((6-fluoro-1-(methylsulfonyl)-1H-indol-4-yl)methyl)-5-oxo-2-phenylpyrrolidin-3-yl)propanamide (0.16 g, 0.324 mmol, 1.0 eq.) in MeOH (15 mL) was added 2 N NaOH solution (5 mL) and the reaction mixture was heated to 80° C. for 2 h. After completion of the reaction (monitored by LCMS), the reaction mixture was concentrated to obtain trans-4-amino-14(6-fluoro-1H-indol-4-yl)methyl)-5-phenylpyrrolidin-2-one (0.1 g, 95%).

Step 3: To a stirred solution of trans-4-amino-1-((6-fluoro-1H-indol-4-yl)methyl)-5-phenylpyrrolidin-2-one (0.1 g, 0.309 mmol, 1.0 eq.) in DMF (10 mL) were added HATU (0.176 mg, 0.46 mmol, 1.5 eq.), DIPEA (0.26 mL, 1.54 mmol, 5.0 eq.) and 2,2-difluoropropanoic acid (0.044 g, 0.4 mmol, 1.3 eq.) and the reaction mixture was stirred for 16 h at ambient temperature. After completion of the reaction, the reaction mixture was diluted with ethyl acetate and was washed with ice cold water, sat. NaHCO$_3$ and sat. NH$_4$Cl solution. The combined organic layers were concentrated under reduced pressure to get the crude compound which was purified by column chromatography (100-200 mesh silica gel; 2% MeOH-DCM; Rf-value-0.5) to afford 2,2-difluoro-N-(trans-14(6-fluoro-1H-indol-4-yl)methyl)-5-oxo-2-phenylpyrrolidin-3-yl)propanamide (0.04 g, 31%).

$^1$H NMR (DMSO-d$_6$): δ=11.19; (s, 1H), 9.18; (d, 1H), 7.41-7.34; (m, 3H), 7.28-7.26; (m, 1H), 7.19-7.18; (m, 2H), 7.07-7.04; (m, 1H), 6.47-6.44; (m, 1H), 6.27; (s, 1H), 5.16-5.12; (m, 1H), 4.32-4.31; (m, 1H), 4.16; (bs, 1H), 3.78-3.74; (m, 1H), 2.87-2.81; (m, 1H), 2.59-2.53; (m, 1H), 1.65-1.55; (m, 3H).

Example 17: 2,2-difluoro-N-(trans-1-(1-(4-fluorophenyl)imidazo[1,5-a]pyridin-6-yl)-5-oxo-2-phenylpyrrolidin-3-yl)propanamide

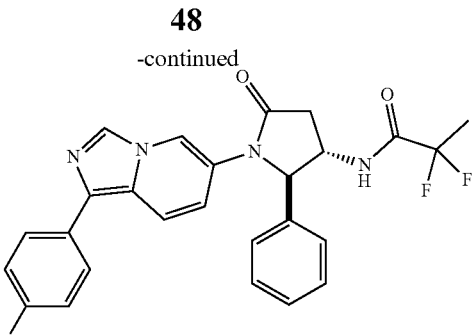

example 17

Step 1: A stirred solution of 2,2-difluoro-N-(trans-5-oxo-2-phenylpyrrolidin-3-yl)propanamide (0.055 g, 0.2061 mmol, 1.2 eq.), 6-bromo-1-(4-fluorophenyl)imidazo[1,5-a]pyridine (0.050 g, 0.1717 mmol, 1.0 eq.) and K$_3$PO$_4$ (0.072 g, 0.3434 mmol, 2.0 eq.) in 1,4-dioxane (5 mL) was degassed with argon for 30 minutes. Then, trans-N,N'-dimethylcyclohexane-1,2-diamine (0.009 g, 0.0686 mmol, 0.4 eq.) and CuI (0.006 g, 0.0343 mmol, 0.2 eq.) were added and the reaction was stirred for 16 h at 90° C. in a sealed tube. After completion of the reaction (monitored by TLC, TLC system 5% methanol in DCM, Rf-0.4), the reaction mixture was filtered through a celite bed and the celite bed was washed 2-3 times with 1,4-dioxane. The combined organic layers were concentrated under reduced pressure to get the crude compound which was purified by column chromatography (230-400 mesh silica gel; 0 to 2% MeOH in DCM) to afford 2,2-difluoro-N-(trans-1-(1-(4-fluorophenyl)imidazo[1,5-a]pyridin-6-yl)-5-oxo-2-phenylpyrrolidin-3-yl)propanamide (0.02 g, 20%).

$^1$H NMR (DMSO-d$_6$): δ=9.50; (d, 1H), 8.66; (s, 1H), 7.44; (s, 1H), 7.87-7.81; (m, 3H), 7.36-7.33; (m, 4H), 7.27-7.20 (m, 3H), 7.06-7.03 (m, 1H), 5.25 (d, 1H), 4.27 (bs, 1H), 3.14-3.08 (m, 1H), 2.66-2.59; (m, 1H), 1.79; (t, 3H).

Example 22: 2 2-difluoro-N-(trans-1-(1-(4-fluorobenzyl)-1H-indol-5-yl)-5-oxo-2-phenylpyrrolidin-3-yl)propanamide

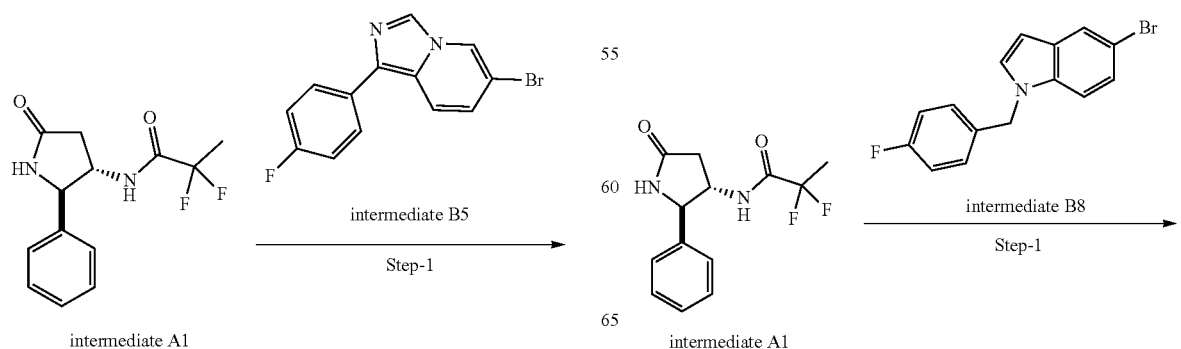

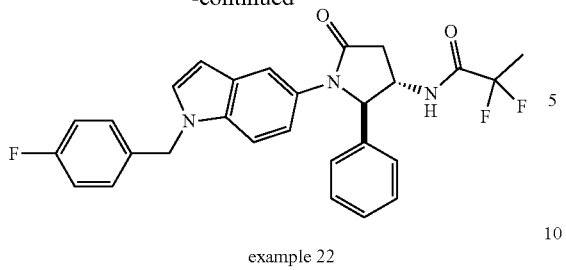

example 22

Step 1: 2,2-Difluoro-N-(trans-5-oxo-2-phenylpyrrolidin-3-yl)propanamide (80.0 mg, 0.298 mmol, 1.0 eq.), CuI (11.4 mg, 0.057 mmol, 0.2 eq.), NaI (134.1 mg, 0.895 mmol, 3.0 eq.), K₃PO₄ (189.9 mg, 0.895 mmol, 3.0 eq.) and 5-bromo-1-(4-fluorobenzyl)-1H-indole (181.4 mg, 0.596 mmol, 2.0 eq.) are weighed out into a microwave vial, a stir bar was added, the vial was sealed and was purged with nitrogen. Then, 1,4-dioxane (1.5 mL) and trans-N, N Dimethylcyclohexane-1, 2-diamine (0.02 mL, 0.119 mmol, 0.4 eq.) were added and the mixture was heated to 110° C. for 16 hours. The reaction mixture was then cooled to ambient temperature, was diluted with DCM and water, and was filtered through a hydrophobic frit. The solvent was removed, and the residue was purified via MPLC and later HPLC to give 2,2-difluoro-N-(trans-1-(1-(4-fluorobenzyl)-1H-indol-5-yl)-5-oxo-2-phenylpyrrolidin-3-yl)propanamide (82.8 mg, 56%).

¹H NMR (DMSO-d₆): δ=:9.44; (d, 1H), 7.54; (d, 1H), 7.46; (d, 1H), 7.36; 7.27; (m, 5H), 7.22; (ddd, 3H), 7.15; (dd, 1H), 7.13; 7.08; (m, 2H), 6.41; (dd, 1H), 5.32; (s, 2H), 5.21; (d, 1H), 4.23; (tt, 1H), 3.04; (dd, 1H), 2.59; (dd, 1H), 1.78; (t, 3H).

Example 23: N-[rac-((2R,3S)-1-(3-(4-fluorophenyl)benzo[d]isoxazol-6-yl)-4,4-dimethyl-5-oxo-2-phenylpyrrolidin-3-yl)]cyclopropanecarboxamide

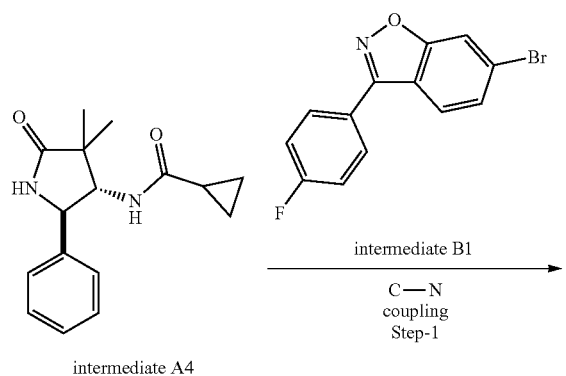

intermediate A4 → intermediate B1
C—N coupling Step-1

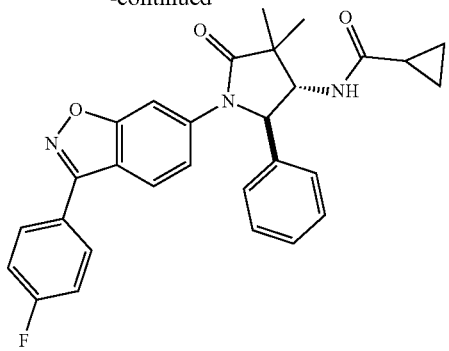

example 23

To a stirred solution of N-(trans-4,4-dimethyl-5-oxo-2-phenylpyrrolidin-3-yl)cyclopropanecarboxamide (0.13 g, 0.4761 mmol, 1.0 eq.) and 6-bromo-3-(4-fluorophenyl)benzo[d]isoxazole (0.139 g, 0.4761 mmol, 1.0 eq.) in 1, 4-dioxane (5 mL) was added K₃PO₄ (0.303 g, 1.428 mmol, 3.0 eq.) at ambient temperature and the mixture was degassed for 15 minutes followed by the addition of trans-N,N'-dimethylcyclohexane-1,2-diamine (0.09 mL, 0.5714 mmol, 1.2 eq.) and CuI (0.108 g, 0.5714 mmol, 1.2 eq.). The reaction mixture was then heated to 110° C. for 18 h. The reaction mixture was then filtered through a celite pad and the celite pad was washed with EtOAc. The filtrate was washed with water and the solvent was removed under reduced pressure to get the crude compound, which was purified by column chromatography over silica gel (230-400 mesh) using 30-50% EtOAc/PE to afford N-[rac-42R,3S)-1-(3-(4-fluorophenyl)benzo[d]isoxazol-6-yl)-4,4-dimethyl-5-oxo-2-phenylpyrrolidin-3-yl)]cyclopropanecarboxamide (0.040 g, 18%) as an off-white solid. TLC system: 70% EtOAc/PE, Rf: 0.6.

¹H NMR: (DMSO-d6): δ=8.50 (d, 1H), 8.03-7.96; (m, 3H), 7.816; (s, 1H), 7.49-7.40; (m, 3H), 7.36-7.34; (m, 2H), 7.27-7.23; (m, 2H), 7.19-7.15; (m, 1H), 5.21; (d, 1H), 4.32; (t, 1H), 1.68-1.64; (m, 1H), 1.21; (s, 3H), 1.13; (s, 3H), 0.70-67; (m, 3H), 0.65-0.50; (m, 1H).

The examples in the table below have been synthesized in analogy to the described syntheses above, using variations obvious to the person skilled in the art.

| Example Nr. | Structure | Data |
|---|---|---|
| 6 |  | ¹H NMR (DMSO-d₆): δ = 9.55 (d, 1H), 8.39 (d, 1H), 8.35 (d, 1H), 8.21 (d, 1H), 7.94-7.91 (m, 1H), 7.79-7.76 (m, 1H), 7.35-7.32 (m, 4H), 7.27-7.25 (m, 1H), 6.53 (d, 1H), 5.43 (d, 1H), 4.27 (m, 1H), 3.54 (s, 3H), 3.26-3.12 (m, 1H), 2.67-2.63 (m, 1H), 1.78 (t, 3H). |

-continued
| Example Nr. | Structure | Data |
|---|---|---|
| 7 | 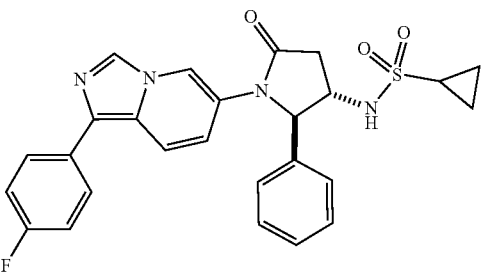 [SMILES: O=C1C[C@H](NS(=O)(=O)C2CC2)[C@@H](c2ccccc2)N1c1ccc2c(-c3ccc(F)cc3)ncn2c1] | $^1$H NMR (DMSO-d$_6$): δ = 8.58 (s, 1H), 8.44 (s, 1H), 8.02 (bs, 1H), 7.86-7.80 (m, 3H), 7.37-7.33 (m, 4H), 7.28-7.20 (m, 3H), 6.99-6.97 (m, 1H), 5.23 (d, 1H), 3.95 (bs, 1H), 3.25-3.10 (m, 1H), 2.62-2.53 (m, 1H), 2.43-2.32 (m, 1H), 0.93-0.81 (m, 4H). |
| 8 | 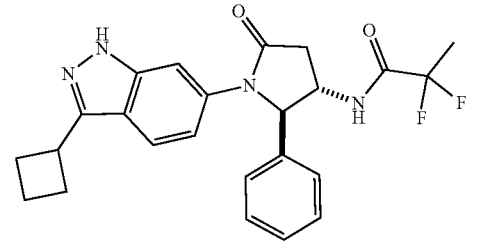 [SMILES: CC(F)(F)C(=O)N[C@H]1CC(=O)N(c2ccc3c(C4CCC4)n[nH]c3c2)[C@@H]1c1ccccc1] | $^1$H NMR (DMSO-d$_6$): δ = 9.47 (d, 1H), 7.59 (d, 2H), 7.37 – 7.28 (m, 4H), 7.24 (dd, 1H), 7.14 (dd, 1H), 5.30 (d, 1H), 4.30 – 4.23 (m, 1H), 3.86 – 3.73 (m, 1H), 3.08 (dd, 1H), 2.68 – 2.62 (m, 1H), 2.38 – 2.26 (m, 4H), 2.07 – 2.00 (m, 1H), 1.94 – 1.87 (m, 1H), 1.78 (t, 3H) |
| 9 | 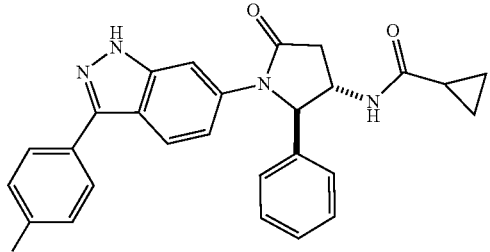 | $^1$H NMR (DMSO-d$_6$): δ = 8.91 (d, 1H), 7.99 – 7.93 (m, 3H), 7.78 (d, 1H), 7.56 – 7.50 (m, 2H), 7.40 – 7.31 (m, 6H), 7.26 (td, 1H), 5.30 (d, 1H), 4.15 (ddd, 1H), 3.07 (dd, 1H), 2.47 (dd, 1H), 1.65 – 1.52 (m, 1H), 0.83 – 0.62 (m, 4H) |
| 12 | 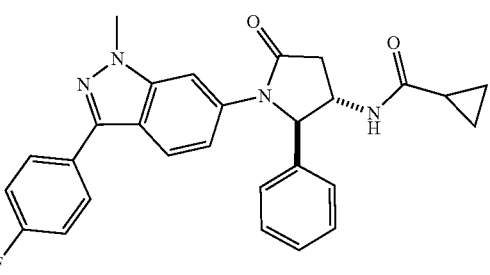 | $^1$H NMR (DMSO-d$_6$): δ = 8.92 (d, 1H), 7.94 (t, 3H), 7.86 (s, 1H), 7.23-7.42 (m, 8H), 5.39 (s, 1H), 4.16 (bs, 1H), 3.99 (s, 3H), 3.09 (q, 1H), 2.45 (m, 1H, partially omitted by DMSO peak), 1.61 (m, 1H), 0.7-0.77 (m, 4H). |
| 13 | 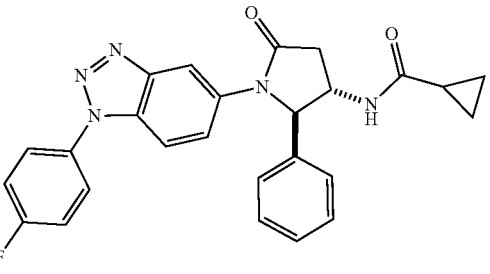 | $^1$H NMR (DMSO-d$_6$): δ = 8.91 (d, 1H), 8.18 (s, 1H), 7.91-7.87 (m, 2H), 7.81 (d, 1H), 7.51 (t, 2H), 7.37-7.31 (m, 4H), 7.25-7.22 (m, 1H), 7.55 (d, 1H), 4.20-4.17 (m, 1H), 3.13-3.07 (m, 1H) 1.61-1.57 (m, 1H), 0.76-0.70 (m, 4H), CH omitted by DMSO peak |

| Example Nr. | Structure | Data |
|---|---|---|
| 14 | | ¹H NMR (DMSO-d₆): δ = 13.12 (s, 1H), 9.52 (d, 1H), 7.91-7.97 (m, 3H), 7.73 (s, 1H), 7.25-7.37 (m, 7H), 5.36 (s, 1H), 4.25 (s, 1H), 3.11 (q, 1H), 2.61-2.65 (m, 1H), 1.78 (t, 3H). |
| 15 | | m/z: found for [m + H]⁺ = 495.2, calc. for $C_{26}H_{26}N_2O_6S$: 494.15 |
| 16 | | ¹H NMR (DMSO-d₆): δ = 9.48 (d, 1H), 8.25 (s, 1H), 8.18 (d, 1H), 7.85 (s, 1H), 7.72-7.69 (m, 1H), 7.59 (s, 2H), 7.36-7.29 (m, 4H), 7.24-7.20 (m, 1H), 6.53 (d, 1H), 5.31 (d, 1H), 4.28-4.26 (m, 1H), 3.13-3.06 (m, 1H), 2.65-2.59 (m, 1H), 1.78 (t, 3H). |
| 18 | | m/z: found for [m + H]⁺ = 441.2, calc. for $C_{23}H_{21}ClN_2O_3S$: 440.10 |
| 19 | | ¹H NMR (DMSO-d₆ at 100° C.): δ = 9.22 (s, 1H), 8.26 (s, 1H), 7.98-8.03 (m, 3H), 7.60 (d, 1H), 7.35-7.38 (m, 6H), 7.27 (bs, 1H), 5.37 (s, 1H), 4.35 (bs, 1H), 3.38 (s, 3H), 3.12-3.19 (m, 1H), 2.67 (m, 1H, partially omitted by DMSO peak), 1.79 (t, 3H). |

-continued

| Example Nr. | Structure | Data |
|---|---|---|
| 21 | | $^1$H NMR (DMSO-d$_6$): δ 9.55 (s, 1H), 8.02 (m, 4H), 7.68 (d, 1H), 7.40-7.45 (m, 2H), 7.26-7.36 (m, 5H), 5.46 (s, 1H), 4.28 (s, 1H), 3.16 (q, 1H), 2.63 (m, 1H, partially omitted by DMSO peak), 1.78 (t, 3H). |
| 24 | | $^1$H NMR (DMSO-d$_6$): δ = 8.45 (d, 1H), 8.40 (s, 1H), 8.07-8.06 (m, 1H), 7.84-7.81(m, 2H), 7.75 (d, 1H), 7.52-7.51 (m, 1H), 7.35-7.32 (m, 2H), 7.27-7.19 (m, 3H), 6.83 (dd, 1H), 4.97 (m, 1H), 3.70-3.67 (m, 1H), 2.00 (s, 3H), 1.23 (s, 4H), 1.04 (s, 3H). |
| 25 | | $^1$H NMR (DMSO-d$_6$): δ = 8.53 (d, 1H), 8.19 (s, 1H), 7.94 (d, 1H), 7.56-7.54 (m, 1H), 7.318-7.303 (m, 2H), 7.23 (t, 2H), 7.15 (t, 1H), 5.17 (d, 1H), 4.31 (t, 1H), 2.17 (s, 3H), 1.66-1.63 (m, 1H), 1.21 (s, 3H), 1.12 (s, 3H), 0.70-0.67 (m, 3H), 0.65 (s, 1H). |
| 26 | | $^1$H NMR (DMSO-d$_6$): δ = 13.15 (s, 1H), 8.47(d, 1H), 7.97-7.93 (m, 2H), 7.89 (d, 1H), 7.54 (d, 1H), 7.34-7.28 (m, 4H), 7.26 (t, 2H), 7.18-7.13 (m, 2H), 5.17 (d, 1H), 4.27 (t, 1H), 1.69-1.60 (m, 1H), 1.22 (s, 3H), 1.13 (s, 3H), 0.73-0.60 (m, 3H), 0.59-0.48 (m, 1H). |
| 27 | | $^1$H NMR (DMSO-d$_6$): δ 9.12 (d, 1H), 8.46 (d, 1H), 8.09 (d, 1H), 7.95 (dd, 1H), 7.79 (d, 1H), 7.38-7.34 (m, 3H), 7.29-7.25 (m, 2H), 7.22-7.17 (m, 1H), 6.56 (d, 1H), 5.49 (d, 1H), 4.28 (d, 1H), 3.56 (s, 3H), 1.72 (t, 3H), 1.27 (s, 3H), 1.14 (s, 3H). |

Example 31: 2,2-difluoro-N-(trans-1-(1-(4-fluorophenyl)-1H-indol-5-yl)-5-oxo-2-phenylpyrrolidin-3-yl)propanamide

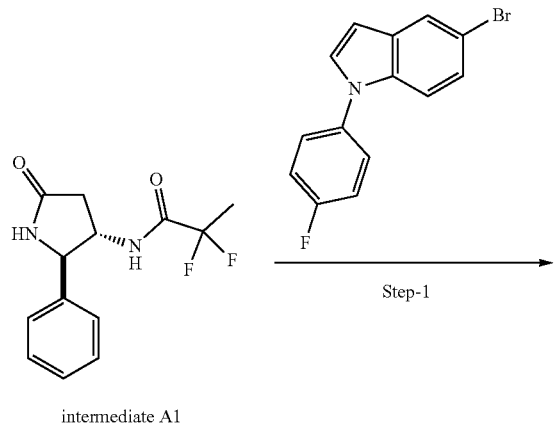

intermediate A1

Step-1 eq.) were added, and the vial was slightly vacuumed/backfilled with nitrogen. The reaction mixture was then eq.) were added, and the vial was slightly vacuumed/backfilled with nitrogen. The reaction mixture was then heated to 100° C. for 16 h. Then, sat. NaHCO₃ solution and DCM were added, and the mixture was filtered through a hydrophobic frit. The solvent was then removed, and the resulting organic residue was purified via LC to yield 2,2-difluoro-N-(trans-1-(1-(4-fluorophenyl)-1H-indol-5-yl)-5-oxo-2-phenylpyrrolidin-3-yl)propanamide (9.0 mg, 10%)

¹H NMR (DMSO-d₆): δ=9.47; (d, 1H), 7.65; (d, 1H), 7.63 7.51; (m, 3H), 7.44 7.25; (m, 8H), 7.25-7.18; (m, 1H), 6.63; (dd, 1H), 5.26; (d, 1H), 4.26; (tt, 1H), 3.07; (dd, 1H), 2.61; (dd, 1H), 1.79; (t, 3H).

The examples in the following table were synthesized in analogy to Example 31 described above, using intermediate A2.

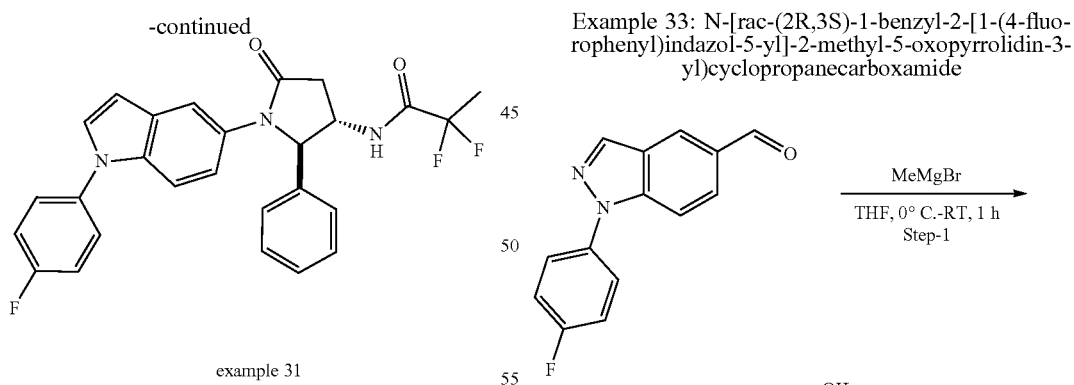

| Example Nr. | Structure | Data |
|---|---|---|
| 32 | | ¹H NMR (DMSO-d₆): δ = 8.89 (d, 1H), 7.70 (d, 1H), 7.61- 7.54 (m, 3H), 7.40 (dd, 2H), 7.40 – 7.29 (m, 6H), 7.26 – 7.20 (m, 1H), 6.64 (d, 1H), 5.21 (d, 1H), 4.12 (tt, 1H), 3.04 (dd, 1H), 2.43 (dd, 1H), 1.62 (tt, 1H), 0.82 – 0.62 (m, 4H) |

-continued example 31

Step 1: Under a nitrogen atmosphere 2,2-difluoro-N-(trans-5-oxo-2-phenylpyrrolidin-3-yl)propanamide (50.0 mg, 0.186 mmol, 1.0 eq.), 5-bromo-1-(4-fluorophenyl)indole (56.8 mg, 0.196 mmol, 1.05 eq.), K₃PO₄ (79.1 mg, 0.372 mmol, 2.0 eq.), NaI (55.9 mg, 0.373 mmol, 2.0 eq.) and CuI (28.4 mg, 0.149 mmol, 0.8 eq.) were weighed out into a microwave vial, a stir bar was added, and the vial was sealed. Then, 1,4-dioxane (0.94 mL) and trans-N, N Dimethylcyclohexane-1, 2-diamine 2.7 mg, 0.019 mmol, 0.02

Example 33: N-[rac-(2R,3S)-1-benzyl-2-[1-(4-fluorophenyl)indazol-5-yl]-2-methyl-5-oxopyrrolidin-3-yl]cyclopropanecarboxamide

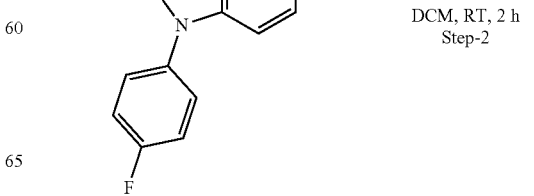

MeMgBr
THF, 0° C.-RT, 1 h
Step-1

DMP
DCM, RT, 2 h
Step-2

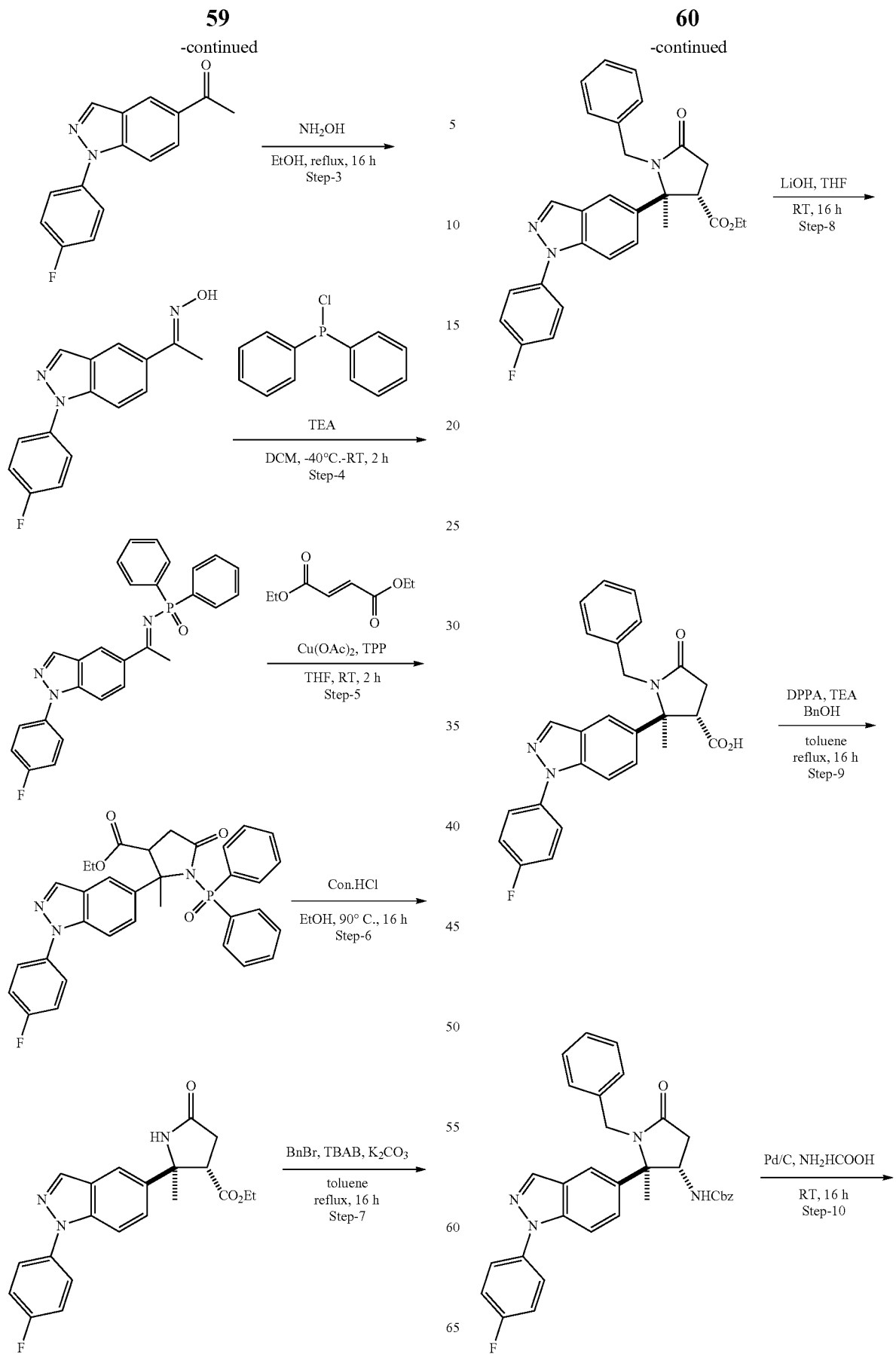

-continued

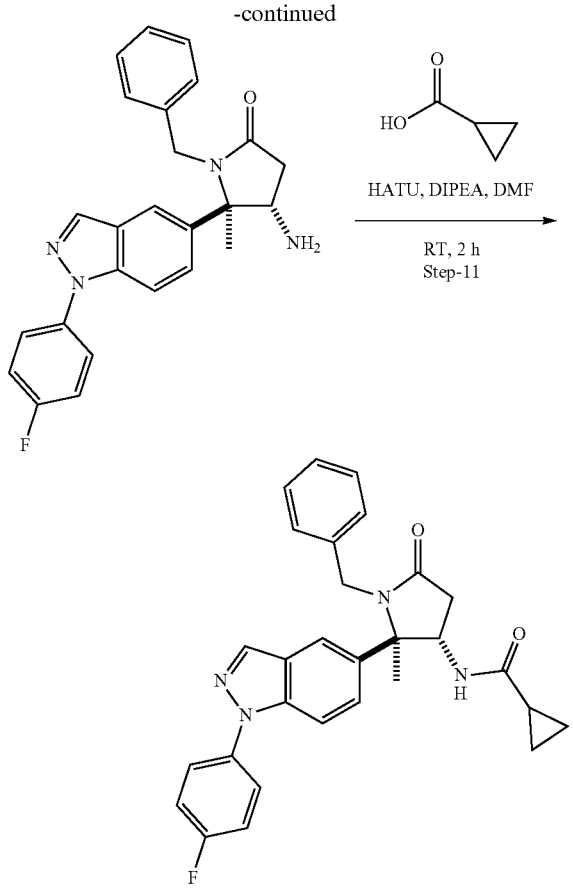

example 33

Step 1: To a stirred solution of 1-(4-fluorophenyl)-1H-indazole-5-carbaldehyde (20 g, 83.33 mmol, 1.0 eq) in THF (400 mL) at 0° C. was added MeMgBr (30 ml, 68.49 mmol, 1.2 eq) dropwise for 20 min, the reaction mixture was stirred for 30 min at the same temperature and then allowed to warm to RT and stirred for 2 h. Upon reaction completion, the reaction mixture was cooled to 0° C., quenched with $NH_4Cl$ (20 g) in water (50 mL), and extracted with $Et_2O$ (2×200 mL). The combined organic layers were dried ($Na_2SO_4$), and evaporated under reduced pressure. The crude product was purified by column chromatography (silica gel 100-200 mesh, 10-20% EtOAc in petroleum ether) to get 1-(1-(4-fluorophenyl)-1H-indazol-5-yl)ethan-1-ol (20 g, 94%) as a pale yellow liquid.

Step 2: To a stirred solution of 1-(1-(4-fluorophenyl)-1H-indazol-5-yl)ethan-1-ol (20 g, 78.12 mmol, 1.0 eq) in DCM (250 mL) at RT was added Dess-Martin periodinane (39 g, 93.97 mmol, 1.2 eq), at 0° C., and the reaction mixture was allowed to warm to RT and stirred for 16 h. Upon reaction completion, the reaction mixture was evaporated, diluted with 1M NaOH (200 mL), and extracted with EtOAc (2×500 mL). The combined organic layers were washed with brine (100 mL), dried over $Na_2SO_4$ and evaporated. The crude product was purified by column chromatography (silica gel 100-200 mesh, 10-20% EtOAc in petroleum ether) to get 1-(1-(4-fluorophenyl)-1H-indazol-5-yl)ethan-1-one (10 g, 75%) as a brown liquid.

Step 3: To a stirred solution of 1-(1-(4-fluorophenyl)-1H-indazol-5-yl)ethan-1-one (15 g, 166 mmol, 1.0 eq) in EtOH (250 mL) at RT were added NaOAc (68.3 g, 833 mmol, 5.0 eq), and $NH_2OH \cdot HCl$ (33.9 g, 499 mmol, 3.0 eq) and the reaction mixture was stirred for 16 h at 70° C. Upon reaction completion, the reaction mixture was evaporated, diluted with $H_2O$ (100 mL), and extracted with EtOAc (2×200 mL). The combined organic layers were washed with brine (100 mL), dried over $Na_2SO_4$ and evaporated. The crude product was purified by column chromatography (silica gel 100-200 mesh, 10-20% EtOAc in petroleum ether) to get 1-(1-(4-fluorophenyl)-1H-indazol-5-yl)ethan-1-one oxime (15 g, 90%) as a brown liquid.

Step 4: To a solution of 1-(1-(4-fluorophenyl)-1H-indazol-5-yl)ethan-1-one oxime (5 g, 18.58 mmol, 1.0 eq) in DCM (200 mL) at RT was added TEA (3.1 mL, 22.29 mmol, 1.2 eq). Then, the reaction was stirred for 15 min, prior to the slow addition of chlorodiphenylphosphine (4.49 g, 20.44 mmol, 1.1 eq) at −40° C., subsequently allowed to warm to RT and stirred for 2 h. Upon reaction completion, the reaction mixture was diluted with $H_2O$ (50 mL), and extracted with DCM (2×100 mL). The combined organic layers were washed with brine (100 mL), dried over $Na_2SO_4$ and evaporated under reduced pressure. The crude product was purified by column chromatography (120 g silica gel; 40-60% EtOAc in petroleum ether) to get N-(1-(1-(4-fluorophenyl)-1H-indazol-5-yl)ethylidene)-P,P-diphenylphosphinic amide (6.5 g, 77%) as a brown gum.

Step 5: To a stirred solution of N-(1-(1-(4-fluorophenyl)-1H-indazol-5-yl)ethylidene)-P,P-diphenylphosphinic amide (6.5 g, 14.34 mmol, 1.0 eq) in THF (60 mL) at RT under nitrogen atmosphere were added $Cu(OAc)_2$ (0.13 g, 0.717 mmol, 0.05 eq), and TPP (0.37 g, 1.43 mmol, 0.1 eq) and the reaction mixture was stirred for 15 min, prior to the addition of diethyl fumarate (3.7 mL, 21.52 mmol, 1.5 eq) and pinacol borane (2.93 g, 22.94 mmol, 1.6 eq), and stirring was continued for 2 h at RT. Upon reaction completion, the reaction mixture was diluted with water (50 mL), and extracted with EtOAc (2×100 mL). The combined organic layers were washed with brine (100 mL), dried over $Na_2SO_4$ and evaporated under reduced pressure. The crude compound was purified by column chromatography (120 g silica gel; 30-60% EtOAc in petroleum ether) to afford ethyl 1-(diphenylphosphoryl)-2-(1-(4-fluorophenyl)-1H-indazol-5-yl)-2-methyl-5-oxopyrrolidine-3-carboxylate (3.9 g, ~46%) as a yellow gum.

Step 6: To a stirred solution of ethyl 1-(diphenylphosphoryl)-2-(1-(4-fluorophenyl)-1H-indazol-5-yl)-2-methyl-5-oxopyrrolidine-3-carboxylate (3.9 g, 6.71 mmol, 1.0 eq) in EtOH (40 mL) at RT was added conc. HCl (6 mL) and the reaction mixture was stirred for 12 h at 90° C. Upon reaction completion, the reaction mixture was evaporated, diluted with water (50 mL), basified with sat. $NaHCO_3$ (pH=10), and extracted with EtOAc (2×50 mL). The combined organic layers were washed with brine (50 mL), dried ($Na_2SO_4$) and evaporated under reduced pressure. The crude compound was purified by column chromatography (80 g silica gel; 50-70% EtOAc in petroleum ether) to yield ethyl (2S,3S)-2-(1-(4-fluorophenyl)-1H-indazol-5-yl)-2-methyl-5-oxopyrrolidine-3-carboxy late (1 g, ~86%) as a white solid.

Step 7: To a stirred solution of ethyl (2S,3S)-2-(1-(4-fluorophenyl)-1H-indazol-5-yl)-2-methyl-5-oxopyrrolidine-3-carboxylate (1 g, 2.62 mmol, 1.0 eq) in toluene (20 mL) at RT were added $K_2CO_3$ (1 g, 7.87 mmol 3 eq), cat. TBAI (0.1 g) and benzyl bromide (448 mg, 2.62 1 eq), and the reaction mixture was stirred for 12 h at 110° C. Upon completion, the reaction mixture was evaporated, diluted with water (50 mL), and extracted with EtOAc (2×50 mL).

The combined organic layers were washed with brine (50 mL), dried (Na$_2$SO$_4$) and evaporated under reduced pressure. The crude compound was purified by column chromatography (80 g silica gel; 50-70% EtOAc in petroleum ether) to get ethyl (2 S,3S)-1-benzyl-2-(1-(4-fluorophenyl)-1H-indazol-5-yl)-2-methyl-5-oxopyrrolidine-3-carboxylate (1 g, 86%) as a white solid.

Step 8: To a stirred solution of ethyl (2S,3S)-1-benzyl-2-(1-(4-fluorophenyl)-1H-indazol-5-yl)-2-methyl-5-oxopyrrolidine-3-carboxylate (1 g, 2.12 mmol, 1.0 eq) in THF/MeOH/H$_2$O (1:1:1, 15 mL) at RT was added LiOH·H$_2$O (0.178 g, 4.24 mmol, 2 eq) and the reaction mixture was stirred for 16 h at the same temperature. Upon completion, the reaction mixture was evaporated, diluted with water (10 mL) and extracted with Et$_2$O (2×10 mL). The aqueous layer was acidified with 1N HCl (pH=4-5), and the precipitate formed was filtered and dried under vacuum to get (2 S,3S)-1-benzyl-2-(1-(4-fluorophenyl)-1H-indazol-5-yl)-2-methyl-5-oxopyrrolidine-3-carboxylic acid (0.8 g, 86%) as a white solid.

Step 9: To a stirred solution of (2 S,3S)-1-benzyl-2-(1-(4-fluorophenyl)-1H-indazol-5-yl)-2-methyl-5-oxopyrrolidine-3-carboxylic acid (1 g, 2.25 mmol, 1.0 eq) in toluene (20 mL) at RT were added TEA (0.3 mL, 2.37 mmol, 1.05 eq), and DPPA (0.58 mL, 2.70 mmol, 1.2 eq) and the reaction mixture was stirred for 1 h at 100° C. Then, the mixture was cooled to RT, prior to the addition of BnOH (0.46 mL, 4.51 mmol, 2.0 eq) and stirring was continued for 16 h at 100° C. Upon completion, the reaction mixture was evaporated, diluted with water (10 mL), and extracted with EtOAc (2×15 mL). The combined organic layers were washed with brine (20 mL), dried over Na$_2$SO$_4$ and evaporated. The crude compound was purified by column chromatography (80 g silica gel; 70-90% EtOAc in petroleum ether) to get benzyl ((2R,3S)-1-benzyl-2-(1-(4-fluorophenyl)-1H-indazol-5-yl)-2-methyl-5-oxopyrrolidin-3-yl)carbamate (0.3 g, 33%) as a pale yellow gummy solid.

Step 10: To a stirred solution of Pd/C (wt/20%) in MeOH, were added benzyl 42R,3S)-1-benzyl-2-(1-(4-fluorophenyl)-1H-indazol-5-yl)-2-methyl-5-oxopyrrolidin-3-yl)carbamate (0.3 g, 0.547 mmol, 1.0 eq) and ammonium formate (69 mg, 1.094 mmol, 2 eq) at RT and the reaction mixture was stirred for 4 h. Upon completion, the reaction mixture was filtered through a celite bed, and washed with MeOH. The filtrate was concentrated and dried over Na$_2$SO$_4$, filtered and evaporated under reduced pressure to get (4S,5R)-4-amino-1-benzyl-5-(1-(4-fluorophenyl)-1H-indazol-5-yl)-5-methylpyrrolidin-2-one (0.15 g, 66%) as an off-white solid.

Step 11: To a solution of (4S,5R)-4-amino-1-benzyl-5-(1-(4-fluorophenyl)-1H-indazol-5-yl)-5-methylpyrrolidin-2-one (150 mg, 0.360 mmol, 1.0 eq) and cyclopropanecarboxylic acid (37 mg, 0.432 mmol, 1.2 eq) in DMF (10 mL) at 0° C. under nitrogen atmosphere were added EDC·HCl (137 mg, 0.721 mmol, 2 eq), HOAT (49 mg, 0.360 mmol, 1.0 eq), DIPEA (0.12 mL, 0.721 mmol, 3.0 eq) and the reaction mixture was stirred for 2 h at RT. Upon completion, the reaction mixture was diluted with water (10 mL) and extracted with EtOAc (2×20 mL). The combined organic layers were washed with brine (20 mL), dried over Na$_2$SO$_4$ and evaporated under reduced pressure. The crude compound was purified by preparative HPLC to yield N-[rac-(2R,3S)-1-benzyl-2-[1-(4-fluorophenyl)indazol-5-yl]-2-methyl-5-oxopyrrolidin-3-yl)cyclopropanecarboxamide (45 mg).

$^1$H NMR (500 MHz, DMSO-d$_6$): δ8.64; (d, 1H), 8.38; (s, 1H), 7.81-7.77; (m, 3H), 7.59; (d, 1H), 7.46-7.41; (m, 3H), 7.31-7.28; (m, 3H), 7.26-7.20; (m, 1H), 4.90; (d, 1H), 4.50-4.46; (m, 1H), 3.90; (d, 1H), 2.71; (dd, 1H), 2.31; (dd, 1H), 1.65-1.60; (m, 1H), 1.36; (s, 3H), 0.68-0.65; (m, 4H).

GRE Agonist

The reporter cell line CHO-Gal4/GR consisted of a chinese hamster ovary (CHO) cell line (Leibniz Institute DSMZ-German Collection of Microorganisms and Cell Cultures GmbH: ACC-110) containing a firefly luciferase gene under the control of the GR ligand binding domain fused to the DNA binding domain (DBD) of GAL4 (GAL4 DBD-GR) stably integrated into CHO cells. This cell line was established by stable transfection of CHO cells with a GAL4-UAS-Luciferase reporter construct. In a subsequent step the ligand binding domain of the GR cloned into pIRES2-EGFP-GAL4 containing the DNA binding domain of GAL4 from pFA-AT2 was transfected. This fusion construct activated firefly luciferase expression under the control of a multimerized GAL4 upstream activation sequence (UAS). The signal of the emitted luminescence was recorded by the FLIPR$^{TETRA}$. This allowed for specific detection of ligand-induced activation of the GR and therefore for the identification of compounds with agonistic properties. The GAL4/UAS reporter was premixed with a vector that constitutively expressed Renilla luciferase, which served as an internal positive control for transfection efficiency.

The complete culture medium for the assay was:

DMEM F-12 (1:1) MIXTURE (LONZA cat. No: BE04-687F/U1) 500 mL 5 mL of 100 mM Sodium Pyruvate (LONZA cat. No: BE12-115E)

25 mL of 7.5% Sodium Bicarbonate (LONZA cat. N°BE17-613E)

6.5 mL of 1 M Hepes (LONZA cat. No: BE17-737E)

5 mL of 100× Penicillin/Streptomycin (LONZA cat. N°DE17-602E)

50 mL of Fetal Bovine Serum (Euroclone cat. N°ECS 0180L)

0.25 mL of 10 mg/mL Puromycin (InvivoGen cat.: ant-pr-1)

0.5 mL of 100 mg/mL Zeocin (InvivoGen cat.: ant-zn-1)

Cryo-preserved CHO-Gal4/GR cells were suspended in complete medium and 5000 cells/25 µ/well were seeded into the wells of 384-well polystyrene assay plates (Thermo Scientific, cat. #4332) and cultured at 37° C., 5% CO$_2$ and 95% humidity. After 24 hours growth medium was carefully removed and replaced by 30 µl Opti-MEM (GIBCO, cat. #31985062) as assay buffer. To test the compounds an 8-point half-log compound dilution curve was generated in 100% DMSO starting from a 2 mM stock and compounds were then diluted 1:50 in Opti-MEM. 10 µl of compounds were then added to the wells containing 30 µl Opti-MEM resulting in a final assay concentration range from 10 µM to 0.003 µM in 0.5% DMSO. Compounds were tested at 8 concentrations in quadruplicate data points. Cells were incubated for 6 hour with compounds and beclometasone (Sigma, cat. #Y0000351) as control compound at 37° C., 5% CO$_2$ and 95% humidity in a total volume of 40 µl. Finally, cells were lysed with 20 µl of Triton/Luciferin solution and the signal of the emitted luminescence was recorded at the FLIPR$^{TETRA}$ for 2 minutes.

The relative efficacy of a compound (% effect) was calculated based on the full effect of the agonist beclometasone:

% effect=((compound−min)/(max−min))×100

[min=Opti-MEM only,max=beclometasone]

To calculate EC$_{50}$, max, min and slope factor for each compound a concentration response curve was fitted by plotting % effect versus compound concentration using a 4 parameter logistic equation:

$$y=A+(B-A)/(1+((10C)/x)D)$$

[A=min y, B=max y, C=log EC$_{50}$, D=slope]

GRE Antagonist

The reporter cell line CHO-Gal4/GR consisted of a chinese hamster ovary (CHO) cell line (Leibniz Institute DSMZ—German Collection of Microorganisms and Cell Cultures GmbH: ACC-110) containing a firefly luciferase gene under the control of the GR ligand binding domain fused to the DNA binding domain (DBD) of GAL4 (GAL4 DBD-GR) stably integrated into CHO cells. This cell line was established by stable transfection of CHO cells with a GAL4-UAS-Luciferase reporter construct. In a subsequent step the ligand binding domain of the GR cloned into pIRES2-EGFP-GAL4 containing the DNA binding domain of GAL4 from pFA-AT2 was transfected. This fusion construct activated firefly luciferase expression under the control of a multimerized GAL4 upstream activation sequence (UAS). The signal of the emitted luminescence was recorded by the FLIPR$^{TETRA}$. This allowed for specific detection of antagonistic properties of compounds by measuring the ligand-induced inhibition of beclometasone-activated GR. The GAL4/UAS reporter was premixed with a vector that constitutively expressed Renilla luciferase, which served as an internal positive control for transfection efficiency.

The complete culture medium for the assay was:
DMEM F-12 (1:1) MIXTURE (LONZA cat. No: BE04-687F/U1) 500 mL
5 mL of 100 mM Sodium Pyruvate (LONZA cat. No: BE12-115E)
25 mL of 7.5% Sodium Bicarbonate (LONZA cat. No BE17-613E)
6.5 mL of 1 M Hepes (LONZA cat. No: BE17-737E)
5 mL of 100× Penicillin/Streptomycin (LONZA cat. No DE17-602E)
50 mL of Fetal Bovine Serum (Euroclone cat. No ECS 0180L)
0.25 mL of 10 mg/mL Puromycin (InvivoGen cat.: ant-pr-1)
0.5 mL of 100 mg/mL Zeocin (InvivoGen cat.: ant-zn-1)

Cryo-preserved CHO-Gal4/GR cells were suspended in complete medium and 5000 cells/25 µl/well were seeded into the wells of 384-well polystyrene assay plates (Thermo Scientific, cat. #4332) and cultured at 37° C., 5% CO$_2$ and 95% humidity. After 24 hours growth medium was carefully removed and replaced by 20 µl Opti-MEM (GIBCO, cat. #31985062) as assay buffer. For testing compounds an 8-point half-log compound dilution curve was generated in 100% DMSO starting from a 2 mM stock and compounds were then diluted 1:50 in Opti-MEM. To test the compounds in the antagonist mode 10 µl of compounds were then added to the wells containing 20 µl Opti-MEM and incubated for 10 min. After this pre-incubation 10 µl of the reference agonist beclometasone (Sigma, cat. #Y0000351) at an EC50 of 2.5 nM were added resulting in a final assay concentration range from 10 µM to 0.003 µM in 0.5% DMSO in a total volume of 40 µl. Compounds were tested at 8 concentrations in quadruplicate data points. Cells were incubated for 6 hour with compounds and mifepristone as control compound (Sigma, cat. #M8046) at 37° C., 5% CO$_2$ and 95% humidity. Finally, cells were lysed with 20 µl of Triton/Luciferin solution and the signal of the emitted luminescence was recorded at the FLIPR$^{TETRA}$ for 2 minutes.

The relative efficacy of a compound (% effect) was calculated based on the full effect of the antagonist mifepristone:

$$\% \text{ effect}=((\text{compound}-\text{min})/(\text{max}-\text{min}))\times-100$$

[min=Opti-MEM only, max=mifepristone]

To calculate IC$_{50}$, max, min and slope factor for each compound a concentration response curve was fitted by plotting % effect versus compound concentration using a 4 parameter logistic equation:

$$y=A+(B-A)/(1+((10C)/x)D)$$

[A=min y, B=max y, C=log IC$_{50}$, D=slope]

Table summarizing biological data:

| cmpd # | IC50 or EC50<br>A < 100 nM,<br>B = 100 nM-1 µM,<br>C = 1 µM-15 µM |
|---|---|
| 1 | A |
| 2 | B |
| 3 | B |
| 5 | B |
| 6 | C |
| 7 | C |
| 8 | C |
| 9 | C |
| 10 | C |
| 11 | C |
| 12 | C |
| 13 | C |
| 14 | A |
| 15 | A |
| 16 | B |
| 17 | A |
| 18 | B |
| 19 | C |
| 21 | A |
| 22 | B |
| 23 | B |
| 24 | C |
| 25 | A |
| 26 | B |
| 27 | C |
| 31 | A |
| 32 | B |
| 33 | B |

"n.a.": not active in the GR cell-based assays, neither in the agonistic nor in the antagonistic mode.
"n.d.": not determined.

The invention claimed is:

1. A compound according to general formula (I),

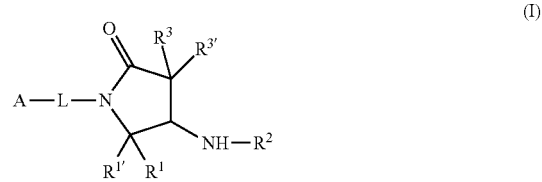

wherein
R$^1$ represents —C$_{1-10}$-alkyl; —C$_{3-10}$-cycloalkyl; —C$_{1-6}$-alkylene-C$_{3-10}$-cycloalkyl; 3 to 7 membered heterocycloalkyl; —C$_{1-6}$-alkylene-(3 to 7 membered heterocycloalkyl); aryl; —C$_{1-6}$-alkylene-aryl; 5 or 6-membered heteroaryl; or —C$_{1-6}$-alkylene-(5 or 6-membered heteroaryl);

R$^{1'}$ represents H; —C$_{1-10}$-alkyl; or or —C$_{3-10}$-cycloalkyl;

R$^2$ represents —C(=O)—C$_{1-10}$-alkyl; —C(=O)—C$_{3-10}$-cycloalkyl; —C(=O)—C$_{1-6}$-alkylene-C$_{3-10}$-cycloalkyl; —C(=O)-(3 to 7 membered heterocycloalkyl); —C(=O)—C$_{1-6}$-alkylene-(3 to 7 membered heterocycloalkyl); —C(=O)-aryl; —C(=O)—C$_{1-6}$-alkylene-aryl; —C(=O)-(5 or 6-membered heteroaryl); —C(=O)—C$_{1-6}$-alkylene-(5 or 6-membered heteroaryl); —S(=O)$_{1-2}$—C$_{1-10}$-alkyl; —S(=O)$_{1-2}$—C$_{3-10}$-cycloalkyl; —S(=O)$_{1-2}$—C$_{1-6}$-alkylene-C$_{3-10}$-cycloalkyl; —S(=O)$_{1-2}$-(3 to 7 membered heterocycloalkyl); —S(=O)$_{1-2}$—C$_{1-6}$-alkylene-(3 to 7 membered heterocycloalkyl); —S(=O)$_{1-2}$-aryl; —S(=O)$_{1-2}$—C$_{1-6}$-alkylene-aryl; —S(=O)$_{1-2}$-(5 or 6-membered heteroaryl); or —S(=O)$_{1-2}$—C$_{1-6}$-alkylene-(5 or 6-membered heteroaryl);

R$^3$ and R$^{3'}$ independently from one another represent H; F; Cl; —C$_{1-10}$-alkyl; —C$_{3-6}$-cycloalkyl; —C$_{1-6}$-alkylene-C$_{3-6}$-cycloalkyl; 3 to 7 membered heterocycloalkyl; —C$_{1-6}$-alkylene-(3 to 7 membered heterocycloalkyl); —C$_{1-6}$-alkylene-aryl; or —C$_{1-6}$-alkylene-(5 or 6-membered heteroaryl);

or R$^3$ and R$^{3'}$ together with the carbon atom to which they are bound form a C$_{3-10}$-cycloalkyl; or 3 to 7 membered heterocycloalkyl;

L represents bond or —C$_{1-6}$-alkylene-;

A represents substructure (S1)

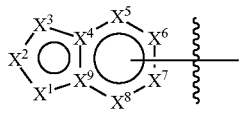

(S1)

wherein

X$^1$, X$^2$ and X$^3$ independently from one another represent CH; CR$^4$; N; NH; NR$^4$; O; or S;
  wherein at least one of X$^1$, X$^2$ and X$^3$ represents N; NH; NR$^4$; O; or S;
  wherein when X$^1$ or X$^3$ represent NR$^4$ and X$^2$ represents CH or N; the remaining X$^1$ or X$^3$ represents CR$^4$ with R$^4$ representing aryl or —C$_{1-6}$-alkylene-aryl;

X$^4$ and X$^9$ independently from one another represent C or N;

X$^5$, X$^6$, X$^7$ and X$^8$ in each case independently from one another represent CH; CR$^4$; N; or C which is connected to L; wherein one of X$^5$, X$^6$, X$^7$ and X$^8$ represents C which is connected to L;

R$^4$ represents —C$_{1-10}$-alkyl; —C$_{1-10}$-alkenyl; —C$_{1-10}$-alkynyl; —C$_{3-6}$-cycloalkyl; —C$_{1-6}$-alkylene-C$_{3-6}$-cycloalkyl; 3 to 7 membered heterocycloalkyl; —C$_{1-6}$-alkylene-(3 to 7 membered heterocycloalkyl); aryl; —C$_{1-6}$-alkylene-aryl; 5 or 6-membered heteroaryl; —C$_{1-6}$-alkylene-(5 or 6-membered heteroaryl); —S(=O)$_{1-2}$—C$_{1-10}$-alkyl; —S(=O)$_{1-2}$—C$_{3-10}$-cycloalkyl; —S(=O)$_{1-2}$-(3 to 7 membered heterocycloalkyl); —S(=O)$_{1-2}$-aryl; or —S(=O)$_{1-2}$-(5 or 6-membered heteroaryl);

wherein —C$_{1-10}$-alkyl, —C$_{1-4}$-alkyl and —C$_{1-6}$-alkylene- in each case independently from one another is linear or branched, and saturated;

wherein —C$_{1-10}$-alkyl, —C$_{1-4}$-alkyl, —C$_{1-6}$-alkylene-, —C$_{3-10}$-cycloalkyl and 3 to 7 membered heterocycloalkyl in each case independently from one another are unsubstituted or mono- or polysubstituted with one or more substituents selected from —F; —Cl; —Br; —I; —CN; —C$_{1-6}$-alkyl; —CF$_3$; —CF$_2$H; —CFH$_2$; —CF$_2$Cl; —CFCl$_2$; —C(=O)—C$_{1-6}$-alkyl; —C(=O)—OH; —C(=O)—OC$_{1-6}$-alkyl; —C(=O)—NH$_2$; —C(=O)—NH(C$_{1-6}$-alkyl); —C(=O)—N(C$_{1-6}$-alkyl)$_2$; —OH; =O; —OCF$_3$; —OCF$_2$H; —OCFH$_2$; —OCF$_2$Cl; —OCFCl$_2$; —O—C$_{1-6}$-alkyl; —O—C(=O)—C$_{1-6}$-alkyl; —O—C(=O)—O—C$_{1-6}$-alkyl; —O—(CO)—NH(C$_{1-6}$-alkyl); —O—C(=O)—N(C$_{1-6}$-alkyl)$_2$; —O—S(=O)$_2$—NH$_2$; —O—S(=O)$_2$—NH(C$_{1-6}$-alkyl); —O—S(=O)$_2$—N(C$_{1-6}$-alkyl)$_2$; —NH$_2$; —NH(C$_{1-6}$-alkyl); —N(C$_{1-6}$-alkyl)$_2$; —NH—C(=O)—C$_{1-6}$-alkyl; —NH—C(=O)—O—C$_{1-6}$-alkyl; —NH—C(=O)—NH$_2$; —NH—C(=O)—NH(C$_{1-6}$-alkyl); —NH—C(=O)—N(C$_{1-6}$-alkyl)$_2$; —N(C$_{1-6}$-alkyl)-C(=O)—C$_{1-6}$-alkyl; —N(C$_{1-6}$-alkyl)-C(=O)—O—C$_{1-6}$-alkyl; —N(C$_{1-6}$-alkyl)-C(=O)—NH$_2$; —N(C$_{1-6}$-alkyl)-C(=O)—NH(C$_{1-6}$-alkyl); —N(C$_{1-6}$-alkyl)-C(=O)—N(C$_{1-6}$-alkyl)$_2$; —NH—S(=O)$_2$OH; NH—S(=O)$_2$—C$_{1-6}$-alkyl; —NH—S(=O)$_2$—O—C$_{1-6}$-alkyl; —NH—S(=O)$_2$—NH$_2$; —NH—S(=O)$_2$—NH(C$_{1-6}$-alkyl); —NH—S(=O)$_2$N(C$_{1-6}$-alkyl)$_2$; —N(C$_{1-6}$-alkyl)-S(=O)$_2$—OH; —N(C$_{1-6}$-alkyl)-S(=O)$_2$-C$_{1-6}$-alkyl; —N(C$_{1-6}$-alkyl)-S(=O)$_2$-O—C$_{1-6}$-alkyl; —N(C$_{1-6}$-alkyl)-S(=O)$_2$—NH$_2$; —N(C$_{1-6}$-alkyl)-S(=O)$_2$—NH(C$_{1-6}$-alkyl); —N(C$_{1-6}$-alkyl)-S(=O)$_2$—N(C$_{1-6}$-alkyl)$_2$; —SCF$_3$; —SCF$_2$H; —SCFH$_2$; —S—C$_{1-6}$-alkyl; —S(=O)—C$_{1-6}$-alkyl; —S(=O)$_2$—C$_{1-6}$-alkyl; —S(=O)$_2$—OH; —S(=O)$_2$—O—C$_{1-6}$-alkyl; —S(=O)$_2$—NH$_2$; —S(=O)$_2$—NH(C$_{1-6}$ alkyl); —S(=O)$_2$—N(C$_{1-6}$-alkyl)$_2$; -C$_{3-6}$-cycloalkyl; 3 to 6-membered heterocycloalkyl; phenyl; 5 or 6-membered heteroaryl; —O—C$_{3-6}$-cycloalkyl; —O-(3 to 6-membered heterocycloalkyl); —O-phenyl; —O-(5 or 6-membered heteroaryl); —C(=O)—C$_{3-6}$-cycloalkyl; —C(=O)-(3 to 6-membered heterocycloalkyl); —C(=O)-phenyl; —C(=O)-(5 or 6-membered heteroaryl); —S(=O)$_2$—(C$_{3-6}$-cycloalkyl); —S(=O)$_2$-(3 to 6-membered heterocycloalkyl); —S(=O)$_2$-phenyl or —S(=O)$_2$-(5 or 6-membered heteroaryl);

wherein aryl and 5 or 6-membered heteroaryl in each case independently from one another are unsubstituted or mono- or polysubstituted with one or more substituents selected from —F; —Cl; —Br; —I; —CN; —C$_{1-6}$-alkyl; —CF$_3$; —CF$_2$H; —CFH$_2$; —CF$_2$Cl; —CFCl$_2$; —C$_{1-4}$-alkylene-CF$_3$; —C$_{1-4}$-alkylene-CF$_2$H; —C$_{1-4}$-alkylene-CFH$_2$; —C(=O)—C$_{1-6}$-alkyl; —C(=O)—OH; —C(=O)—OC$_{1-6}$-alkyl; —C(=O)—NH(OH); —C(=O)—NH$_2$; —C(=O)—NH(C$_{1-6}$-alkyl); —C(=O)—N(C$_{1-6}$-alkyl)$_2$; —OH; =O; —OCF$_3$; —OCF$_2$H; —OCFH$_2$; —OCF$_2$Cl; —OCFCl$_2$; —O—C$_{1-6}$-alkyl; —O—C$_{3-6}$-cycloalkyl; —O-(3 to 6-membered heterocycloalkyl); —O-aryl; —O-(5 or 6-membered heteroaryl); —NH$_2$; —NH(C$_{1-6}$-alkyl); —N(C$_{1-6}$-alkyl)$_2$; —NH—C(=O)—C$_{1-6}$-alkyl; —N(C$_{1-6}$-alkyl)-C(=O)—C$_{1-6}$-alkyl; —NH—C(=O)—NH$_2$; —NH—C(=O)—NH(C$_{1-6}$-alkyl); —NH—C(=O)—N(C$_{1-6}$-alkyl)$_2$; —N(C$_{1-6}$-alkyl)-C(=O)—NH(C$_{1-6}$-alkyl); —N(C$_{1-6}$-alkyl)-C(=O)—N(C$_{1-6}$-alkyl)$_2$; —NH—S(=O)$_2$—C$_{1-6}$-alkyl; —SCF$_3$; —S—C$_{1-6}$-alkyl; —S(=O)—C$_{1-6}$-alkyl; —S(=O)$_2$—C$_{1-6}$-alkyl; —S(=O)$_2$—NH$_2$; —S(=O)$_2$—NH(C$_{1-6}$- alkyl); —S(=O)₂—N(C₁₋₆-alkyl)₂; -C₃₋₆-cycloalkyl; —C₁₋₄-alkylene-C₃₋₆-cycloalkyl; 3 to 6-membered heterocycloalkyl; —C₁₋₄-alkylene-(3 to 6-membered heterocycloalkyl); phenyl or 5 or 6-membered heteroaryl;

in the form of the free compound or a physiologically acceptable salt thereof;

with the proviso that N-[rac-((2R,3S)-1-(3-cyclobutyl-1H-indazol-6-yl)-4,4-dimethyl-5-oxo-2-phenylpyrrolidin-3-yl]cyclopropanecarboxamide is excluded.

2. The compound according to claim 1, wherein $X^5$, $X^6$, $X^7$ and $X^8$ in each case independently from one another represent CH; or C which is connected to L; wherein one of $X^5$, $X^6$, $X^7$ and $X^8$ represents C which is connected to L.

3. The compound according to claim 1, wherein
A represents indolyl; indazolyl; benzisoxazolyl; benzisothiazolyl; benzotriazolyl; imidazopyridinyl; or benzoimidazolyl; in each case unsubstituted or mono- or disubstituted with $R^4$.

4. The compound according to claim 1, wherein
$R^1$ represents —C₃₋₁₀-cycloalkyl; aryl; or 5 or 6-membered heteroaryl; and/or
$R^{1'}$ represents H; CH₃; or cyclopropyl.

5. The compound according to claim 1, wherein
$R^2$ represents —C(=O)—C₁₋₁₀-alkyl; —C(=O)—C₃₋₁₀-cycloalkyl; —C(=O)-(3 to 7 membered heterocycloalkyl); —C(=O)-aryl; —C(=O)-(5 or 6-membered heteroaryl); —S(=O)₂—C₁₋₁₀-alkyl; —S(=O)₂—C₃₋₁₀-cycloalkyl; —S(=O)₂-(3 to 7 membered heterocycloalkyl); —S(=O)₂-aryl or —S(=O)₂-(5 or 6-membered heteroaryl).

6. The compound according to claim 1, wherein
$R^3$ represents H or —C₁₋₁₀-alkyl; and/or
$R^{3'}$ represents H.

7. The compound according to claim 1, wherein
$R^4$ represents —C₁₋₁₀-alkyl; —C₁₋₁₀-alkynyl; —C₃₋₆-cycloalkyl; aryl; —C₁₋₆-alkylene-aryl; 5 or 6-membered heteroaryl; or —S(=O)₁₋₂—C₁₋₁₀-alkyl.

8. The compound according to claim 1, wherein
R₂ represents
—C(=O)—C₁₋₁₀-alkyl, unsubstituted or mono- or disubstituted with substituents selected from the group consisting of —F, —Cl, and —Br;
—C(=O)-cyclopropyl, unsubstituted or mono- or disubstituted with substituents selected from the group consisting of —F, —Cl, —Br, —CH₃, —CF₃, —CN, and —OCH₃;
—C(=O)-cyclobutyl, unsubstituted or mono- or disubstituted with substituents selected from the group consisting of —F, —Cl, —Br, —CH₃, —CF₃, —CN and —OCH₃;
—C(=O)-2-tetrahydrofuranyl, unsubstituted;
—C(=O)-(5- to 6-membered heteroaryl), wherein said 5- to 6-membered heteroaryl is selected from the group consisting of thiazolyl, pyrazolyl, oxazolyl and 1-oxa-2,4-diazolyl, 1,2,5-oxadiazolyl, isoxazolyl, isothiazolyl, wherein in each case said 5- to 6-membered heteroaryl is unsubstituted or mono- or disubstituted with substituents selected from the group consisting of —F, —Cl, —Br, —CH₃, —CF₃, —CN, =O, and —OCH₃;
—S(=O)₂—C₁₋₁₀-alkyl, unsubstituted;
—S(=O)₂-cyclopropyl, unsubstituted or —S(=O)₂-cyclobutyl, unsubstituted;
—S(=O)₂-phenyl unsubstituted or mono- or disubstituted with substituents independently of one another selected from the group consisting of —F, —Cl, —Br, —CH₃, —CF₃, —CN and —OCH₃; or
—S(=O)₂-(5- to 6-membered heteroaryl), wherein said 5- to 6-membered heteroaryl is selected from the group consisting of thiazolyl, pyrazolyl, oxazolyl and 1-oxa-2,4-diazolyl, 1,2,5-oxadiazolyl, isoxazolyl, isothiazolyl, wherein in each case said 5- to 6-membered heteroaryl is unsubstituted or mono- or disubstituted with substituents selected from the group consisting of —F, —Cl, —Br, —CH₃, —CF₃, —CN, =O, and —OCH₃.

9. The compound according to claim 1, wherein
$R^1$ represents phenyl, benzodioxanyl, or indazolyl; wherein said phenyl, benzodioxanyl and indazolyl in each case independently from one another are unsubstituted or mono- or disubstituted with substituents selected from the group consisting of —F, —Cl, —Br, —CH₃, —CF₃, —CN, cyclopropyl, phenyl, fluorophenyl and —OCH₃; and/or
$R^2$ represents —C(=O)—C₁₋₆-alkyl; —C(=O)-cyclopropyl; or —C(=O)-cyclobutyl; wherein said C₁₋₆-alkyl, cyclopropyl and cyclobutyl in each case independently from one another are unsubstituted or mono- or disubstituted with substituents selected from the group consisting of —F, —Cl, and —Br; or
—S(=O)₂-cyclopropyl, unsubstituted; or —S(=O)₂-cyclobutyl, unsubstituted; or
—S(=O)₂-phenyl unsubstituted or mono- or disubstituted with substituents independently of one another selected from the group consisting of —F, —Cl, —Br, —CH₃, —CF₃, —CN and —OCH₃; and/or
A represents indolyl; indazolyl; benzisoxazolyl; benzisothiazolyl; benzotriazolyl; or imidazopyridinyl;
in each case unsubstituted or mono- or disubstituted with substituents independently of one another selected from the group consisting of C₁₋₄-alkyl; C₁₋₄-alkynyl; cyclopropyl; cyclobutyl; phenyl; benzyl; N-methylpyridinone; and —S(=O)₂—C₁₋₄-alkyl;
wherein phenyl and benzyl independently from one another are unsubstituted or mono- or disubstituted with substituents selected from the group consisting of —F, —Cl, —Br, —CH₃, —CF₃, —CN, cyclopropyl and —OCH₃.

10. A compound selected from the group consisting of:
1  N-[rac-(2R,3S)-1-[3-(4-fluorophenyl)-1,2-benzoxazol-6-yl]-5-oxo-2-phenylpyrrolidin-3-yl]cyclopropanecarboxamide;
2  N-[rac-(2R,3S)-1-[3-(4-fluorophenyl)-1H-indazol-6-yl]-5-oxo-2-phenylpyrrolidin-3-yl]cyclopropanecarboxamide;
3  2,2-difluoro-N-[rac-(2R,3S)-5-oxo-2-phenyl-1-(3-prop-1-ynyl-1,2-benzothiazol-6-yl)pyrrolidin-3-yl]propanamide;
5  N-[rac-(2R,3S)-1-[1-(4-fluorophenyl)imidazo[1,5-a]pyridin-6-yl]-5-oxo-2-phenylpyrrolidin-3-yl]cyclopropanecarboxamide;
6  2,2-difluoro-N-[rac-(2R,3S)-1-[3-(1-methyl-6-oxopyridin-3-yl)-1,2-benzoxazol-6-yl]-5-oxo-2-phenylpyrrolidin-3-yl]propanamide;
7  N-[rac-(2R,3S)-1-[1-(4-fluorophenyl)imidazo[1,5-a]pyridin-6-yl]-5-oxo-2-phenylpyrrolidin-3-yl]cyclopropanesulfonamide;
8  2,2-difluoro-N-[rac-(2R,3S)-1-(3-cyclobutyl-1H-indazol-6-yl)-5-oxo-2-phenylpyrrolidin-3-yl]propanamide;
9  N-[rac-(2R,3S)-1-[3-(4-chlorophenyl)-1H-indazol-6-yl]-5-oxo-2-phenylpyrrolidin-3-yl]cyclopropanecarboxamide;

10 N-[rac-(2R,3S)-1-[1-(4-fluorophenyl)benzotriazol-5-yl]-5-oxo-2-phenylpyrrolidin-3-yl]cyclopropanesulfonamide;
11 2,2-difluoro-N-[rac-(2R,3S)-1-[(6-fluoro-1H-indol-4-yl)methyl]-5-oxo-2-phenylpyrrolidin-3-yl]propanamide;
12 N-[rac-(2R,3S)-1-[3-(4-fluorophenyl)-1-methylindazol-6-yl]-5-oxo-2-phenylpyrrolidin-3-yl]cyclopropanecarboxamide;
13 N-[rac-(2R,3S)-1-[1-(4-fluorophenyl)benzotriazol-5-yl]-5-oxo-2-phenylpyrrolidin-3-yl]cyclopropanecarboxamide;
14 2,2-difluoro-N-[rac-(2R,3S)-1-[3-(4-fluorophenyl)-1H-indazol-6-yl]-5-oxo-2-phenylpyrrolidin-3-yl]propanamide;
15 4-methoxy-N-[rac-(2R,3S)-1-benzyl-2-(2,3-dihydro-1,4-benzodioxin-6-yl)-5-oxopyrrolidin-3-yl]benzenesulfonamide;
16 2,2-difluoro-N-[rac-(2R,3S)-1-[1-(4-fluorophenyl)benzotriazol-5-yl]-5-oxo-2-phenylpyrrolidin-3-yl]propanamide;
17 2,2-difluoro-N-[rac-(2R,S)-1-[1-(4-fluorophenyl)imidazo[1,5-a]pyridin-6-yl]-5-oxo-2-phenylpyrrolidin-3-yl]propanamide;
18 4-chloro-N-[rac-(2R,3S)-1-benzyl-5-oxo-2-phenylpyrrolidin-3-yl]benzenesulfonamide;
19 2,2-difluoro-N-[rac-(2R,3S)-1-[3-(4-fluorophenyl)-1-methylsulfonylindazol-6-yl]-5-oxo-2-phenylpyrrolidin-3-yl]propanamide;
21 2,2-difluoro-N-[rac-(2R,3S)-1-[3-(4-fluorophenyl)-1,2-benzoxazol-6-yl]-5-oxo-2-phenylpyrrolidin-3-yl]propanamide;
22 2,2-difluoro-N-[rac-(2R,3S)-1-[1-[(4-fluorophenyl)methyl]indol-5-yl]-5-oxo-2-phenylpyrrolidin-3-yl]propanamide;
23 N-[rac-((2R,3S)-1-(3-(4-fluorophenyl)benzo[d]isoxazol-6-yl)-4,4-dimethyl-5-oxo-2-phenylpyrrolidin-3-yl)]cyclopropanecarboxamide;
24 N-[rac-((2R,3S)-1-(1-(4-fluorophenyl)imidazo[1,5-a]pyridin-6-yl)-4,4-dimethyl-5-oxo-2-phenylpyrrolidin-3-yl)]methanesulfonamide;
25 N-[rac-((2R,3S)-4,4-dimethyl-5-oxo-2-phenyl-1-(3-(prop-1-yn-1-yl)benzo[d]isothiazol-6-yl)pyrrolidin-3-yl)]cyclopropanecarboxamide;
26 N-[rac-((2R,3S)-1-(3-(4-fluorophenyl)-1H-indazol-6-yl)-4,4-dimethyl-5-oxo-2-phenylpyrrolidin-3-yl)]cyclopropanecarboxamide;
27 N-[rac-((2R,3S)-4,4-dimethyl-1-(3-(1-methyl-6-oxo-1,6-dihydropyridin-3-yl)benzo[d]isoxazol-6-yl)-5-oxo-2-phenylpyrrolidin-3-yl)]-2,2-difluoropropanamide;
31 2,2-difluoro-N-(trans-1-(1-(4-fluorophenyl)-1H-indol-5-yl)-5-oxo-2-phenylpyrrolidin-3-yl)propanamide;
32 N-(rac-(2R,3S)-1-(1-(4-fluorophenyl)-1H-indol-5-yl)-5-oxo-2-phenylpyrrolidin-3-yl)cyclopropanecarboxamide; and
33 N-[rac-(2R,3S)-1-benzyl-2-[1-(4-fluorophenyl)indazol-5-yl]-2-methyl-5-oxopyrrolidin-3-yl]cyclopropanecarboxamide;

in the form of the free compound or a physiologically acceptable salt thereof.

11. A pharmaceutical dosage form comprising a compound according to claim 1.

12. A method of the treatment and/or prophylaxis of pain and/or inflammation, said method comprising administering to a patient in need thereof an effective amount therefor of a compound according to claim 1.

13. The method according to claim 12, wherein the pain is inflammatory pain.

14. A pharmaceutical dosage form comprising a compound according to claim 10.

15. A method of the treatment and/or prophylaxis of pain and/or inflammation, said method comprising administering to a patient in need thereof an effective amount therefor of a compound according to claim 10.

16. The method according to claim 15, wherein the pain is inflammatory pain.

\* \* \* \* \*